(12) United States Patent
Kim et al.

(10) Patent No.: US 11,089,624 B2
(45) Date of Patent: *Aug. 10, 2021

(54) METHOD AND APPARATUS FOR ALLOCATING UPLINK RESOURCES

(71) Applicant: Electronics and Telecommunications Research Institute, Daejeon (KR)

(72) Inventors: Eunkyung Kim, Daejeon (KR); Chanho Yoon, Daejeon (KR); Seung-Kwon Baek, Daejeon (KR); Wooram Shin, Daejeon (KR); Kwang Jae Lim, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,411

(22) Filed: Aug. 13, 2019

(65) Prior Publication Data

US 2019/0373628 A1 Dec. 5, 2019

Related U.S. Application Data

(63) Continuation of application No. 15/094,864, filed on Apr. 8, 2016, now Pat. No. 10,448,420.

(30) Foreign Application Priority Data

| Apr. 10, 2015 | (KR) | 10-2015-0051183 |
| May 14, 2015 | (KR) | 10-2015-0067523 |
| Sep. 24, 2015 | (KR) | 10-2015-0135929 |
| Apr. 8, 2016 | (KR) | 10-2016-0043618 |

(51) Int. Cl.
*H04W 4/00* (2018.01)
*H04W 72/12* (2009.01)
*H04W 74/08* (2009.01)

(52) U.S. Cl.
CPC .... *H04W 72/1289* (2013.01); *H04W 72/1268* (2013.01); *H04W 74/0808* (2013.01)

(58) Field of Classification Search
CPC ......... H04W 72/1268; H04W 72/1289; H04W 74/0808
See application file for complete search history.

(56) References Cited

U.S. PATENT DOCUMENTS

| 8,451,751 B2 | 5/2013 | Challapali et al. |
| 2010/0265901 A1* | 10/2010 | Koo ...................... H04L 5/0023 370/329 |

(Continued)

FOREIGN PATENT DOCUMENTS

| KR | 1020140031203 A | 3/2014 |
| KR | 1020140073468 A | 6/2014 |

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.1.0 Dec. 2012, pp. 1-108.

(Continued)

*Primary Examiner* — Bo Hui A Zhu
(74) *Attorney, Agent, or Firm* — William Park & Associates Ltd.

(57) ABSTRACT

A method and an apparatus for allocating uplink resources includes transmitting an uplink grant (UL Grant) for an unlicensed component carrier (UCC) to a plurality of terminals, wherein the UL Grant for a first terminal among the plurality of terminals includes a resource allocation information in which a transmission timing of the uplink data of a second terminal among the plurality of terminals is considered.

5 Claims, 80 Drawing Sheets

(56) References Cited

U.S. PATENT DOCUMENTS

| | | |
|---|---|---|
| 2012/0195292 A1 | 8/2012 | Ko et al. |
| 2012/0320842 A1 | 12/2012 | Jeong et al. |
| 2013/0121130 A1 | 5/2013 | Ko et al. |
| 2013/0188506 A1 | 7/2013 | Cheong et al. |
| 2013/0336180 A1 | 12/2013 | Park et al. |
| 2014/0043955 A1 | 2/2014 | Ko et al. |
| 2014/0079015 A1 | 3/2014 | Kim et al. |
| 2015/0023315 A1 | 1/2015 | Yerramalli et al. |
| 2015/0078222 A1 | 3/2015 | Yang et al. |
| 2015/0124771 A1 | 5/2015 | Ko et al. |
| 2016/0073344 A1 | 3/2016 | Vutukuri et al. |
| 2016/0142920 A1 | 5/2016 | Suzuki et al. |
| 2016/0302225 A1 | 10/2016 | Damnjanovic et al. |
| 2016/0330011 A1 | 11/2016 | Lee et al. |
| 2018/0124611 A1 | 5/2018 | Moon et al. |

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.1.0, Dec. 2012, pp. 1-82.

"3rd Generation Partnership Project; Technical Specification Group Radio Access Network; Evolved Universal Terrestrial Radio Access (E-UTRA); Physical layer procedures (Release 12)," 3GPP TS 36.213 V12.4.0, Dec. 2014, pp. 1-225.

"3rd Generation Partnership Project; Technical Specification Group Radio Access Network; Study on Licensed-Assisted Access to Unlicensed Spectrum; (Release 13)," 3GPP TR 36.889 V03.1, Feb. 2015, pp. 1-44.

"Broadband Radio Access Networks (BRAN); 5 GHz high performance RLAN; Harmonized EN covering the essential requirements of article 3.2 of the R&TTE Directive," ETSI EN 301 893 V1.8.0, Jan. 2015, pp. 1-91.

"Discussion on the UL LBT for LAA," 3GPP TSG RAN WG1 Meeting #81, R1-153001, May 25-29, 2015, pp. 1-9.

"Discussion on the UL timing for LAA," 3GPP TSG RAN WG1 Meeting #81, R1-153000, May 25-29, 2015, pp. 1-9.

"Discussion on the UL transmission for LAA and the potential solution thereof," 3GPP TSG RAN WG1 Meeting #80-bis, R1-152094, Apr. 20-24, 2015, pp. 1-6.

"Study on Licensed-Assisted Access to Unlicensed Spectrum," 3GPP TSG RAN Meeting #66, RP-141817, Dec. 8-11, 2014, pp. 1-8.

\* cited by examiner

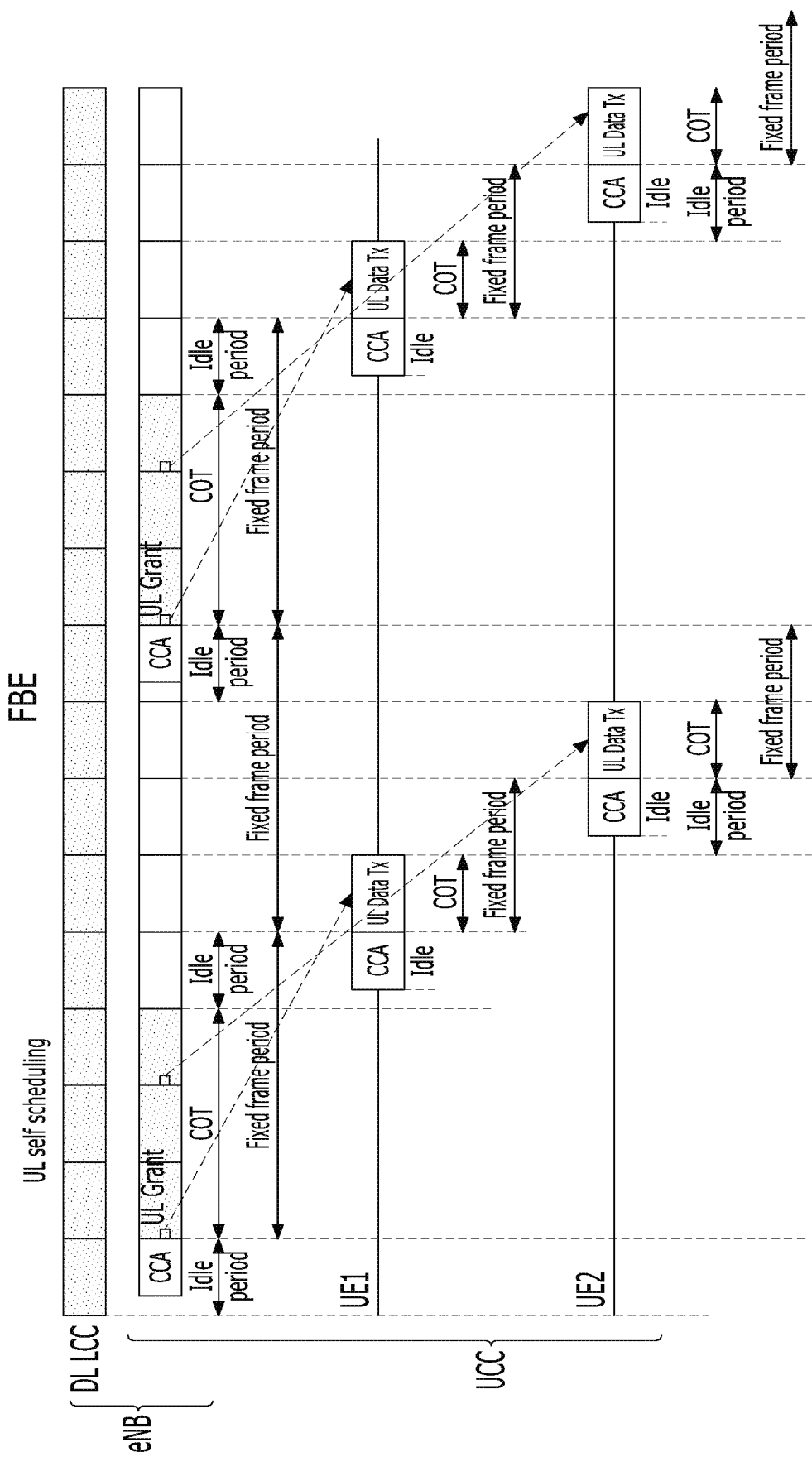

FIG. 26

| No. | Possible frame configuration (COT=4) | | | | | CCA | | | | |
|---|---|---|---|---|---|---|---|---|---|---|
| | n+0 | n+1 | n+2 | n+3 | | n+4 | n+5 | n+6 | n+7 | |
| 0 | DL+UL | UL | UL | UL | | DL+UL | UL | UL | UL | |
| 1 | DL | DL+UL | UL | UL | | DL | DL+UL | UL | UL | |
| 2 | DL | DL | DL+UL | UL | | DL | DL | DL+UL | UL | |
| 3 | DL | DL | DL | DL+UL | | DL | DL | DL | DL+UL | |
| 4 | DL | DL | DL | DL | | UL | UL | UL | UL | |

FIG. 27

UL timing after UL grant (COT=4)

| UL Grant | n+0 | n+1 | n+2 | n+3 |
|---|---|---|---|---|
| Tx for conf.0 | 5 | - | - | - |
| Tx for conf.1 | 6 | 7 | - | - |
| Tx for conf.2 | 7 | 6 | 5 | - |
| Tx for conf.3 | 7 | 6 | 5 | 4 |
| Tx for conf.4 | 4 | 4 | 4 | 4 |

| UL timing after UL grant (COT=4) | | | | | | | | |
|---|---|---|---|---|---|---|---|---|
| UL Grant | n+0 | n+1 | n+2 | n+3 | n+4 | n+5 | n+6 | n+7 |
| Tx for conf.0 | 4 | - | - | - | - | 4 | 4 | 4 |
| Tx for conf.1 | 4 | 4 | - | - | - | - | 4 | 4 |
| Tx for conf.2 | 4 | 4 | 4 | - | - | - | - | 4 |
| Tx for conf.3 | 4 | 4 | 4 | 4 | - | - | - | - |

UL timing after UL grant (COT=10)

| UL Grant | n+0 | n+1 | n+2 | n+3 | n+4 | n+5 | n+6 | n+7 | n+8 | n+9 |
|---|---|---|---|---|---|---|---|---|---|---|
| Tx for conf.0 | 4 | - | - | - | - | - | - | - | - | - |
| Tx for conf.1 | 4 | 4 | - | - | - | - | - | - | - | - |
| Tx for conf.2 | 4 | 4 | 4 | - | - | - | - | - | - | - |
| Tx for conf.3 | 4 | 4 | 4 | 4 | - | - | - | - | - | - |
| Tx for conf.4 | 4 or 5 | 4 | 4 | 4 | 4 | - | - | - | - | - |
| Tx for conf.5 | 5 or 6 | 4 | 4 | 4 | 4 | 4 | - | - | - | - |
| Tx for conf.6 | 6 or 7 | 5 | 4 | 4 | 4 | 4 | 4 | - | - | - |
| Tx for conf.7 | 7 or 8 | 6 | 5 | 5 | 4 | 4 | 4 | - | - | - |
| Tx for conf.8 | 8 or 9 | 7 | 6 | 7 | 4 | 4 | 10 | 10 | - | - |
| Tx for conf.9 | 9 or 10 | 9 | 8 | 7 | 6 | 5 | 11 | 11 | 10 | - |
| Tx for conf.10 | 10 | 9 | 8 | 7 | 6 | 5 | 12 | 4 | 4 | 4 |

UL timing after UL grant (COT=4)

| UL Grant | n+0 | n+1 | n+2 | n+3 | n+4 | n+5 | n+6 | n+7 |
|---|---|---|---|---|---|---|---|---|
| Tx for conf.0 | 4 | - | - | - | - | 4 | 4 | 4 |
| Tx for conf.1 | 4 | 4 | - | - | - | - | 4 | 4 |
| Tx for conf.2 | 4 | 4 | 4 | - | - | - | - | 4 |
| Tx for conf.3 | 4 | 4 | 4 | 4 | - | - | - | - |

UL timing after UL grant (COT=10)

| UL Grant | n+0 | n+1 | n+2 | n+3 | n+4 | n+5 | n+6 | n+7 | n+8 | n+9 |
|---|---|---|---|---|---|---|---|---|---|---|
| Tx for conf.0 | 4 | - | - | - | - | 4 | 4 | 4 | 4 | - |
| Tx for conf.1 | 4 | 4 | - | - | - | - | 4 | 4 | 4 | 4 |
| Tx for conf.2 | 4 | 4 | 4 | - | - | - | - | 4 | 4 | 4 |
| Tx for conf.3 | 4 | 4 | 4 | 4 | - | - | - | - | 4 | 4 |
| Tx for conf.4 | - | 4 | 4 | 4 | 4 | - | - | - | - | 4 |
| Tx for conf.5 | - | - | 4 | 4 | 4 | 4 | - | - | - | - |
| Tx for conf.6 | - | - | - | 4 | 4 | 4 | 4 | - | - | - |
| Tx for conf.7 | - | - | - | - | 4 | 4 | 4 | 4 | - | - |

METHOD AND APPARATUS FOR ALLOCATING UPLINK RESOURCES

CROSS-REFERENCE TO RELATED APPLICATION

This application is a continuation application of U.S. patent application Ser. No. 15/094,864, filed on Apr. 8, 2016, and claims priority to and the benefit of Korean Patent Application Nos. 10-2015-0051183, 10-2015-0067523, 10-2015-0135929 and 10-2016-0043618 filed in the Korean Intellectual Property Office on Apr. 10, 2015, May 14, 2015, Sep. 24, 2015, and Apr. 8, 2016, the entire contents of which are incorporated herein by reference.

BACKGROUND OF THE INVENTION

(a) Field of the Invention

The present invention relates to an apparatus and a method for allocating uplink resources for transmission of uplink data.

(b) Description of the Related Art

In accordance with an increase in Internet users using a mobile communication system, mobile communications carriers are seeking an efficient method for increasing capacity of the mobile communication system. The most efficient and intuitive method for increasing capacity of the mobile communication system is to increase a bandwidth by additionally securing a frequency of a licensed band for the mobile communication system. The mobile communication carrier may efficiently provide a mobile communication service by exclusively using the secured licensed band frequency, but there is a disadvantage that it costs a lot to license and use the frequency of the licensed band, and the frequency of the licensed band allocated for the mobile communication system is limited. Accordingly, a method for providing the mobile communication system using a frequency of an unlicensed band, a frequency of a TV white space (TVWS), or a frequency of a licensed/unlicensed band (hereinafter, referred to as 'an unlicensed band') shared by the mobile communication carriers in which a lot of relatively available frequency bands exist and costs are also inexpensive has been considered.

A communication system using the frequency of the unlicensed band has the following limits.

First, in order to minimize an influence on another system sharing the unlicensed band, transmission power is limited. Therefore, in the case in which a licensed band system and an unlicensed band system are deployed on the same place, a coverage hole may occur in the unlicensed band system, unlike the licensed band system.

In addition, for a fair coexisting with a neighboring unlicensed band system, the frequency of the unlicensed band should be discontinuously or randomly used. As a result, transmission reliability of a control channel, a common channel, and the like used in the mobile communication system may be decreased. Further, a regulation on the frequency of the unlicensed band should be obeyed.

For example, in order to transmit data, a system using the unlicensed band may perform a clear channel assessment (CCA) to search a channel in frequency resources and determine whether or not the channel is used depending on the result of CCA, and even though a specific device occupies the channel depending on the result of CCA, a channel occupancy time may be limited according to a frequency regulation. Further, the specific device may not occupy the channel during a time exceeding a maximum channel occupancy time, and needs to additionally perform the CCA in order to re-occupy the channel.

Due to the limit of the unlicensed band system described above, rather than a standalone system that uses only the unlicensed band, a scenario in which the unlicensed band supplements mutually with the licensed band system has been examined. In this scenario, control functions that require reliability such as a terminal control, a mobility management, and the like are performed in the licensed band, and traffic functions such as an increase in wireless transmission speed, a wireless traffic load distribution, and the like may be supplemented by the unlicensed band system.

That is, the system or carrier operated in the licensed band performs the control and traffic functions, and the system or carrier operated in the unlicensed band frequency performs the traffic function. The above-mentioned operation may be implemented by a carrier aggregation (CA) technology. For example, examples of a CA configuration of 3GPP LTE include a CA between an FDD carrier of the unlicensed band and a carrier of the licensed band (i.e., LTE), a TDD carrier of the unlicensed band in which both uplink/downlink are operated and a carrier of the licensed band, and the like.

The cellular system using the unlicensed band has an advantage that it may provide the mobile communication service of which service quality is guaranteed by utilizing inexpensive and rich frequency resources and an advanced interference control technology. However, in order to secure the above-mentioned advantages while conforming to a variety of regulations of the unlicensed band and coexisting with other unlicensed band systems, new coexistence technology and interference control technology are required. Particularly, due to characteristics of the unlicensed band, the device operated in the unlicensed band occupies/uses the channel, and in this case, in the case in which the carrier aggregation technology is applied, the carrier aggregation technology that considers characteristics of the licensed band and the unlicensed band, and an operation method thereof are required. In addition, by reflecting limits (characteristics) for operating the device of the unlicensed band, a reliable wireless transmission service equivalent to an existing cellular system should be provided.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment has been made in an effort to provide a method for allocating uplink resources of an unlicensed band by considering data transmission of a plurality of terminals. Another exemplary embodiment has been made in an effort to provide an apparatus for allocating uplink resources of an unlicensed band by considering data transmission of a plurality of terminals.

An exemplary embodiment provides a method for allocating resources for uplink data, the method including: transmitting an uplink grant (UL Grant) for an unlicensed component carrier (UCC) to a plurality of terminals, wherein the UL Grant for a first terminal among the plurality of terminals includes a resource allocation information in which a transmission timing of the uplink data of a second terminal among the plurality of terminals is considered.

The UL Grant for the first terminal may include the resource allocation information allowing the first terminal to perform a clear channel assessment (CCA) after the second terminal transmits the uplink data.

The UL Grant for the first terminal may include the resource allocation information allowing the first terminal to transmit the uplink data after the second terminal transmits the uplink data.

The transmitting of the UL Grant may include: transmitting the UL Grant to the plurality of terminals through a licensed component carrier (LCC).

Before the transmitting of the UL Grant, performing a clear channel assessment (CCA) in an unlicensed band, the transmitting of the UL Grant may include: transmitting the UL Grant to the plurality of terminals through the UCC, when a channel of the unlicensed band is occupied by the CCA.

The UL Grant may include the resource allocation information allowing the uplink data to be transmitted through the channel of the unlicensed band occupied by the CCA.

The method may further include transmitting a special signal for preventing other devices from occupying the channel when the channel of the unlicensed band is occupied by the CCA.

The UL Grant may include a physical uplink shared channel (PUSCH) format in which a transmission starting point and a transmission ending point of the UL Grant are defined in a subframe unit, a slot unit, or a symbol unit.

Another exemplary embodiment provides method for transmitting uplink data, the method including: receiving an uplink grant (UL Grant) for an unlicensed component carrier (UCC) from a base station; performing a clear channel assessment (CCA) in a previous subframe before a subframe for the uplink data transmission which is indicated by the UL grant; and transmitting the uplink data through the UCC when the channel of the UCC is occupied by the CCA.

The transmitting of the uplink data may include transmitting a special signal for preventing other devices from occupying the channel.

The transmitting of the uplink data may include transmitting the uplink data without the CCA in a next subframe of the subframe in which the uplink data is transmitted when a resource for the uplink data is successively allocated according to the UL grant.

The performing of the CCA may include randomly selecting a slot for the CCA from among a plurality of slots in the previous subframe; and performing the CCA in the selected slot.

The transmitting of the uplink data may include transmitting the uplink data through a portion of symbol or slot included in the subframe for the uplink data.

The method may further include transmitting no uplink data when the special signal is received from the base station or another terminal.

Another exemplary embodiment provides a base station including: at least one processor; a memory, and a radio frequency (RF) unit, wherein at least one processor executes at least one program stored in the memory to perform an operation of transmitting an uplink grant (UL Grant) for an unlicensed component carrier (UCC) to a plurality of terminals, and the UL Grant for a first terminal among the plurality of terminals includes a resource allocation information in which a transmission timing of the uplink data of a second terminal among the plurality of terminals is considered.

The UL Grant for the first terminal may include the resource allocation information allowing the first terminal to perform a clear channel assessment (CCA) after the second terminal transmits the uplink data.

The UL Grant for the first terminal may include the resource allocation information allowing the first terminal to transmit the uplink data after the second terminal transmits the uplink data.

When at least one processor performs the operation of transmitting the UL Grant, at least one processor may perform an operation of transmitting the UL Grant to the plurality of terminals through a licensed component carrier (LCC).

Before at least one processor performs the operation of transmitting the UL Grant, at least one processor may further perform an operation of performing a clear channel assessment (CCA) in an unlicensed band, and when at least one processor performs the operation of transmitting the UL Grant, at least one processor performs an operation of transmitting the UL Grant to the plurality of terminals through the UCC, when a channel of the unlicensed band is occupied by the CCA.

At least one processor may execute at least one program stored in the memory to further perform an operation of transmitting a special signal for preventing other devices from occupying the channel when the channel of the unlicensed band is occupied by the CCA.

BRIEF DESCRIPTION OF THE DRAWINGS

FIGS. 6A and 6B are schematic views illustrating a method for allocating uplink resources so that uplink schedulings of a plurality of terminals do not overlap with each other according to still another exemplary embodiment.

FIG. 26 is a view illustrating a possible uplink/downlink subframe configuration according to an exemplary embodiment.

FIG. 27 is a view illustrating a transmission timing of uplink data of the uplink/downlink subframe configuration according to FIG. 26.

FIG. 28 is a view illustrating a possible uplink/downlink subframe configuration according to another exemplary embodiment.

FIG. 29 is a view illustrating a transmission timing of uplink data of the uplink/downlink subframe configuration according to FIG. 28.

FIG. 30 is a view illustrating a possible uplink/downlink subframe configuration according to still another exemplary embodiment.

FIG. 31 is a view illustrating a transmission timing of uplink data of the uplink/downlink subframe configuration according to FIG. 30.

FIG. 32 is a view illustrating a possible uplink/downlink subframe configuration according to still another exemplary embodiment.

FIG. 33 is a view illustrating a transmission timing of uplink data of the uplink/downlink subframe configuration according to FIG. 32.

FIG. 34 is a view illustrating a possible uplink/downlink subframe configuration according to still another exemplary embodiment.

FIG. 35 is a view illustrating a transmission timing of uplink data of the uplink/downlink subframe configuration according to FIG. 34.

DETAILED DESCRIPTION OF THE EMBODIMENTS

Figure 1A:
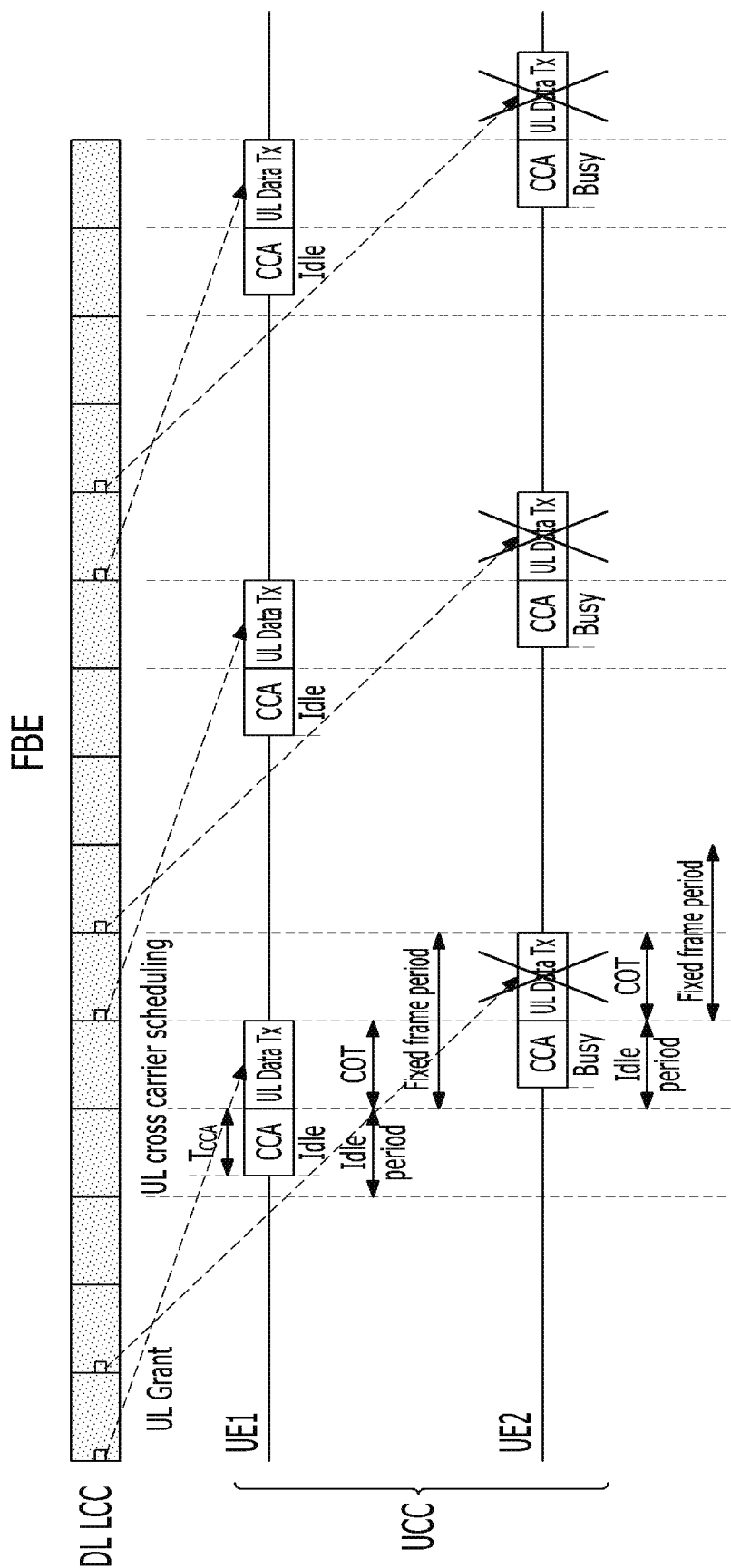
FIGS. 1A and 1B are schematic views illustrating a method for allocating uplink resources of an unlicensed band in a licensed band at the time of a cross-carrier scheduling.

Hereinafter, exemplary embodiments will be described in detail with reference to the accompanying drawings so that those skilled in the art may easily practice the present invention. However, the present invention may be implemented in various different ways and is not limited to the exemplary embodiments provided in the present description. In the accompanying drawings, portions unrelated to the description will be omitted in order to obviously describe the present invention, and similar reference numerals will be used to describe similar portions throughout the present specification.

Throughout the specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, and the like, and may include functions of all or some of the MT, MS, AMS, HR-MS, SS, PSS, AT, UE, and the like.

In addition, a base station (BS) may represent an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a relay node (RN) serving as the base station, an advanced relay station (ARS) serving as the base station, a high reliability relay station (HR-RS) serving as the base station, a small base station [femto base station (BS), a home node B (HNB), a home eNodeB (HeNB), a pico BS, a macro BS, a micro BS, or the like], or the like, and may include all or some of the functions of the ABS, the nodeB, the eNodeB, the AP, the RAS, the BTS, the MMR-BS, the RS, the RN, the ARS, the HR-RS, the small base station, and the like.

Figure 1B:
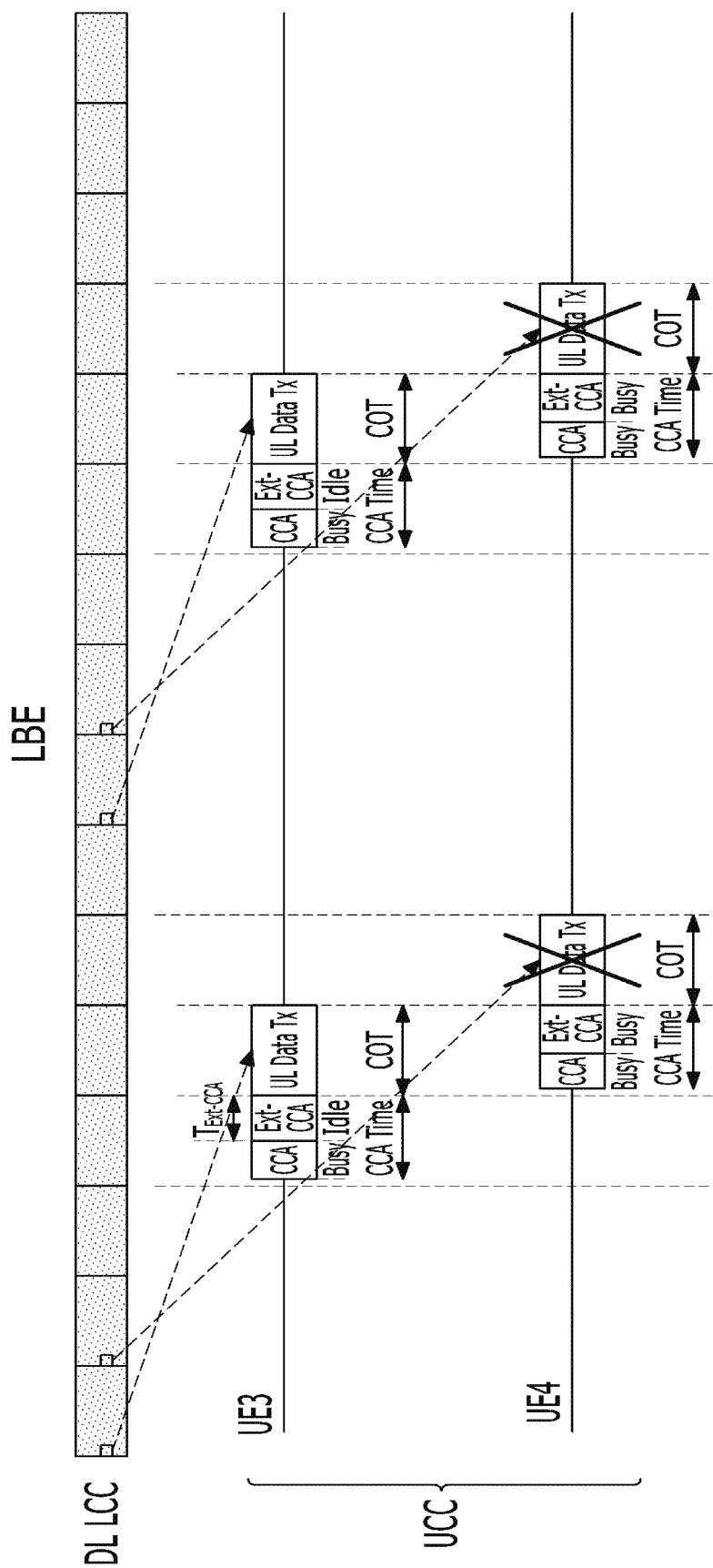
Figure 2A:
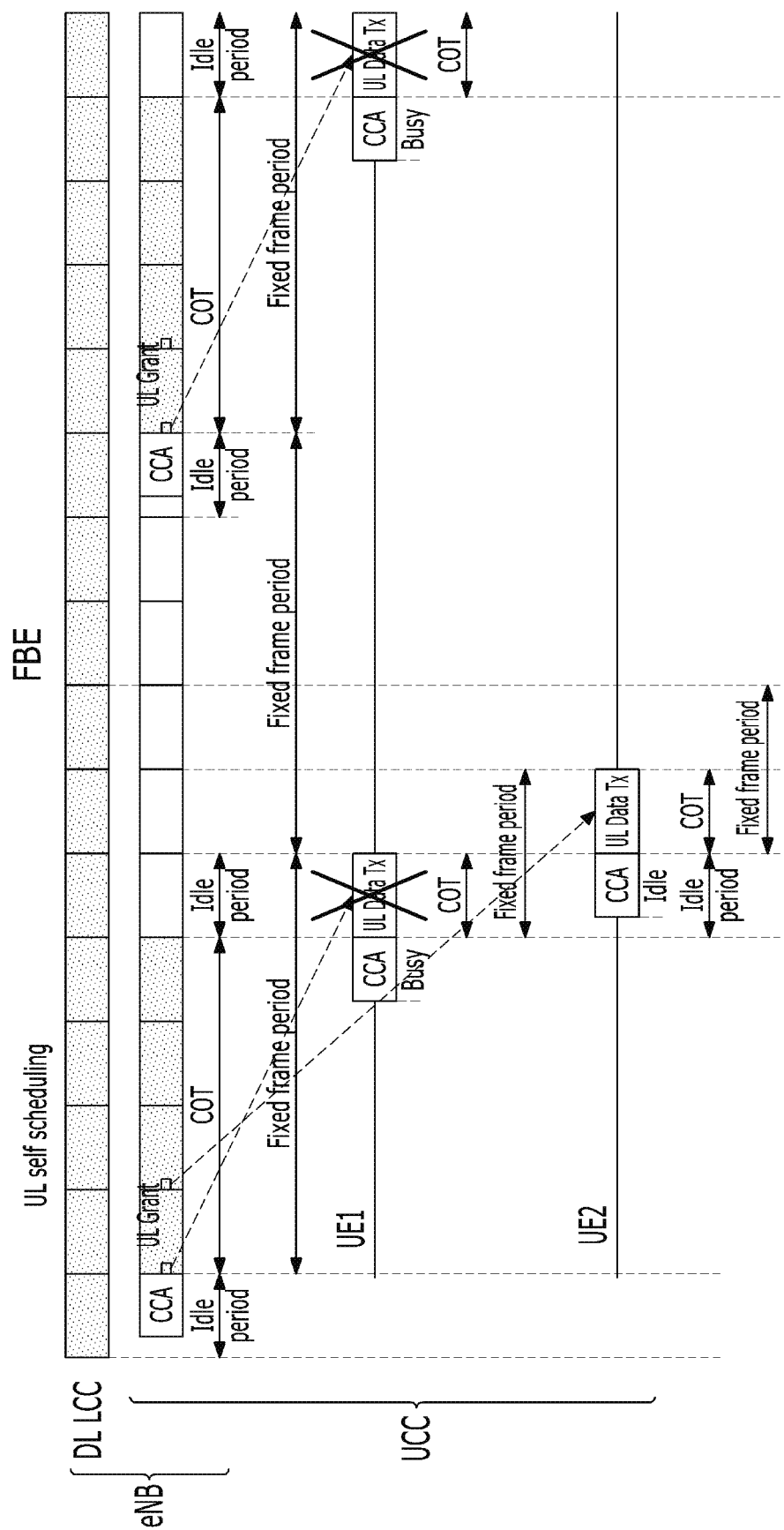
FIGS. 2A and 2B are schematic views illustrating a method for allocating uplink resources of an unlicensed band at the time of a self scheduling.
Figure 2B:
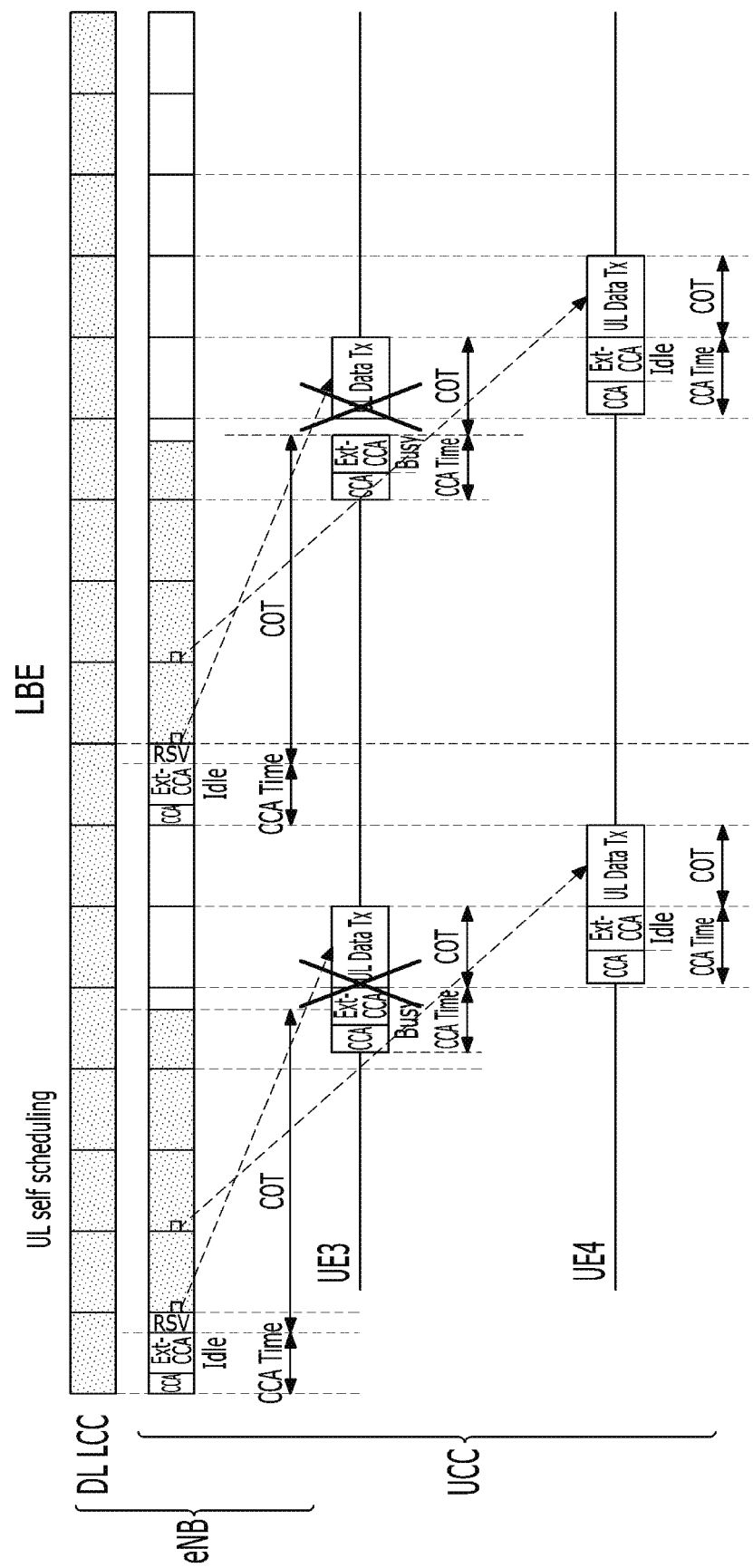

FIGS. 1A and 1B are schematic views illustrating a method for allocating uplink resources of an unlicensed band in a licensed band at the time of a cross-carrier scheduling, and FIGS. 2A and 2B are schematic views illustrating a method for allocating uplink resources of an unlicensed band at the time of a self scheduling.

FIGS. 1A and 2A are schematic views illustrating a method for allocating resources of an unlicensed band of a frame based equipment (FBE), and FIGS. 1B and 2B are schematic views illustrating a method for allocating resources of an unlicensed band of a load based equipment (LBE). The FBE and the LBE are channel access schemes defined by ETSI EN301.893, 3GPP TR36.889 specification, a basic operation thereof applies a method described in the specification, and it is assumed in an exemplary embodiment that a channel occupancy time is 4 ms. A cross-carrier scheduling refers to a scheduling scheme in which a base station transmits an uplink (UL) grant for an unlicensed component carrier (UCC) to a terminal through a licensed component carrier (LCC). In addition, a self scheduling refers to a scheduling scheme in which the base station transmits the UL grant for the UCC to the terminal through the same UCC.

Referring to FIGS. 1A and 1B, the base station allocates (UL grants) resources to the terminal through the cross-carrier scheduling. In addition, a UE2 and a UE4 are scheduled to transmit the UL grant in a primary cell (PCell) and transmit data to the base station at a timing after four subframes (based on an FDD). Here, in the case in which the PCell is operated in a TDD, an uplink scheduling timing of the terminal may be four to seven subframes depending on an uplink/downlink (UL/DL) configuration. However, if another terminal (UE1) has already been occupying a channel when UE2 and the UE4 perform the CCA for transmitting data at a scheduled timing, since the UE2 determines that the channel is occupied (or used) as the result of CCA, the UE2 may not transmit the data at the scheduled timing. In this case, another terminal may be another device operated in the unlicensed band such as the base station or WiFi. Similarly, a similar problem may also occur in FIGS. 2A and 2B illustrating a case of the self-scheduling.

Figure 3A:
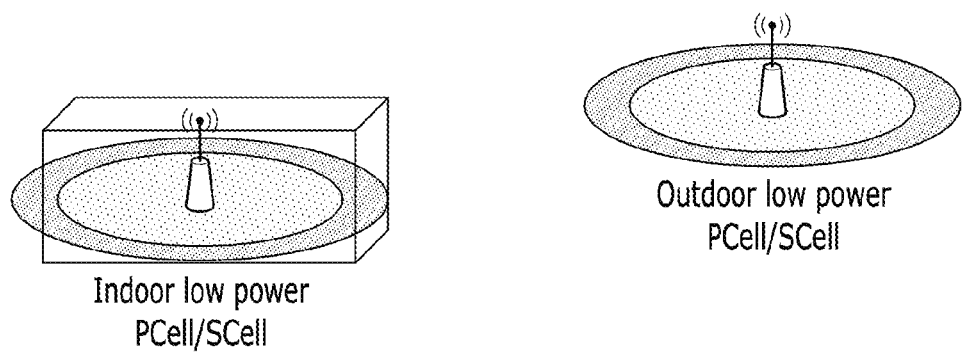
FIGS. 3A to 3C are layout views illustrating a mobile communication system in which an UCC is set and operated.
Figure 3B:
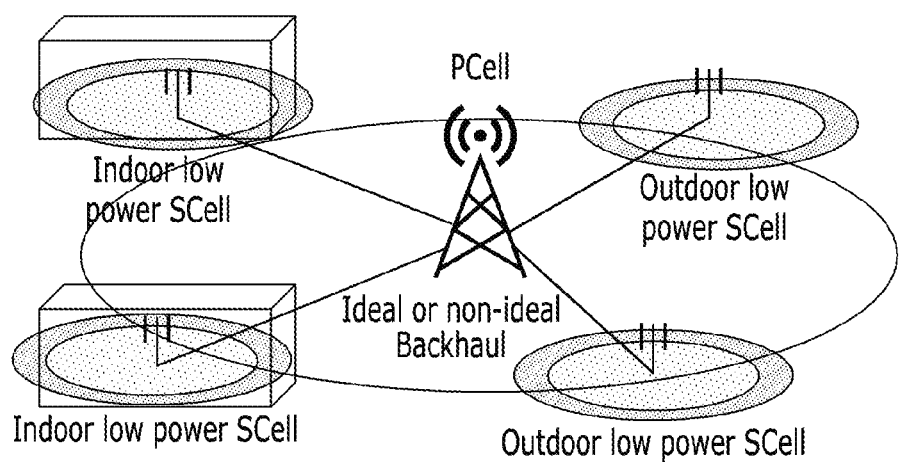
Figure 3C:
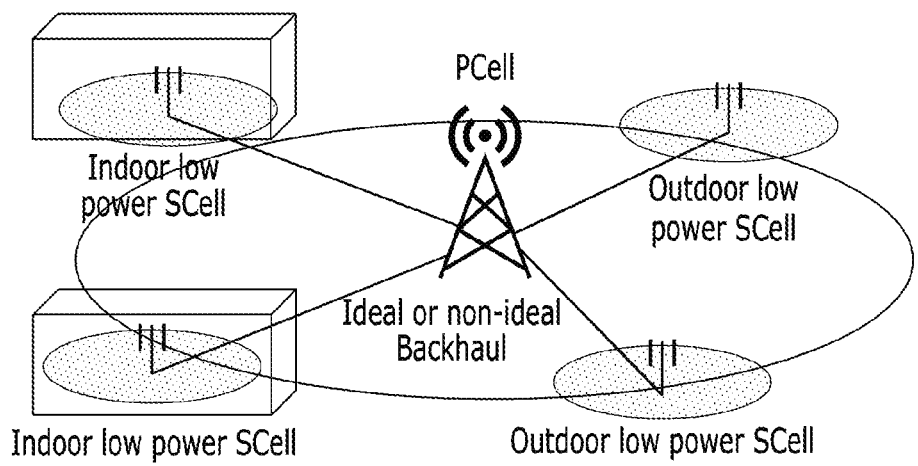

FIGS. 3A to 3C are layout views illustrating a mobile communication system in which an UCC is configured and operated.

Referring to FIG. 3A, indoor and outdoor low power cells in which the LCC and the UCC are operated in one cell are illustrated. In each of the cases, the PCell may be a macro cell, and a secondary cell (SCell) may also be co-located with the PCell and may also be non-co-located with the PCell.

Referring to FIG. 3B, the PCell in which the LCC is operated, and the (low power) SCell in which the LCC and the UCC are operated are illustrated. The respective SCells in which the LCC and the UCC are operated may be disposed at an indoor and an outdoor. The PCell may be a macro cell or a small cell, and the SCell in which the LCC is operated and the SCell in which the UCC is operated may be co-located with each other or may be non-co-located with each other.

Referring to FIG. 3C, the PCell in which the LCC is operated and the (low power) SCell in which the UCC is operated are illustrated. The SCell in which the UCC is operated may be disposed at an indoor and an outdoor, and the PCell in which the LCC is operated may be the macro cell or the small cell.

Hereinafter, a method for scheduling uplink resources in a case in which the terminal performs the CCA before transmitting the data will be first described.

Figure 4A:
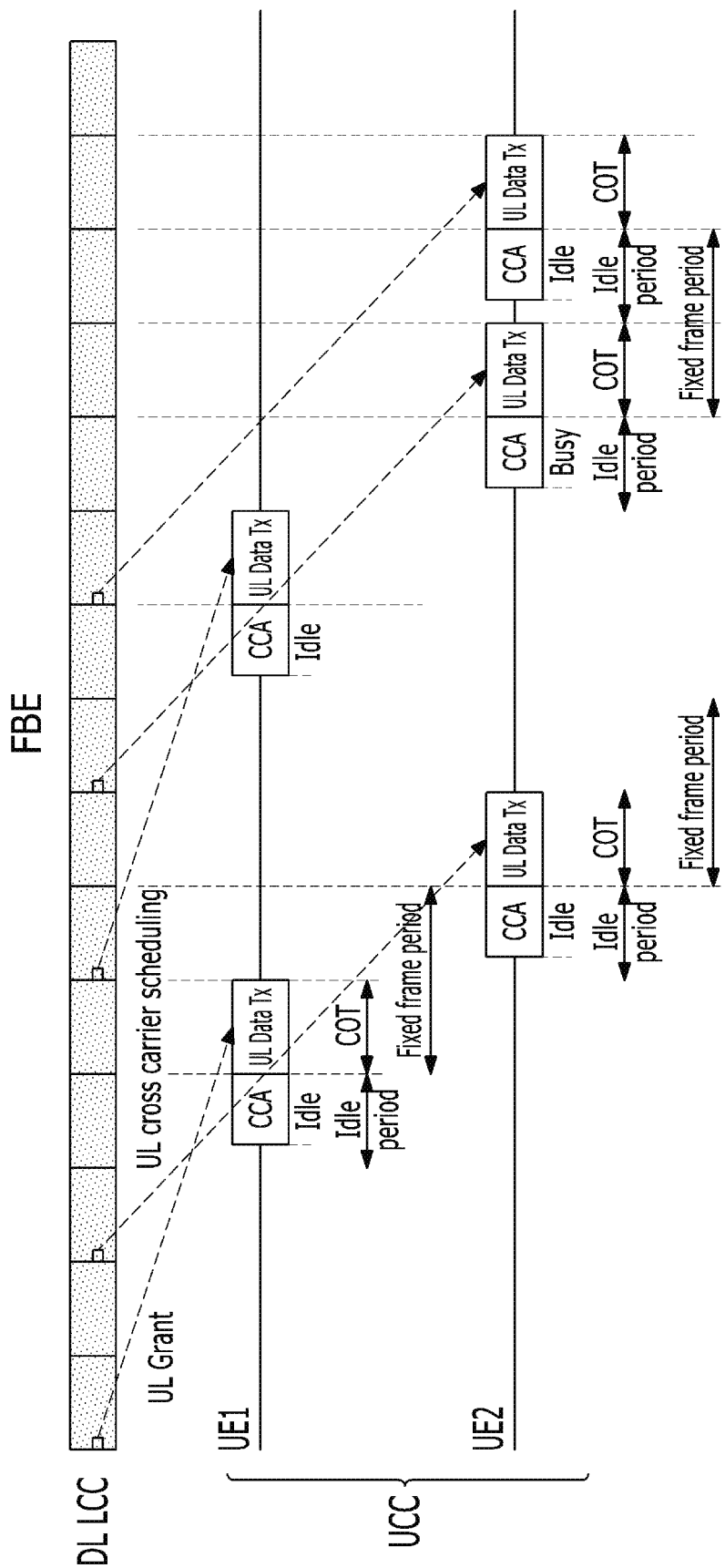
FIGS. 4A and 4B are schematic views illustrating a method for allocating uplink resources so that uplink schedulings of a plurality of terminals do not overlap with each other according to an exemplary embodiment.
Figure 4B:
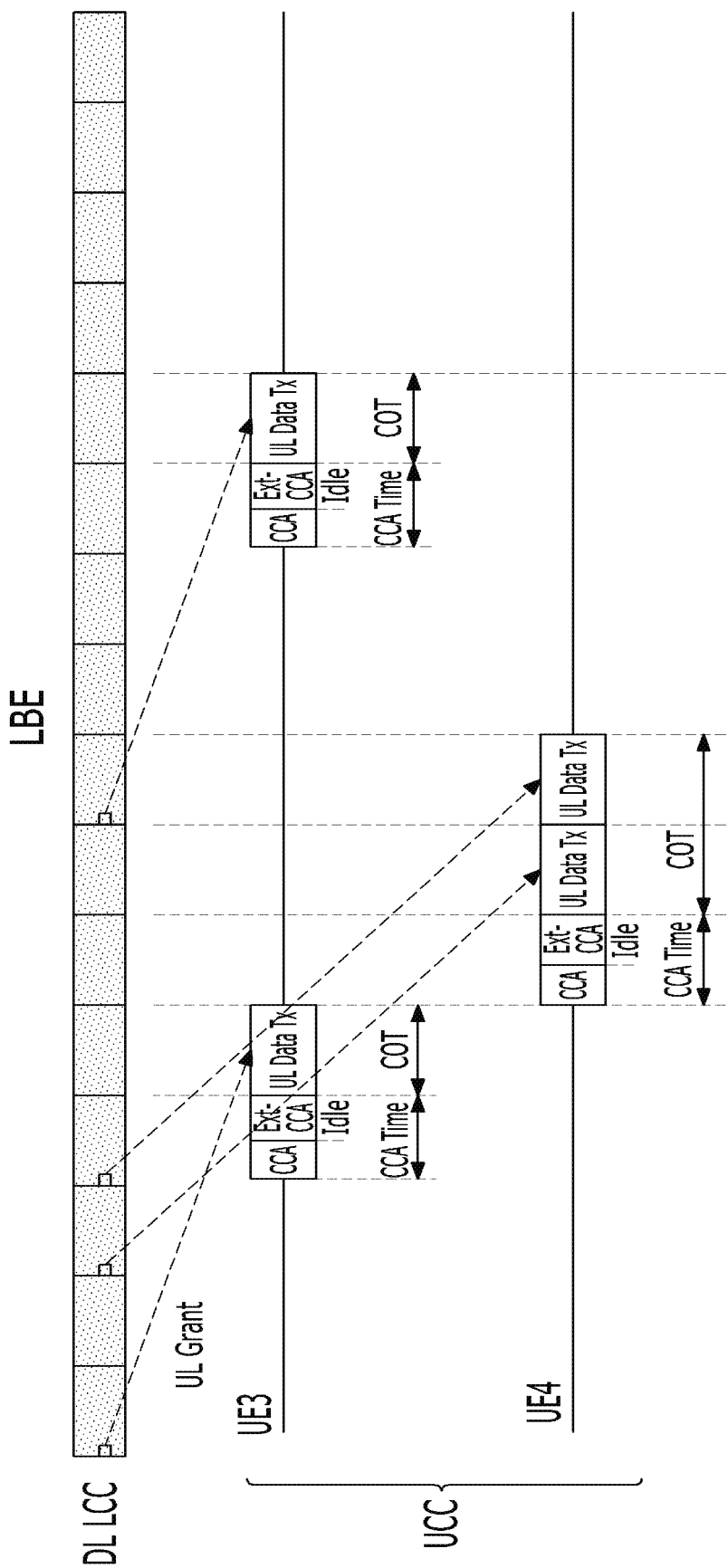

FIGS. 4A and 4B are schematic views illustrating a method for allocating uplink resources so that uplink schedulings of a plurality of terminals do not overlap with each other according to an exemplary embodiment.

In FIGS. 4A and 4B, the uplink resources are allocated by the cross-carrier scheduling, and in order for the terminal to transmit uplink data using the resources allocated by the base station, the terminal performs the CCA and may transmit the data in the case in which a resource occupancy is possible(idle).

Referring to FIG. 4A (FBE), the UE2 is allocated with the uplink resources so as not to perform the CCA for a data transmission at a timing at which the UE1 transmits the data. Therefore, performing CCA and occupying the channel by the UE1 when the UE2 performs the CCA may be prevented.

Referring to FIG. 4B (LBE), the UE4 may perform the CCA (or an extended CCA (Ext-CCA)) at a timing independent from a data transmission timing of the UE3. In addition, since the uplink resources are successively allocated to the UE4 by the cross-carrier scheduling, the UE4 may successively transmit the data through one CCA without an additional CCA.

Figure 5A:
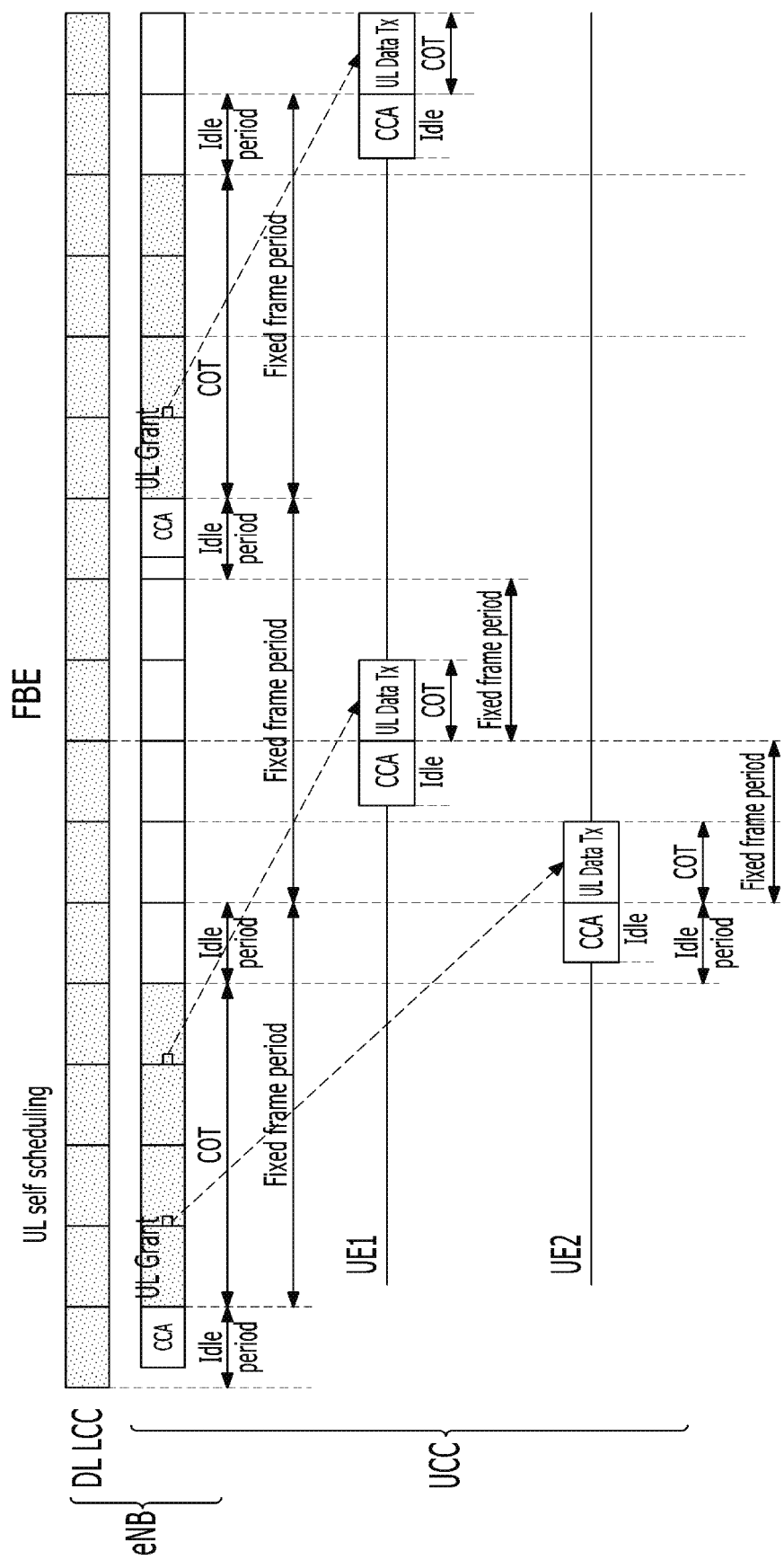
FIGS. 5A and 5B are schematic views illustrating a method for allocating uplink resources so that uplink schedulings of a plurality of terminals do not overlap with each other according to another exemplary embodiment.
Figure 5B:
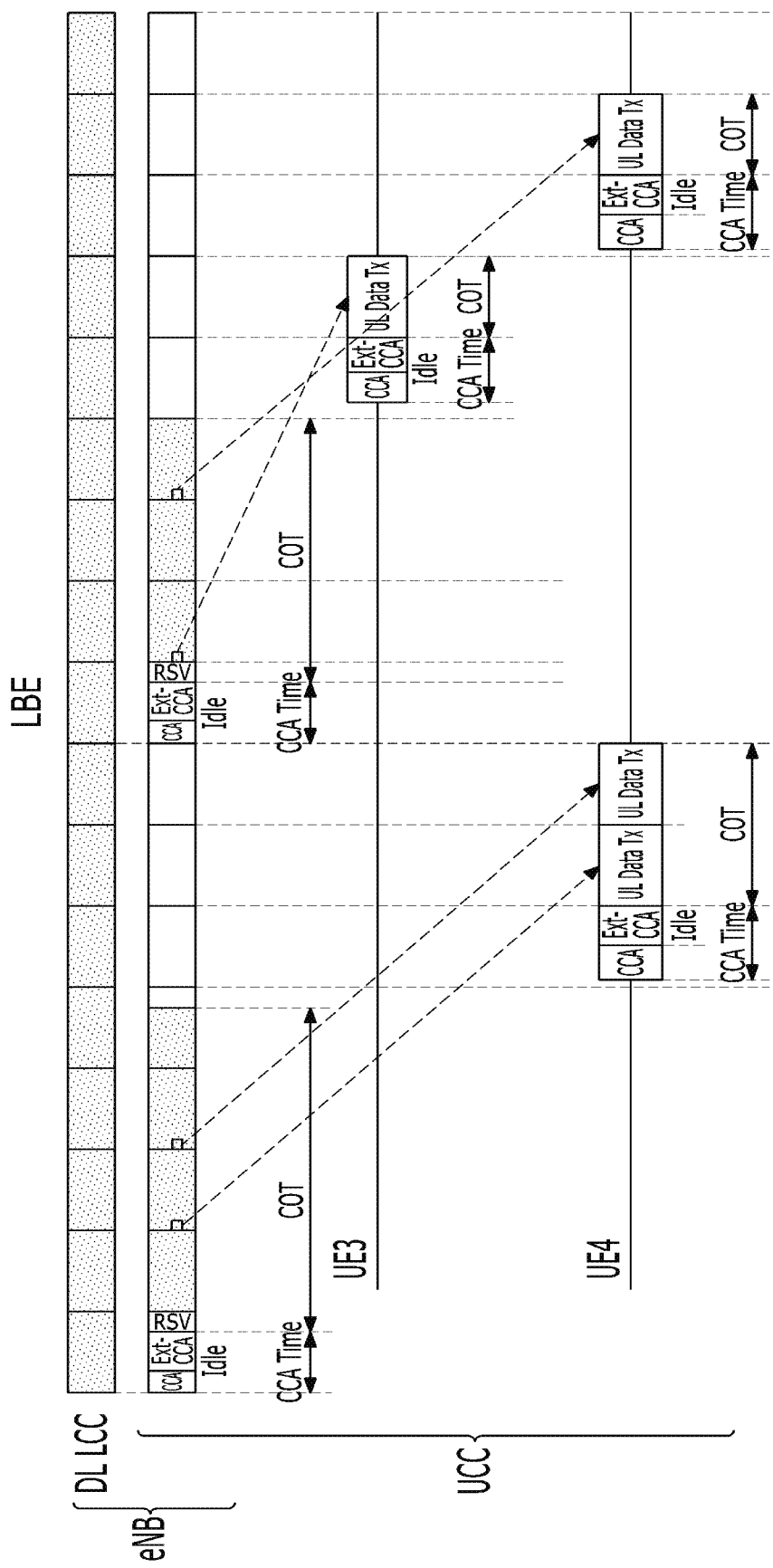

FIGS. 5A and 5B are schematic views illustrating a method for allocating uplink resources so that uplink schedulings of a plurality of terminals do not overlap with each other according to another exemplary embodiment.

In FIGS. 5A and 5B, the uplink resources are allocated by the self scheduling, and the base station performs the CCA to use the channel for allocating the resources to the terminal.

Referring to FIG. 5A (FBE), since the base station performs the CCA at a fixed position (idle period), the uplink resources need to be allocated to the terminal by considering a timing at which the terminal transmits the data. In FIG. 5A, the UE1 performs the CCA in a next subframe of a subframe in which an uplink data transmission (UL data Tx) of the UE2 occurs. Meanwhile, referring to FIG. 5B (LBE), in the case in which the terminal needs to transmit the data, the base station may relatively determine a timing at which the CCA is performed. Therefore, the base station may elastically adjust the channel occupancy time so that the terminal may again use the channel occupied before the terminal performs the CCA. In addition, in the case in which the resources are successively allocated to the terminal, the terminal may transmit the data by using the resources through one CCA.

Figure 6B:
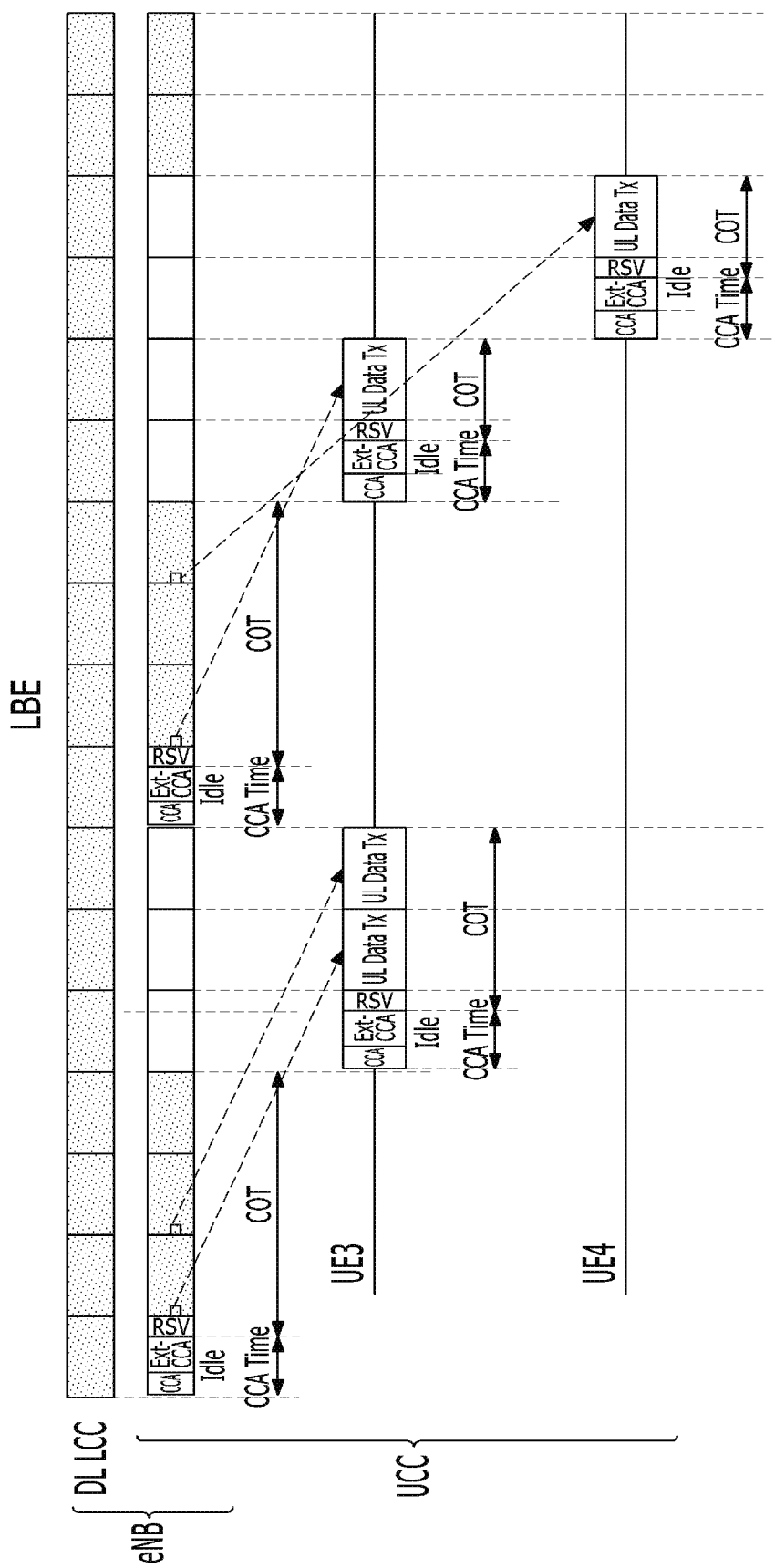

FIGS. 6A and 6B are schematic views illustrating a method for allocating uplink resources so that uplink schedulings of a plurality of terminals do not overlap with each other according to still another exemplary embodiment.

Also in FIGS. 6A and 6B, the base station allocates the uplink resources by the self scheduling, and performs the CCA to use the channel for allocating the resources to the terminal.

Referring to FIG. 6A (FBE), the base station allocates the resources to the terminal by adjusting the channel occupancy time (COT), and the terminal performs the CCA before transmitting the data through the allocated resources. In this case, a first subframe among the COT of the base station of FIGS. 5A and 5B may also be used to allocate the uplink resources in which the UL grant is transmitted. A method for adjusting the COT of the base station of FIG. 6A (for example, according the method, the COT is ended until the uplink data transmission is started through the allocated resource in the case of the UL grant being transmitted on the first subframe) may also be applied to FIG. 6B (LBE).

In addition, referring to FIG. 6B, since a timing of the CCA is not fixed as compared to the FBE, and during the Ext-CCA a CCA slot may be selected randomly for the CCA, an ending timing of the CCA may not be aligned to a transmission unit for the data transmission (e.g., in the case of the LTE, a timing of the subframe). In order to solve the above-mentioned problem, a special signal may be transmitted right before the data is transmitted. The special signal is indicated by 'RSV (reservation)' in FIG. 6B. The special signal may be similar to a signal transmitted at the time of accessing/occupying the channel for a downlink data transmission from the base station. For example, the terminal may use the special signal so that other devices (e.g., WiFi, other base station (eNB), other terminals) operated in the unlicensed band do not access/occupy the channel after the CCA, in order to transmit the data in the resources allocated by the base station for the uplink data transmission. The special signal illustrated in FIG. 6B may also be used for the LBE or the FBE of a case in which the resources are allocated by the cross-carrier scheduling.

Figure 7A:
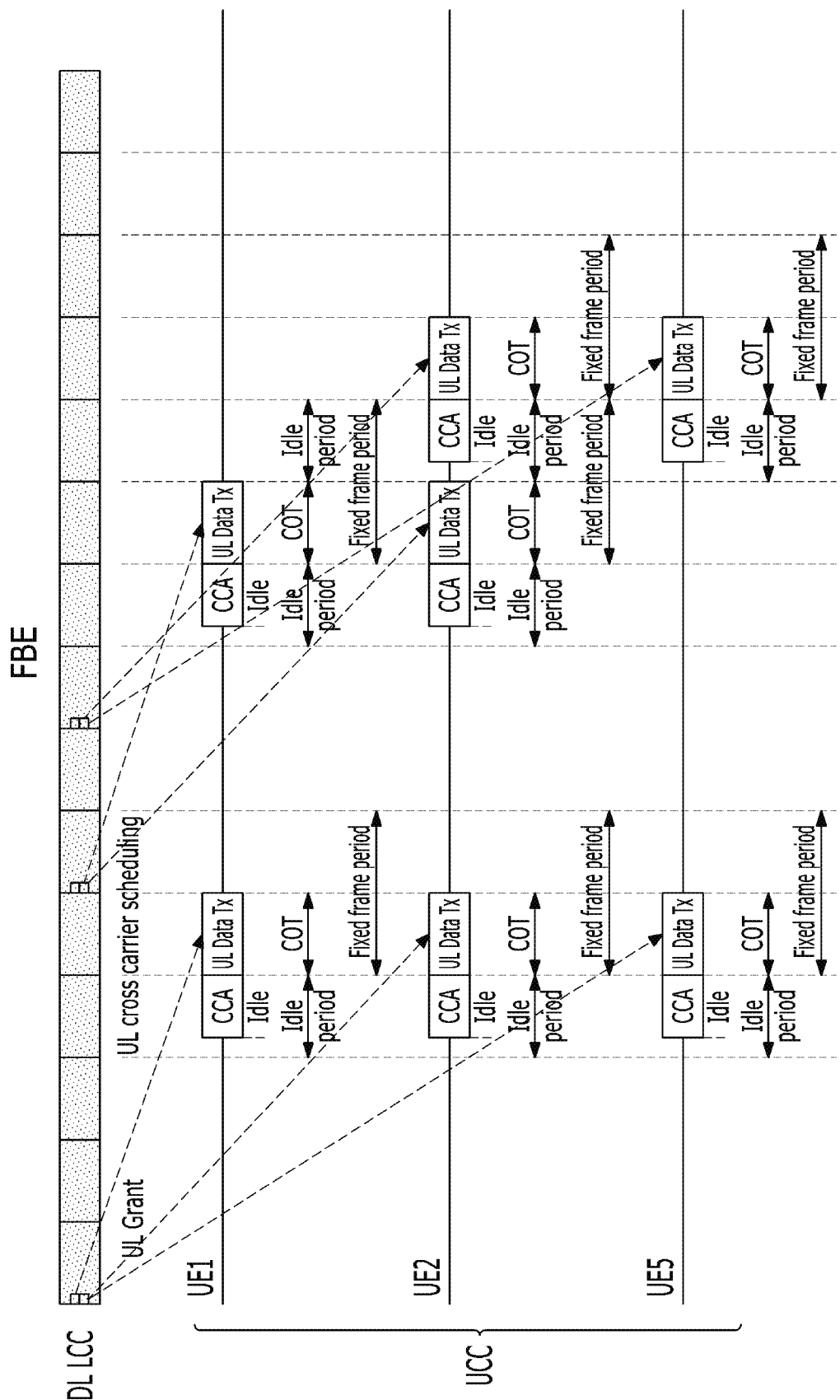
FIGS. 7A and 7B are schematic views illustrating a method for allocating uplink resources so that a plurality of terminals simultaneously transmit data according to an exemplary embodiment.
Figure 7B:
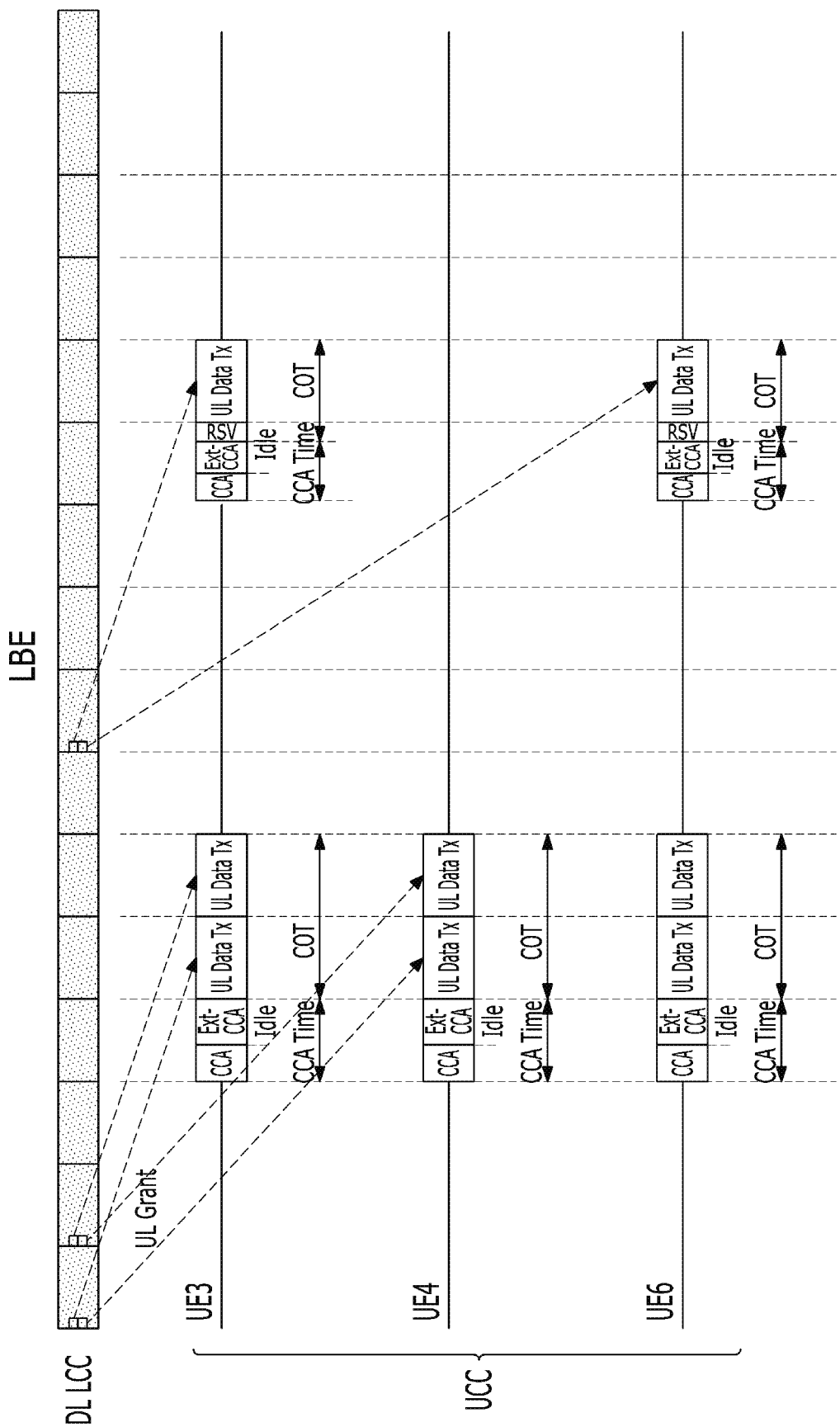
Figure 8A:
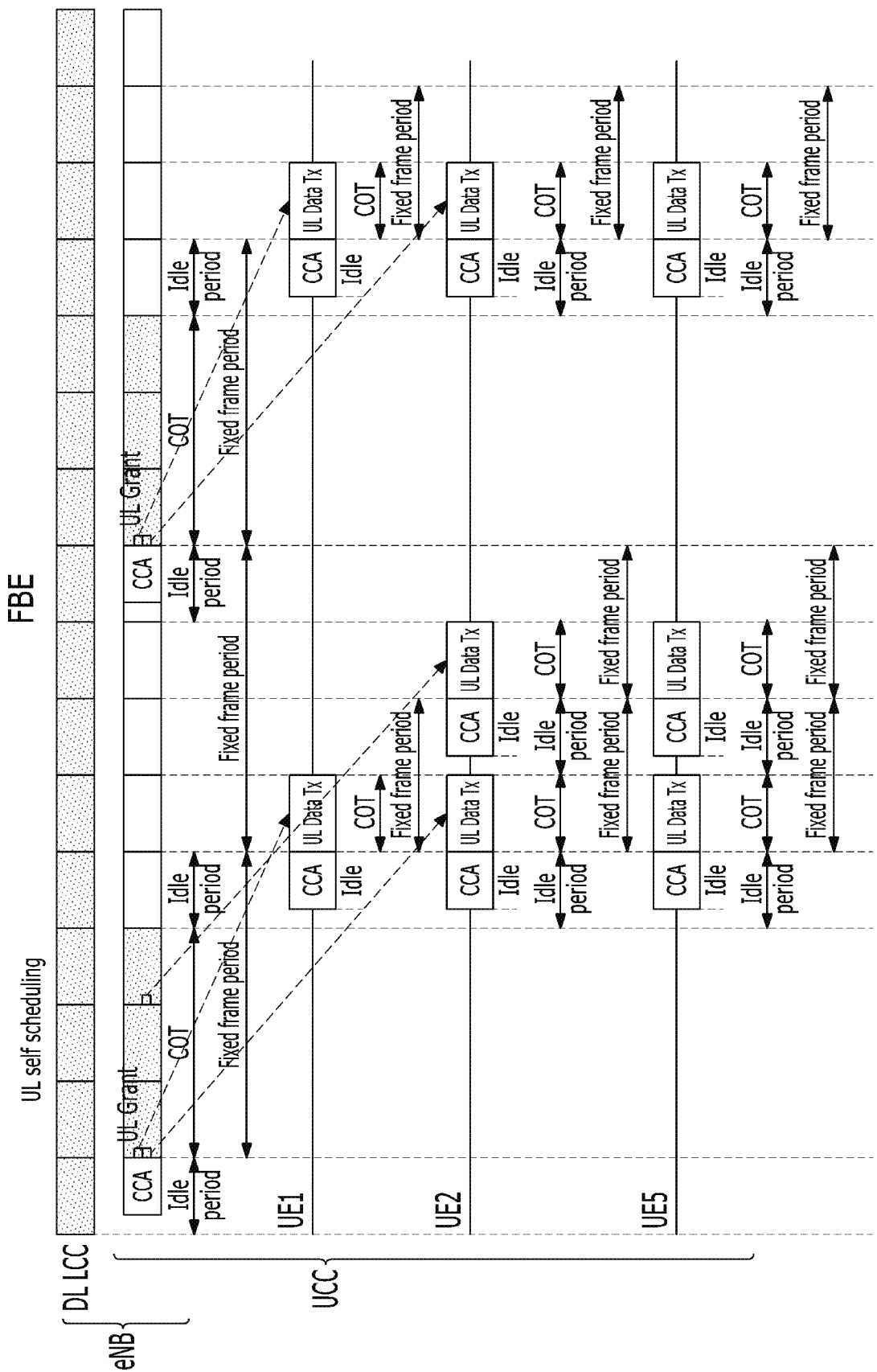
FIGS. 8A and 8B are schematic views illustrating a method for allocating uplink resources so that a plurality of terminals simultaneously transmit data according to another exemplary embodiment.
Figure 8B:
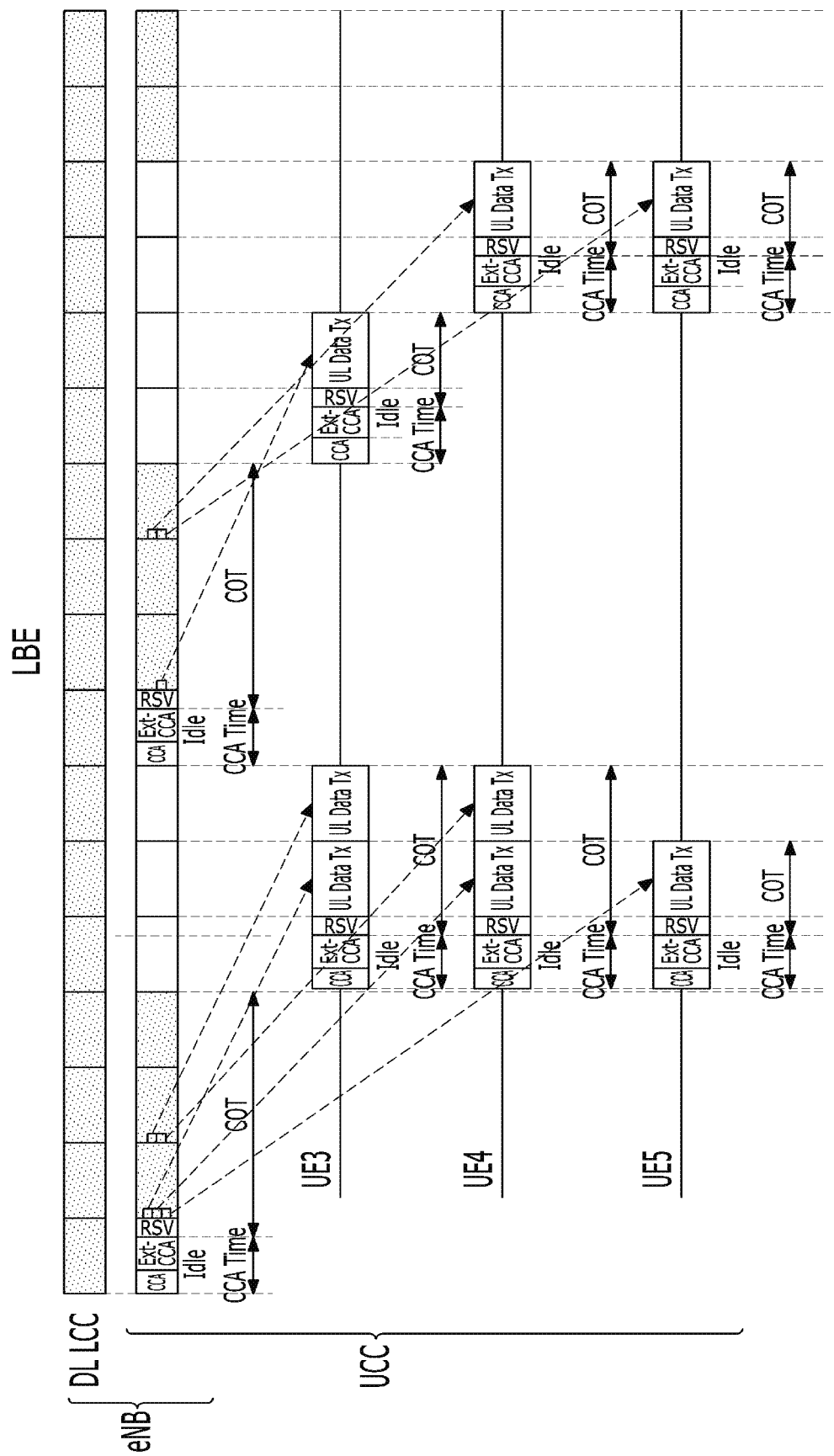

FIGS. 7A and 7B are schematic views illustrating a method for allocating uplink resources so that a plurality of terminals simultaneously transmit data according to an exemplary embodiment, and FIGS. 8A and 8B are schematic views illustrating a method for allocating uplink resources so that a plurality of terminals simultaneously transmit data according to another exemplary embodiment.

In FIGS. 7A and 7B, the uplink resources are allocated by the cross-carrier scheduling, and in FIGS. 8A and 8B, the uplink resources are allocated by the self-scheduling.

First, referring to FIGS. 7A and 8A in which the FBE is applied, a CCA starting point and a CCA time (or CCA period) of a plurality of terminals that intend to simultaneously transmit the data may be configured to be the same as each other. Therefore, the plurality of terminals performing the CCA at the same timing all obtain the same CCA result (either busy or idle), and in the case in which the channel is an idle, the data transmission is performed at the same timing, thereby making it possible to implement a multiplexing between the plurality of terminals.

In addition, also in FIGS. 7B and 8B in which the LBE is applied, the CCA starting point and the CCA time (or CCA period) are configured to be the same as each other to each of the plurality of terminals, an access/occupancy timing of the channel of each of the terminals may be adapted to be the same as each other.

As described above, since the starting point of the CCA in the case of the LBE is not fixed as compared to the FBE, and during the Ext-CCA the CCA slot may be selected randomly for the CCA, the ending timing of the CCA may not be aligned to the transmission unit of the data. In order to solve this problem, the RSV in which the special signal is transmitted may be used right before the data is transmitted. The special signal may be similar to a signal transmitted at the time of accessing/occupying the channel for a downlink data transmission from the base station. For example, the terminal may use the special signal so that other devices (e.g., WiFi, other base station (eNB), other terminals) operated in the unlicensed band do not access/occupy the channel after the CCA, in order to transmit the data in the resources allocated by the base station for the uplink data transmission. The special signal of FIGS. 7B and 8B may also be used in the FBE, similar to the LBE (i.e., similar to or the same as the LBE).

The plurality of terminals simultaneously perform the CCA and transmit the data may also be applied to a method in which the base station performs a scheduling for the data transmission of the terminal to the terminal, the terminal performs the CCA before the data transmission to reserve or hold the uplink resources, and the terminal then transmits the data, which will be described below in detail with reference to FIGS. 13 to 16.

Figure 9A:
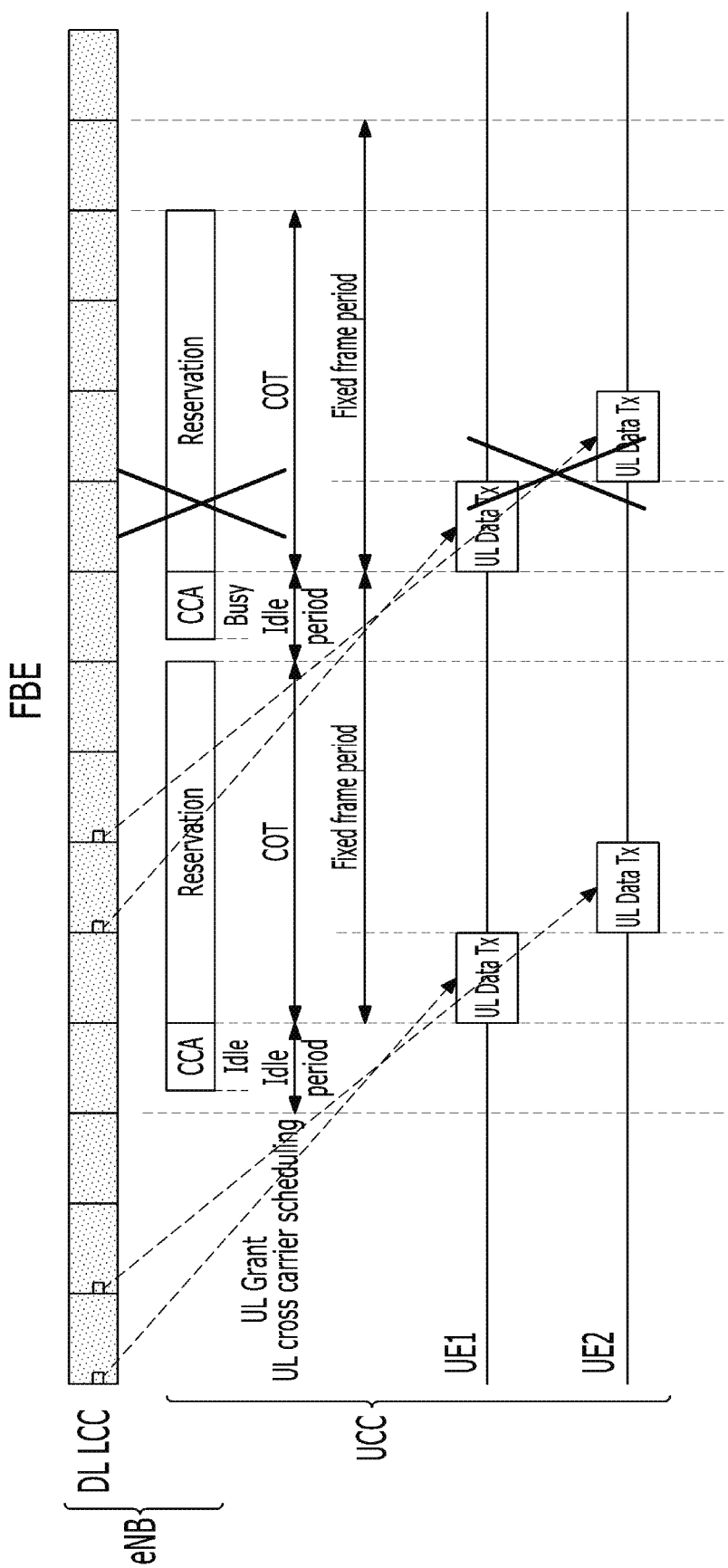
FIGS. 9A and 9B are schematic views illustrating a method for allocating uplink resources to a terminal through a clear channel according to an exemplary embodiment.
Figure 9B:
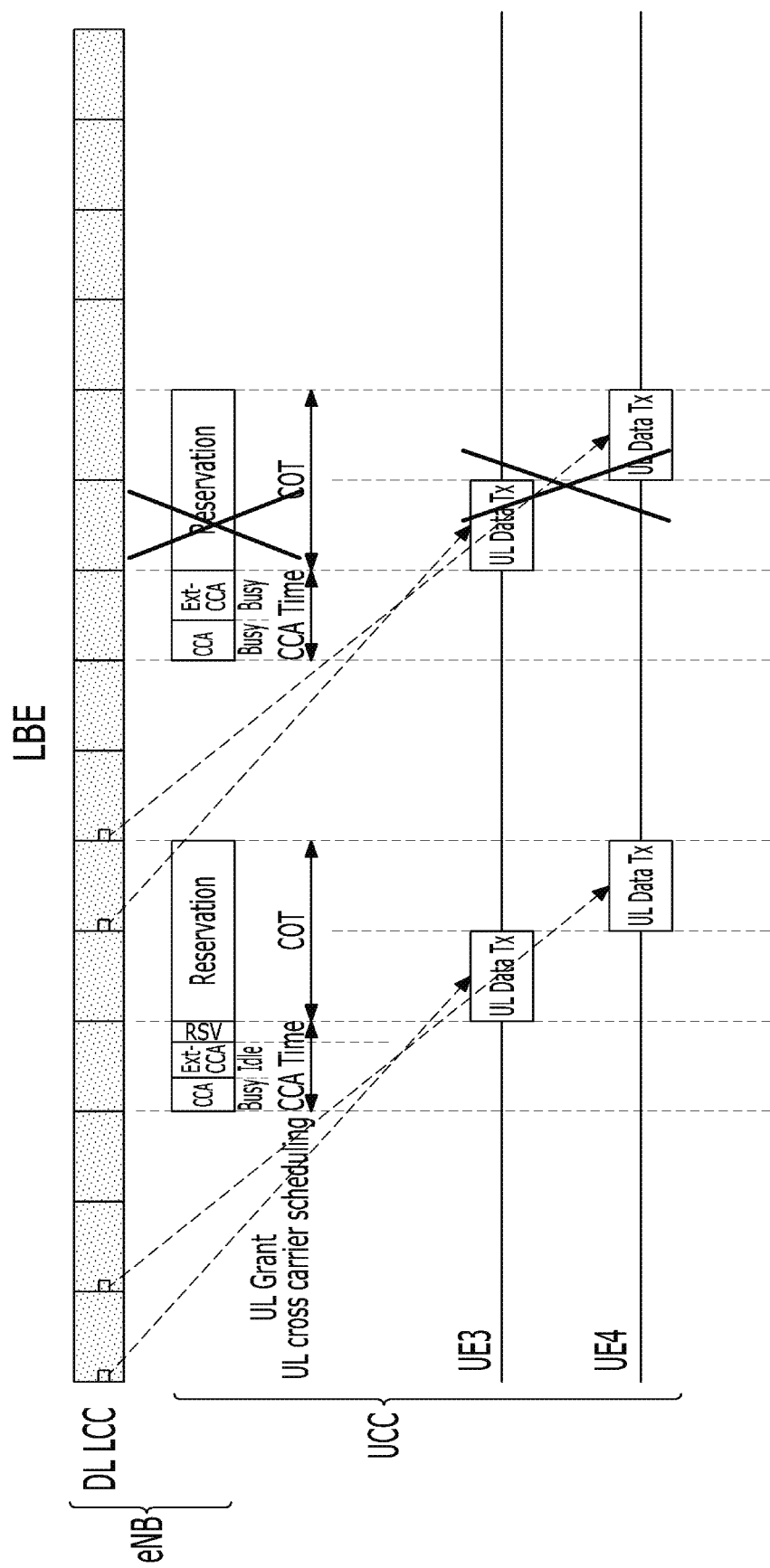
Figure 10A:
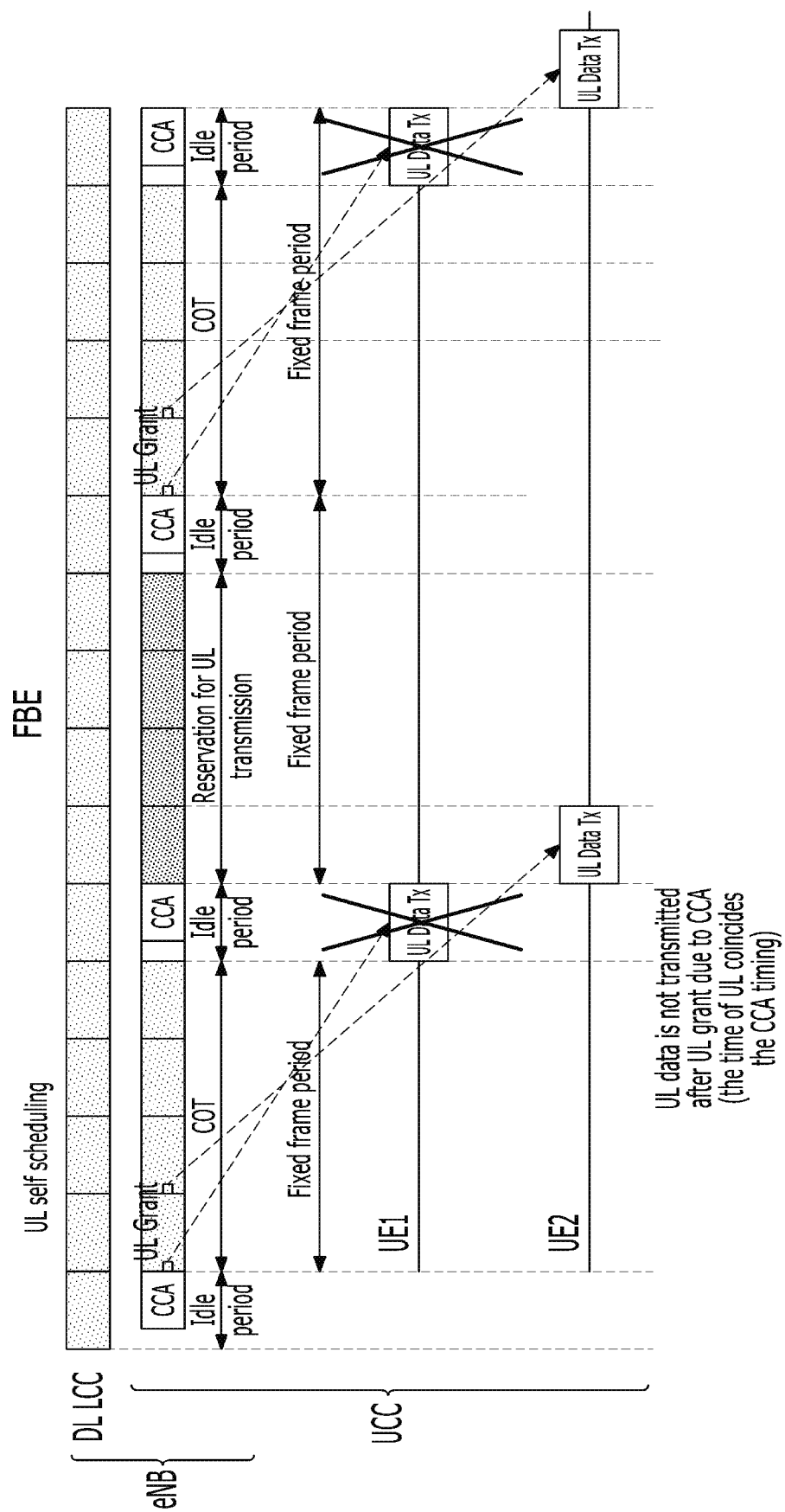
FIGS. 10A and 10B are schematic views illustrating a method for allocating uplink resources to a terminal through a clear channel according to another exemplary embodiment.
Figure 10B:
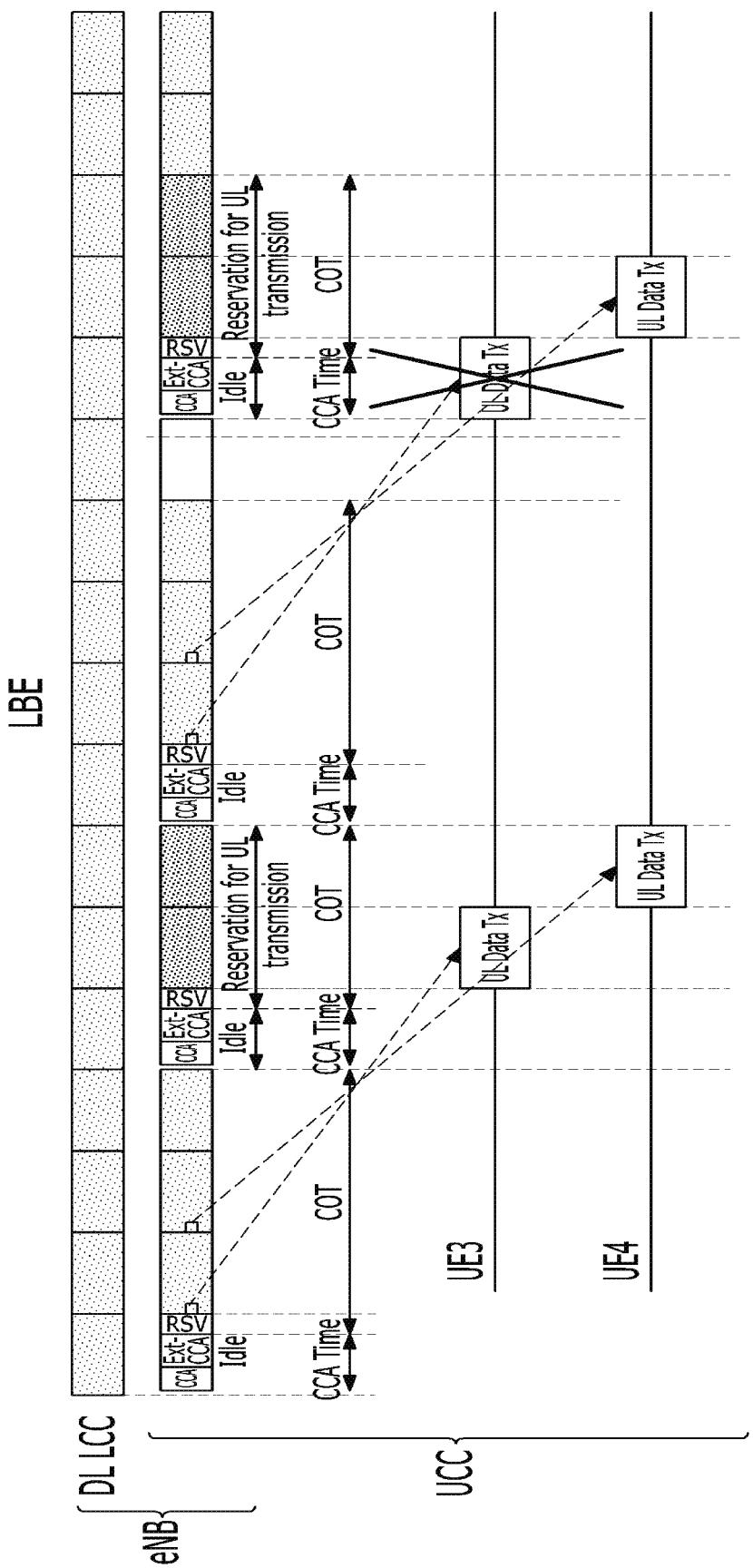

FIGS. 9A and 9B are schematic views illustrating a method for allocating uplink resources to a terminal through a clear channel assessment (CCA) of the base station according to an exemplary embodiment, and FIGS. 10A and 10B are schematic views illustrating a method for allocating uplink resources to a terminal through a clear channel assessment (CCA) of the base station according to another exemplary embodiment.

According to the methods illustrated in FIGS. 9A, 9B, 10A, and 10B, since the base station performs the CCA for the data transmission of the terminal instead of the terminal, an overhead which may be caused in the case in which the plurality of terminals perform the CCA as in the method as described above may be reduced.

However, in this case, the terminal may not accurately know whether or not the channel is occupied, after the base station performs the CCA. In order to solve the above-mentioned problem, such as the RSV of the foregoing LBE, by transmitting a fact that the channel is occupied to another device as the special signal at the transmission timing of the data, it is possible to suppress the channel access/occupancy by another device. In addition, the special signal may also be applied in the similar/same way for a predetermined time after the CCA of the FBE.

Meanwhile, if it is determined that the channel is occupied as a result of CCA performance, the base station may not reserve the resources, and the base station may inform the terminal through the licensed band that it fails to reserve the resources.

Figure 11A:
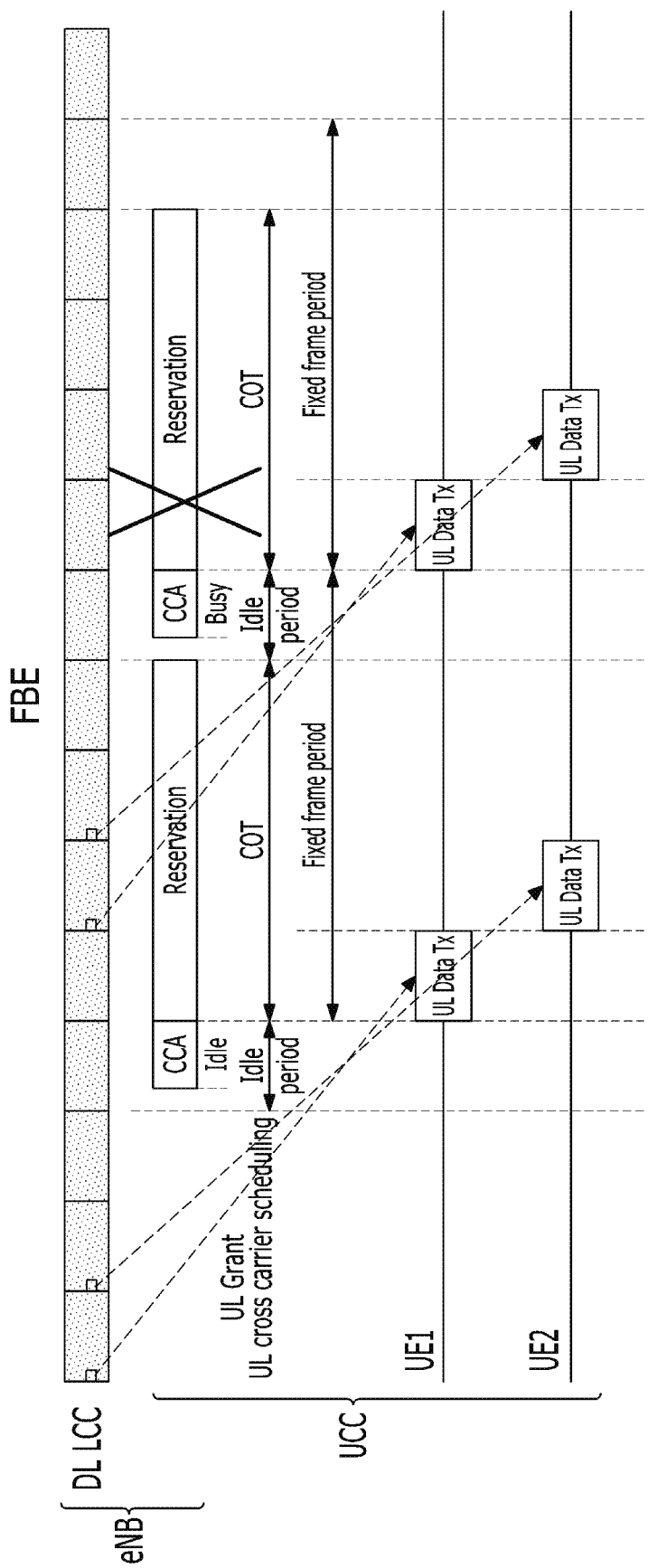
FIGS. 11A and 11B are schematic views illustrating a method for transmitting data by a terminal after a resource reservation/occupation failure of a base station according to an exemplary embodiment.
Figure 11B:
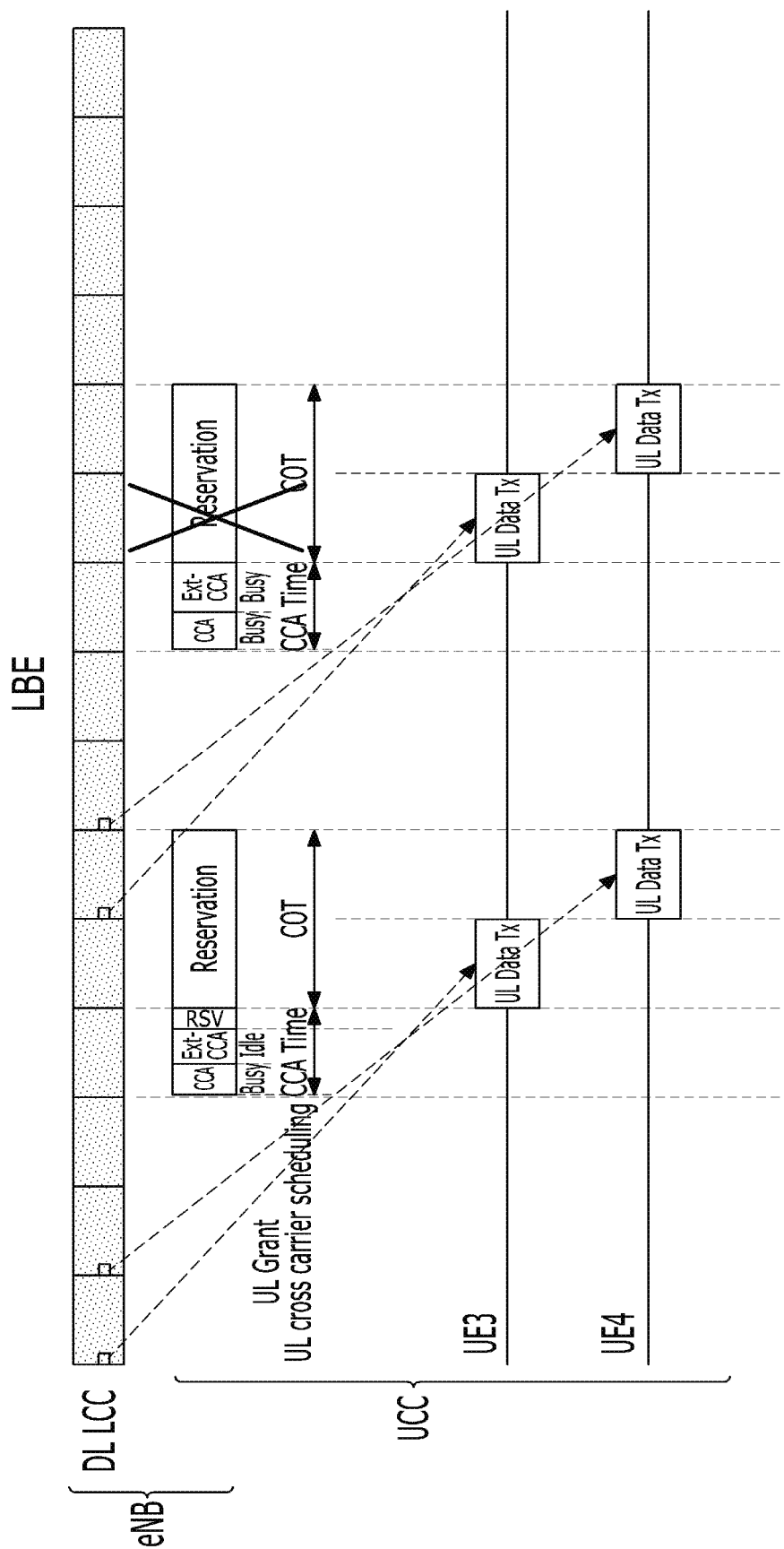

FIGS. 11A and 11B are schematic views illustrating a method for transmitting data by a terminal after a resource reservation/occupation failure of a base station according to an exemplary embodiment.

In the case in which since there is no indication for a resource reservation failure of the base station or the indication is omitted, the terminal does not know the resource reservation failure, the terminal may transmit the data using the allocated resources independent from a result of the CCA. In addition, in the case in which it is determined that the channel may be used and may be occupied as the result of the CCA performance of the base station, the terminal may receive the special signal transmitted from the base station and determine the fact that the channel may be occupied, thereby transmitting the data through the allocated resources. Alternatively, whether or not the resource reservation succeeds may also be informed of the terminal through the licensed band by the base station. Referring to FIGS. 11A and 11B, the base station succeeds in occupying the channel in a first CCA, and each of the terminals transmits the data without the CCA during a next COT. However, even though the base station fails to occupy the channel in a next CCA, each of the terminals does not aware of the channel occupancy failure (that is, regardless of the channel occupancy result) and may transmit the data in the allocated resources.

Figure 12A:
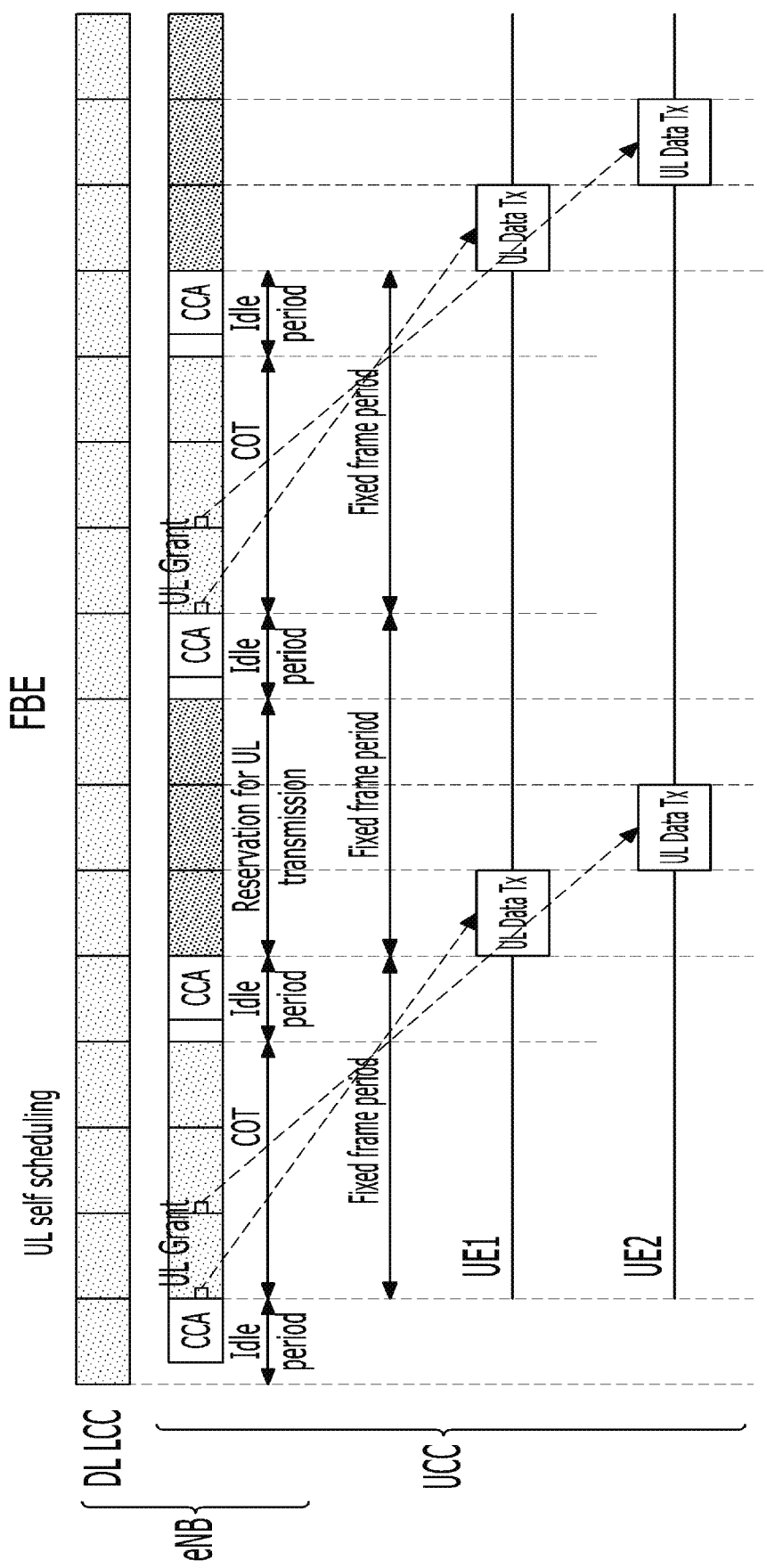
FIGS. 12A and 12B are schematic views illustrating a method for allocating uplink resources so that a CCA timing of a base station and a data transmission of a terminal do not overlap with each other according to an exemplary embodiment.
Figure 12B:
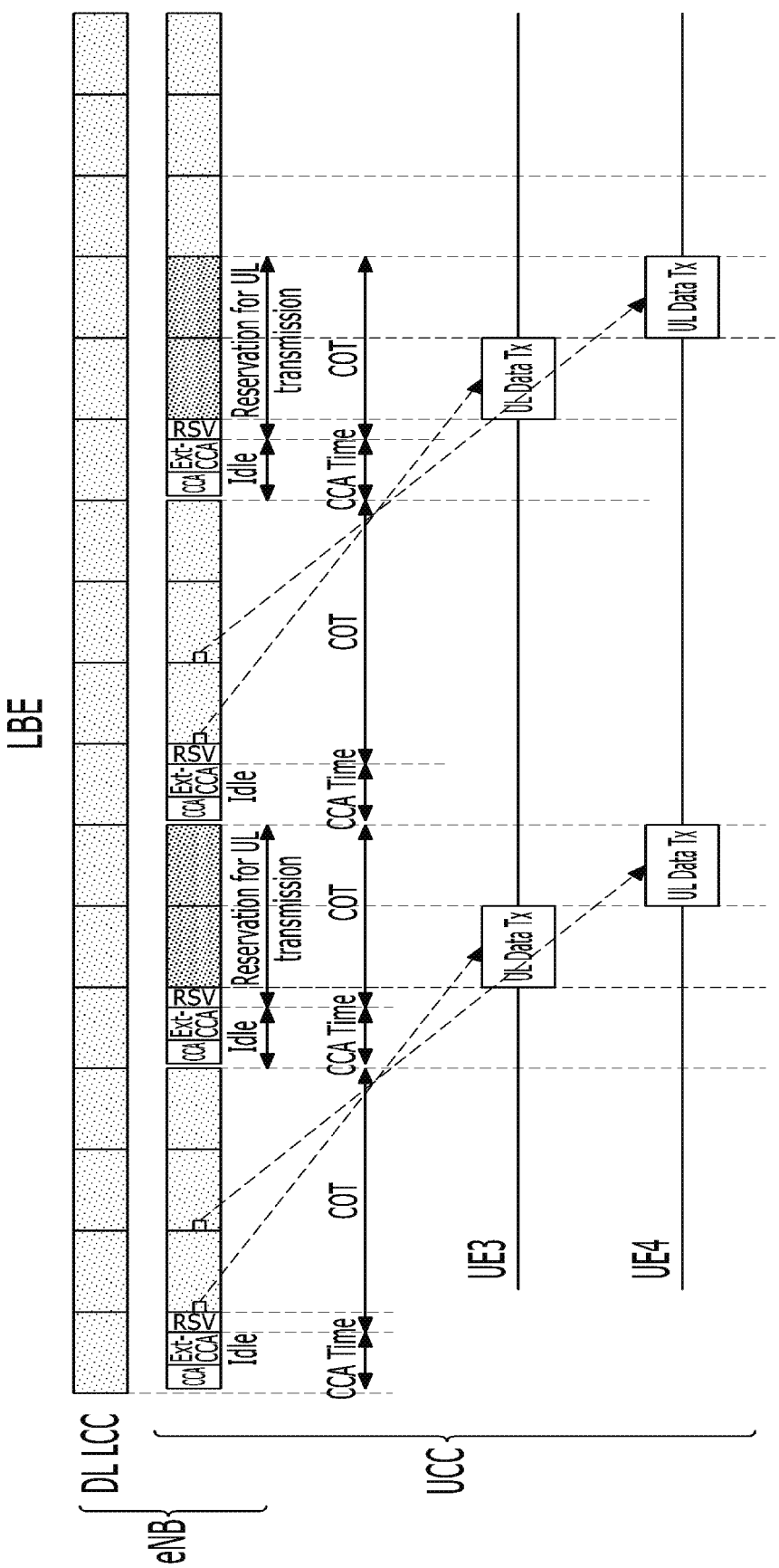

FIGS. 12A and 12B are schematic views illustrating a method for allocating uplink resources so that a CCA timing of a base station and a data transmission of a terminal do not overlap with each other according to an exemplary embodiment.

Referring to FIG. 10A, since the uplink transmission of the UE1 is scheduled at second and fourth CCA (additional CCA) starting points of the base station, the UE1 may not transmit the data at the corresponding starting points.

In addition, referring to FIG. 10B, since the uplink transmission of the UE3 is scheduled at the fourth CCA starting point of the base station, the UE3 may not transmit the data at the corresponding starting point.

In order to solve the above-mentioned problem, referring to FIGS. 12A and 12B, in the case in which the COT of the base station is limited and the uplink data transmission of the terminal is scheduled at a timing at which the additional CCA is required according to a frequency regulation, the resources may be allocated so that the CCA of the base station and the data transmission of the terminal do not overlap with each other. That is, resource allocation information of scheduling the uplink data of each of the terminals at a timing after the additional CCA of the base station may be included in the UL grant transmitted to the terminal by the base station after the first CCA.

Figure 13A:
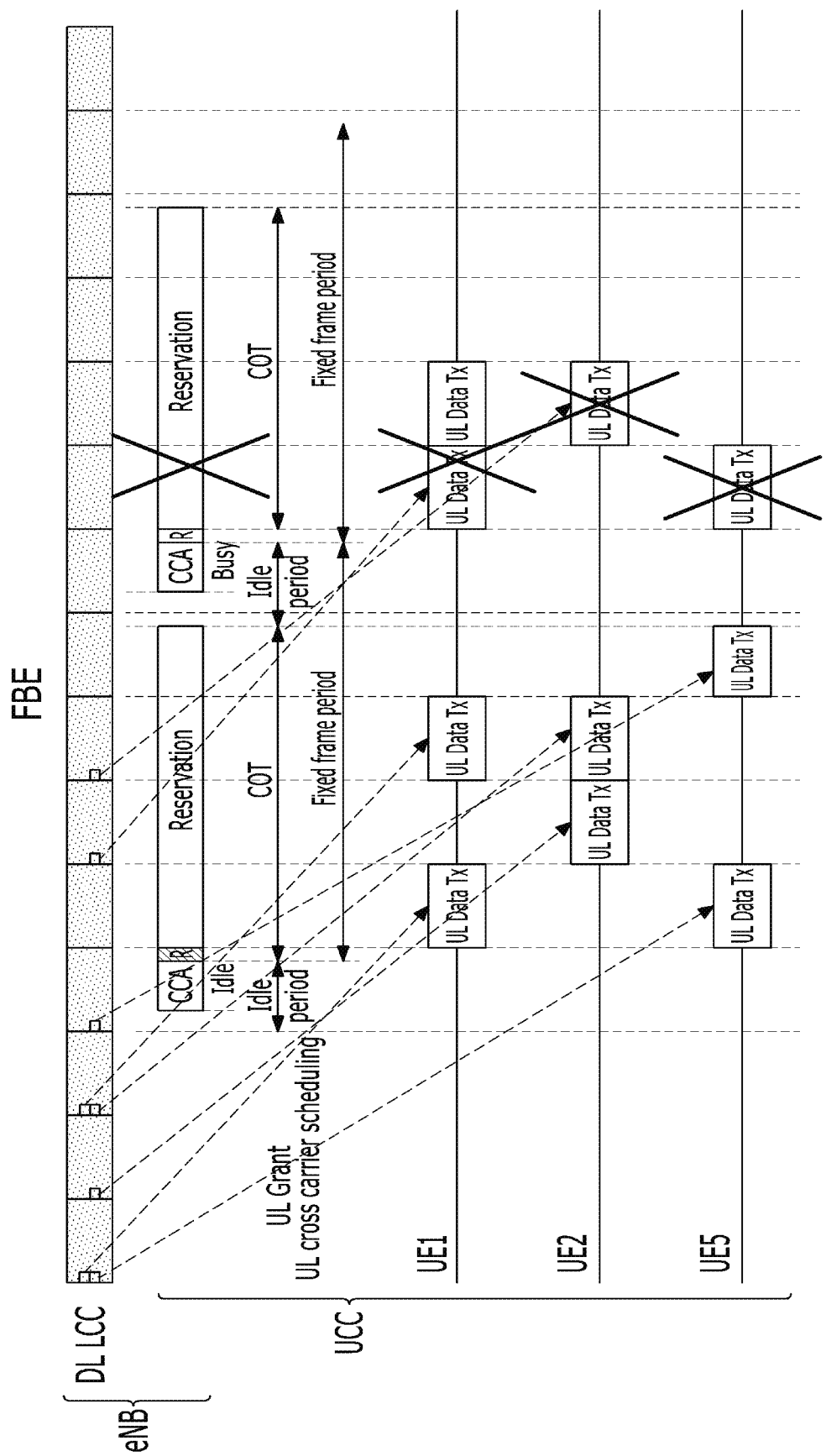
FIGS. 13A and 13B are views illustrating a method for repetitively scheduling uplink resources to a plurality of terminals by a base station according to an exemplary embodiment.
Figure 13B:
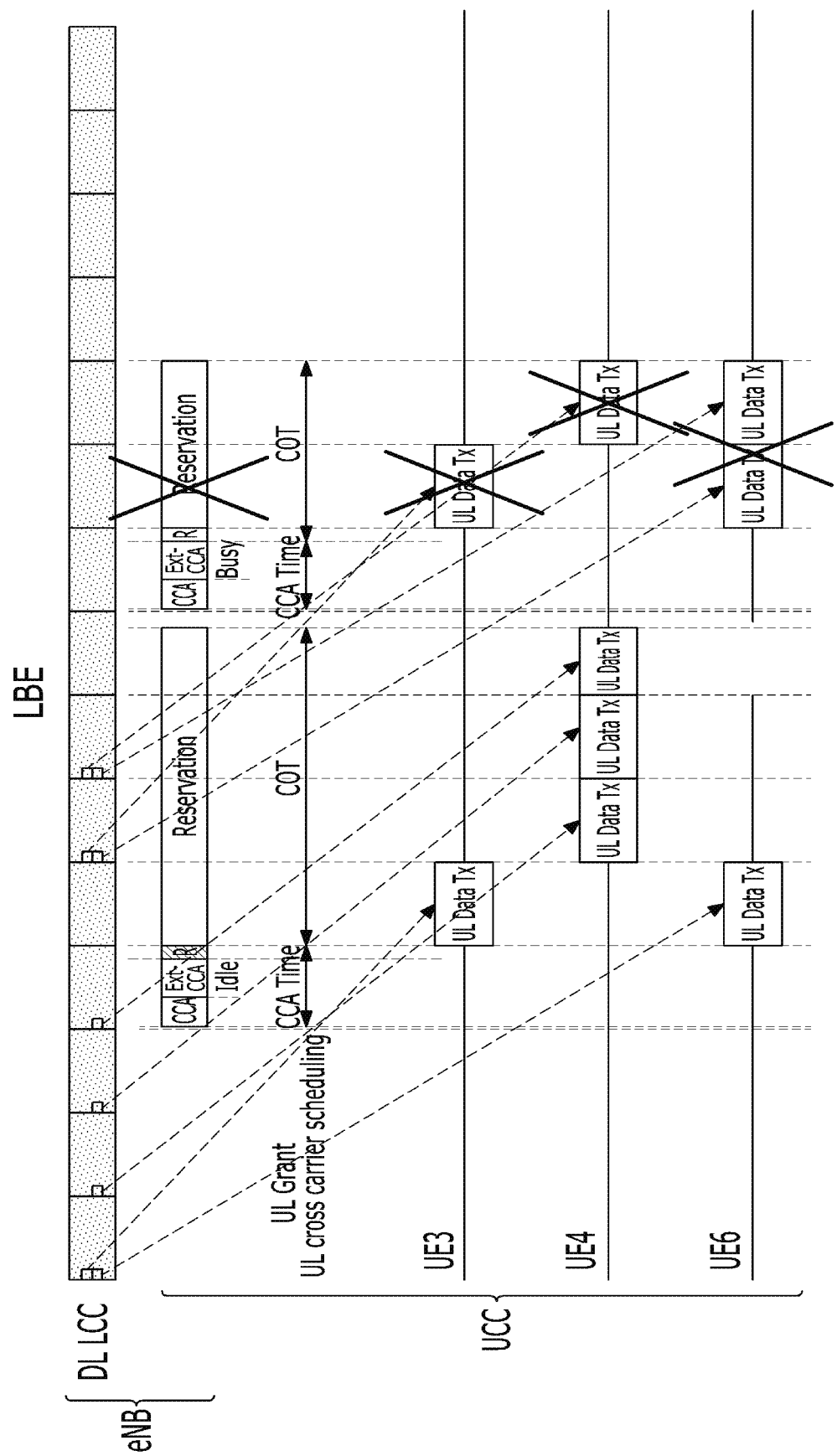
Figure 14A:
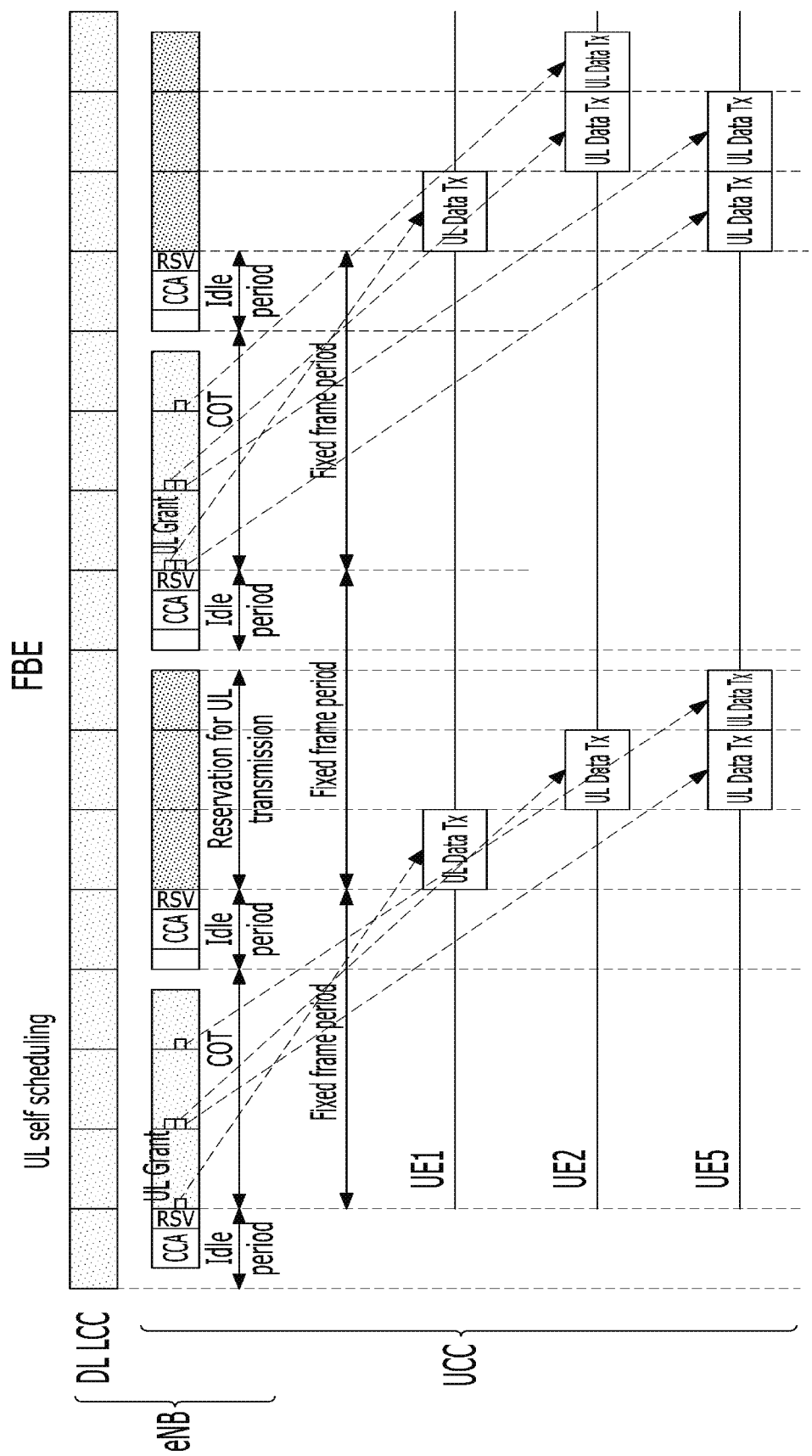
FIGS. 14A and 14B are views illustrating a method for repetitively scheduling uplink resources to a plurality of terminals by a base station according to another exemplary embodiment.
Figure 14B:
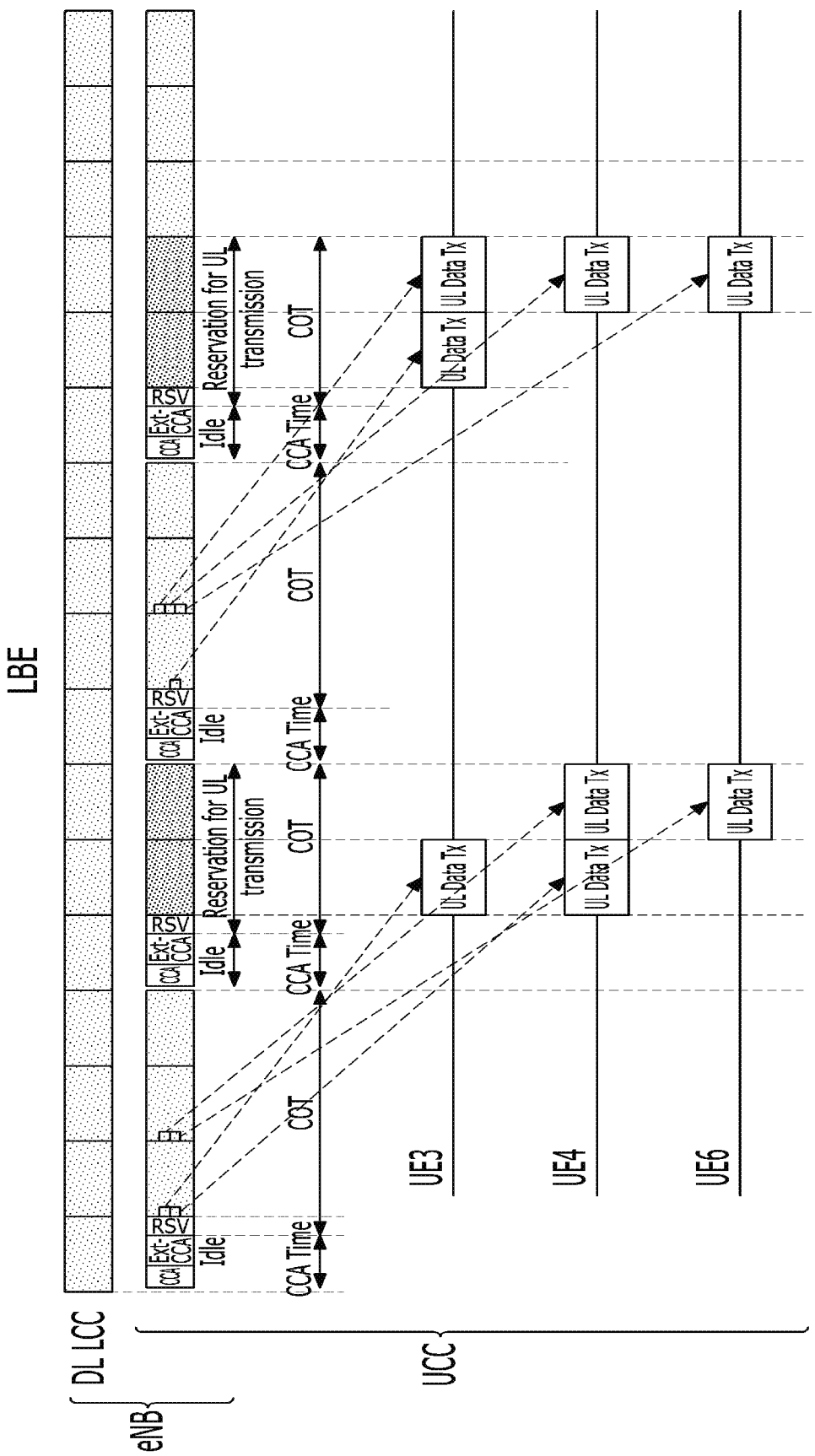

FIGS. 13A and 13B are views illustrating a method for scheduling uplink resources at the same timing to a plurality of terminals by a base station according to an exemplary embodiment, and FIGS. 14A and 14B are views illustrating a method for scheduling uplink resources at the same timing to a plurality of terminals by a base station according to another exemplary embodiment.

In FIGS. 13A and 13B, the uplink resources are allocated to the plurality of terminals by the cross-carrier scheduling, and in FIGS. 14A and 14B, the uplink resources are allocated to the plurality of terminals by the self scheduling.

Referring to FIGS. 13A, 13B, 14A, and 14B, since the base station reserves the resources for occupying/using the channel through the CCA, the base station allocates the resources to two or more terminals at the same timing, thereby allowing the terminal to transmit the data.

In this case, when the base station occupies/uses the channel after the CCA, the base station transmits the special signal, thereby making it possible to inform the terminal receiving the UL grant for the data transmission about the channel occupancy. Thereafter, the terminal may transmit the data through the resources allocated by the UL grant. Such "CCA+RSV (reservation)" may be performed in every uplink data transmission unit (e.g., a subframe unit), and several data transmission units may be reserved. In this case, even in the case in which the data transmission timing of the terminal is allocated, for example, in two or three data transmission unit through the special signal transmitted after the CCA, the terminal may transmit the data without the additional CCA (omitting the CCA) of the base station. If the special signal is not transmitted, the terminal receiving the UL grant determines that the channel is occupied by another device, and does not transmit the data in the resources allocated by the UL grant.

Meanwhile, a certain level or more of energy of the special signal may be detected through an "energy detection" or may be detected through "a signal detection". Such special signal may be applied in the same way even in the case in which the uplink resources are allocated by the self scheduling of the base station. In addition, unlike the downlink data, the special signal for the uplink data may be newly defined, and in this case, the newly defined special signal may be applied for a downlink data reception and an uplink data transmission of the terminal. Alternatively, a section in which the downlink data and the uplink data are transmitted is configured, and in the case in which the special signal is transmitted in the configured section, the terminal may determine whether or not the channel is used through the special signal to occupy/use the channel. In addition, the special signal may also be defined in the form which is the same as or similar to a physical control channel indicating information used for a resource allocation such as PDCCH defined in LTE, or information defined in the physical control channel to indicate the resource allocation.

Hereinafter, a method for simultaneously transmitting the data in the unlicensed band by the plurality of terminals will be described.

In order for the base station to allocate the resources for the data transmission to the plurality of terminals, the base station may each allocate the resource to every one terminal, or may collectively allocate the resource to the plurality of terminals. In the case in which the base station collectively allocates the resource to the plurality of terminals at a time, parameters and the value of those parameters for performing the CCA may be applied to the plurality of terminals in the same way. The method for allocating the resources is described based on a 3GPP LTE system, but may also be applied to other wireless access systems.

Operations of the base station and the terminal for performing the CCA and transmitting the data by the terminal are as follows.

According to an exemplary embodiment, in the case in which the base station allocates (UL grant) the resources to the terminals using the PDCCH, the base station may additionally transmit value of parameters (set value) for performing the CCA. In this case, the setting value for performing the CCA may also be included in the PDCCH, may also be transmitted in an upper layer such as an RRC layer (i.e., RRC level signaling), or may also be transmitted through an MAC control element (CE), or the like, and a setting value for performing the CCA predefined between the base station and the terminal may also be used. According to an exemplary embodiment, the setting value for performing the CCA may include a timing at which the CCA is performed, a CCA slot (e.g., may be randomly selected between 1 to q to perform the Ext-CCA in the case of the LBE, and may be a value for performing the CCA in the case of the FBE), a fixed frame period for operating the FBE in the case of the terminal set to the FBE, and the like. In this case, as the fixed frame period, the same value may be always applied, or the fixed frame period may be preset, or a predefined value may be used. If the setting value for performing the CCA is not received from the base station, the terminal may randomly select the setting value for performing the CCA, or may select the setting value for performing the CCA according to the method defined by a regulation of the unlicensed band, or may intactly maintain the setting value which is previously received from the base station. In addition, in the case in which the CCA slot value in which the channel is determined to be "busy" at the time of a previous CCA and a countdown which is frozen exists, and the channel is again determined to be "busy (or occupied)" as a result of a next CCA, the terminal may reuse the CCA slot value frozen at the next CCA to again countdown the CCA slot value and may send the channel at the same time.

According to another exemplary embodiment, in order for the terminal receiving the UL grant to transmit a physical uplink shared channel (PUSCH) (i.e., UL data), the terminal is instructed (special signal transmission instruction) to transmit the special signal until a transmission timing of the PUSCH.

The special signal transmission instruction may also be included in the PDCCH, and may also be separately transmitted when time is available before a PUSCH transmission after the CCA. Otherwise, the base station does not transmit the special signal. In the case in which the base station occupies the resources for the terminals and allows the terminals to use the resources, the base station performs the CCA and may transmit the UL GRANT, or the like in the case in which the channel may be occupied.

The special signal may also be instructed to be transmitted to all of the respective terminals at the time of the UL Grant, and may also be instructed to be included in the PDCCH and transmitted to only a specific terminal (e.g., a terminal performing the CCA) or some terminals.

Meanwhile, according to another exemplary embodiment, except the resources for the data transmission (PUSCH), the configured values such as the CCA starting point, the CCA slot, and the like may be transmitted at the same value. In this case, the terminal is guided to simultaneously transmit the data. The CCA starting point may be set to immediately after the downlink data transmission of the base station (a subframe unit, a slot unit, a symbol unit, or the like), or may be defined as a start timing of a specific subframe and a specific position in the specific subframe (e.g., from a start position of a slot, a specific symbol in the subframe). Similarly, a CCA ending point may be set to an ending timing of the specific subframe or slot, the specific symbol, or the like. In order to prevent another device from accessing the channel or occupying the channel during a time from the CCA starting point to the CCA ending point, the special signal may be configured or may be instructed to the terminal to be transmitted from the CCA starting point to the CCA ending point.

The terminal receiving the UL Grant from the base station performs the CCA at a later set timing using the resources allocated by the UL Grant. In this case, the CCA may comply with the set CCA value to transmit the data. Hereinafter, 'the set timing' will be described base on after four subframes after the PCell (based on the FDD) transmits the UL Grant. 'The configured timing' may be varied depending on an UL/DL configuration (e.g., four to seven subframes) in the TDD, and a basic timing described in 3GPP TS36.211, 36.212, 36.213, or the like may be applied. As a result of performing the CCA by the terminal, if it is determined that the channel is "busy or occupied", the terminal does not transmit the data, and may inform the base station about an occupancy fact of the channel through the licensed band.

However, as a result of performing the CCA by the terminal, if it is determined that the channel is available (idle), the terminal transmits the data. In the case in which the channel may be accessed/occupied, the terminal transmits the special signal when the special signal is required, and transmits the PUSCH through the allocated resources.

The terminal may perform the CCA before every data transmission, and may determine whether or not the data is transmitted through the special signal at a specific timing (e.g., a start timing of the UL period) instead of occupying the channel, or may transmit the data according to the transmission unit. In this case, the base station may also transmit the special signal, and the terminal performing the CCA may also transmit the special signal. The special signal may also be used for purpose of determining that the channel is available as a result of the CCA, and may also be used to align the transmission unit (e.g., a subframe boundary) for the data transmission.

Meanwhile, operations of the base station and the terminal for transmitting and receiving the special signal are as follows.

The special signal according to an exemplary embodiment may be transmitted by the base station or the terminal. In the case in which the base station attempts to reserve the resources through the CCA for the data transmission, the special signal may be transmitted from the base station. Alternatively, the special signal may be transmitted from the terminal performing the CCA for the data transmission.

A determination whether or not the channel is occupied by the special signal and an operation according to the determination may be performed as follows.

The subject (base station or terminal) performing the CCA transmits the special signal when it is determined that the channel may be occupied through the CCA. In this case, in the case in which it is determined that the channel is already occupied by another device as a result of the CCA, since the channel may not be occupied/used, the base station or the terminal does not transmit the special signal.

The terminal transmitting the special signal may transmit the data using the resources allocated from the base station.

The base station transmitting the special signal may prepare (expect) a reception of the data from the terminal to which the resources are allocated through the UL Grant.

In the case in which the terminal receives the special signal from the base station or another terminal, the terminal transmits the data using the resources allocated by the base station.

In this case, the special signal may be some or all of an uplink transmission signal such as a physical downlink control channel (PDCCH), a physical random access channel (PRACH), a sounding reference signal (SRS), a physical uplink control channel (PUCCH), a physical uplink control shared channel (PUSCH), an uplink dedicated demodulation reference signal (DMRS), or the like which may be transmitted by the terminal of 3GPP LTE, or a form which may be repetitively transmitted across the entire band, or a random value (e.g., "111 . . . 111", "101010 . . . ", etc.).

The resources for transmitting the special signal may be all subcarriers of the entire band used for the uplink, or may also be transmitted only in the same subcarrier as the resource region allocated for transmitting uplink data. Alternatively, as the resource region for transmitting the special signal, the resource region which is allocated by the base station or is preset may be used, or the resource region for transmitting the special signal may be configured/instructed through a signal of an upper RRC level or through an MAC CE, or the like.

Figure 15A:
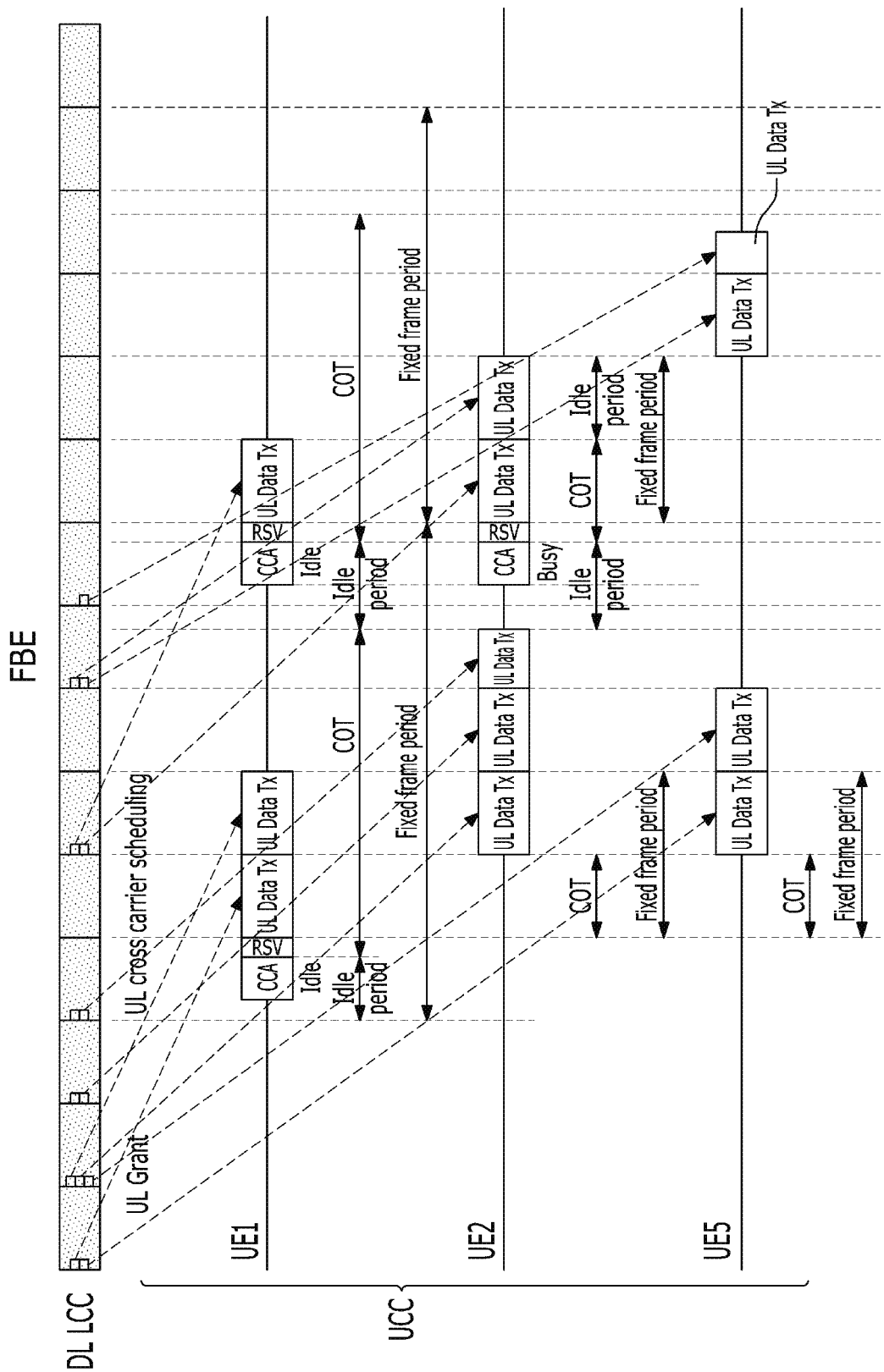
FIGS. 15A and 15B are views illustrating a cross-carrier scheduling for a multiplexing of an uplink according to an exemplary embodiment.
Figure 15B:
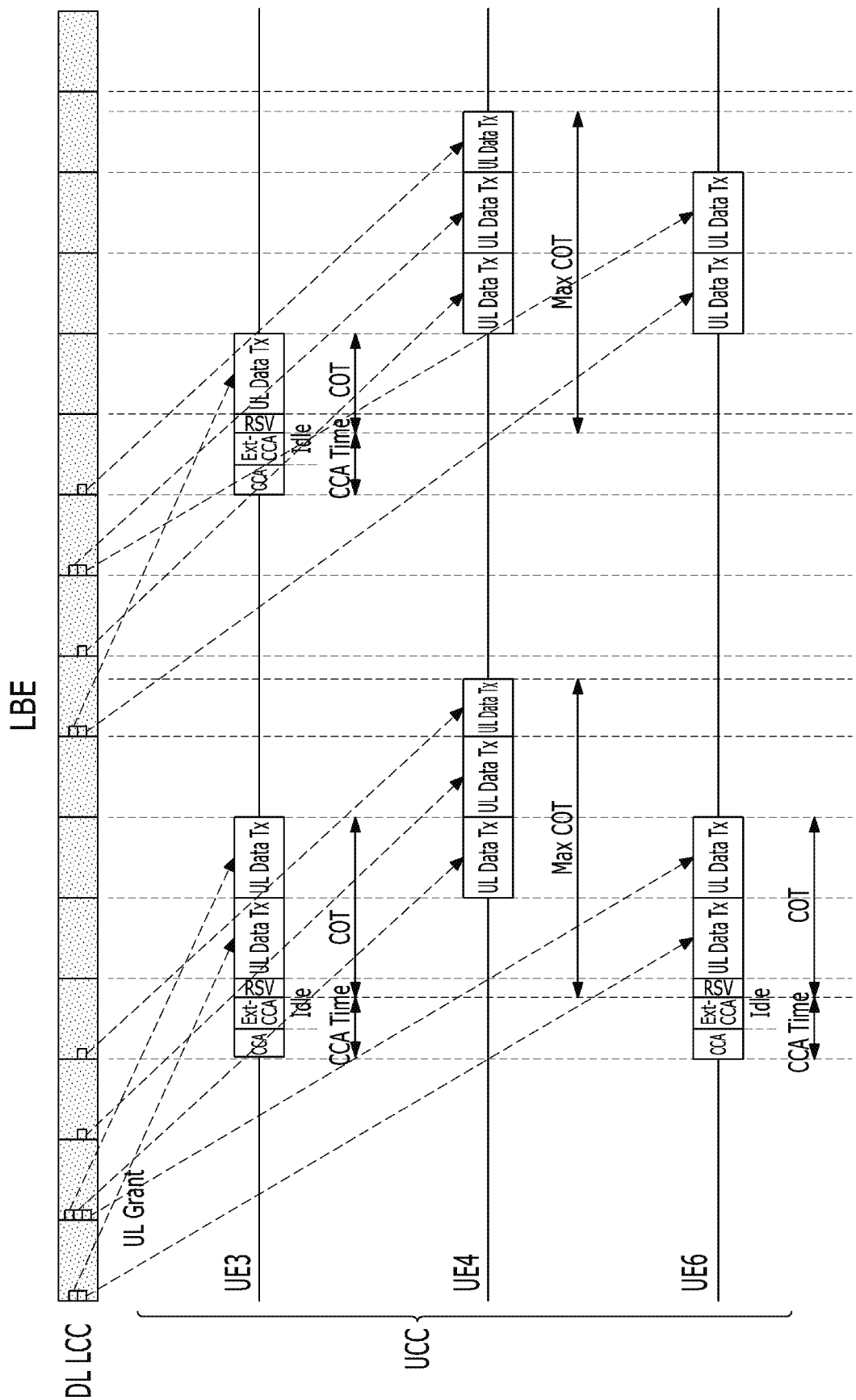
Figure 16A:
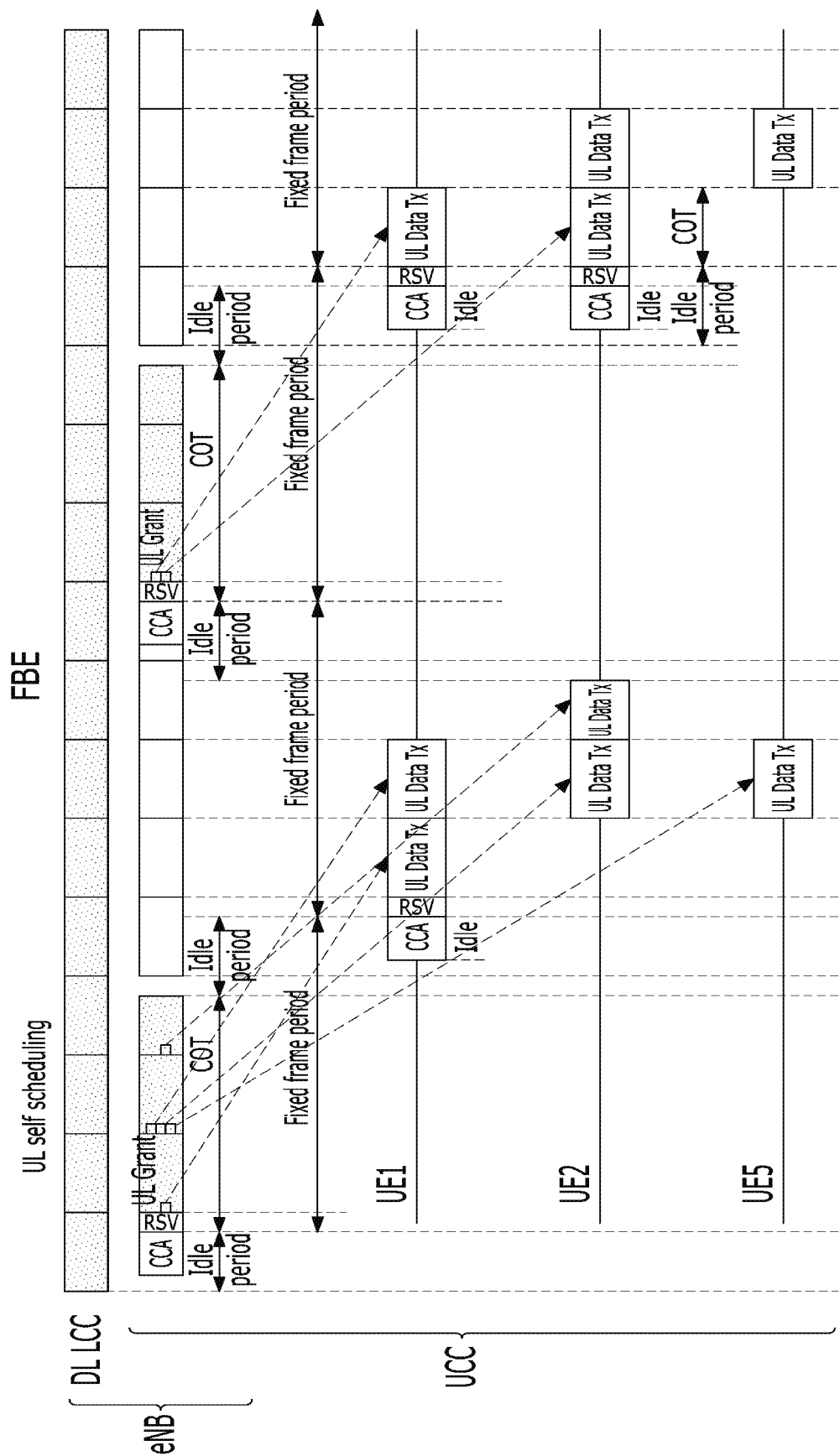
FIGS. 16A and 16B are views illustrating a self scheduling for a multiplexing of an uplink according to an exemplary embodiment.
Figure 16B:
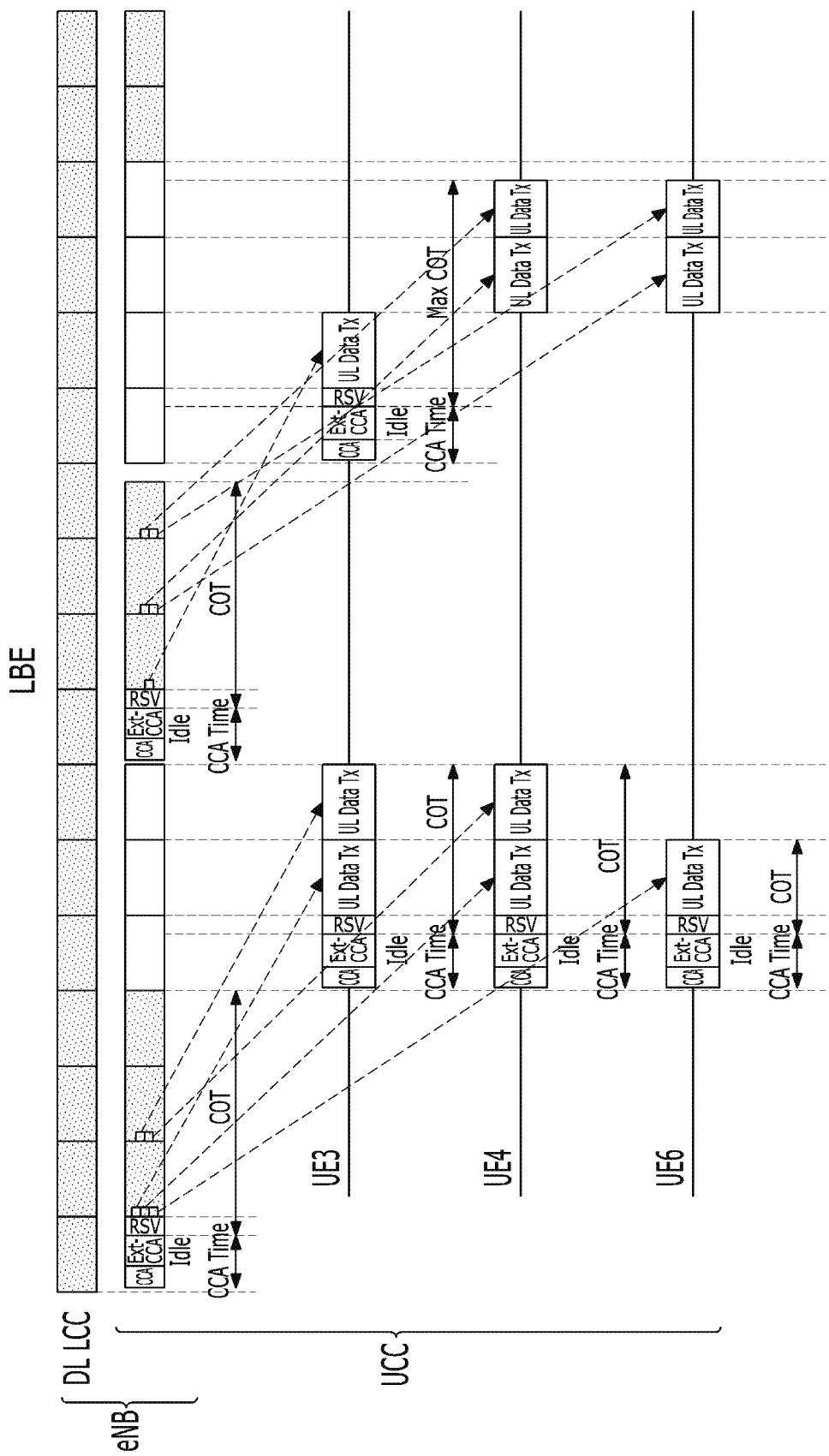

FIGS. 15A and 15B are views illustrating a cross-carrier scheduling for a multiplexing of an uplink according to an exemplary embodiment, and FIGS. 16A and 16B are views illustrating a self scheduling for a multiplexing of an uplink according to an exemplary embodiment.

As described above, in the case in which the plurality of terminals perform the CCA at the same starting point, each of the terminals performs the CCA based on a setting value related to the same CCA at the same starting point, and may transmit the special signal when the channel may be occupied as a result of the CCA. In this case, the terminal (the UE2 or UE3 of FIGS. 15A, 15B, 16A, and 16B) receiving the special signal at a predetermined time (e.g., within the Max COT) may omit the CCA for the data transmission and may transmit the data. The data at a timing at which the Max COT is expired is scheduled by considering the case in which the base station allocates the resources, such that the frequency regulation may be conformed. A data transmission format according to the frequency regulation will be described below in detail.

Meanwhile, the terminal which does not receive the special signal in FIGS. 13A to 16B may itself perform the CCA to transmit the data and may then transmit the special signal. The same CCA related information (the CCA starting point, the CCA time (slot), etc.) may be provided or configured (or pre-configured) to the terminal attempting the data transmission at the same timing so that services of two or more terminals may be provided.

Figure 17A:
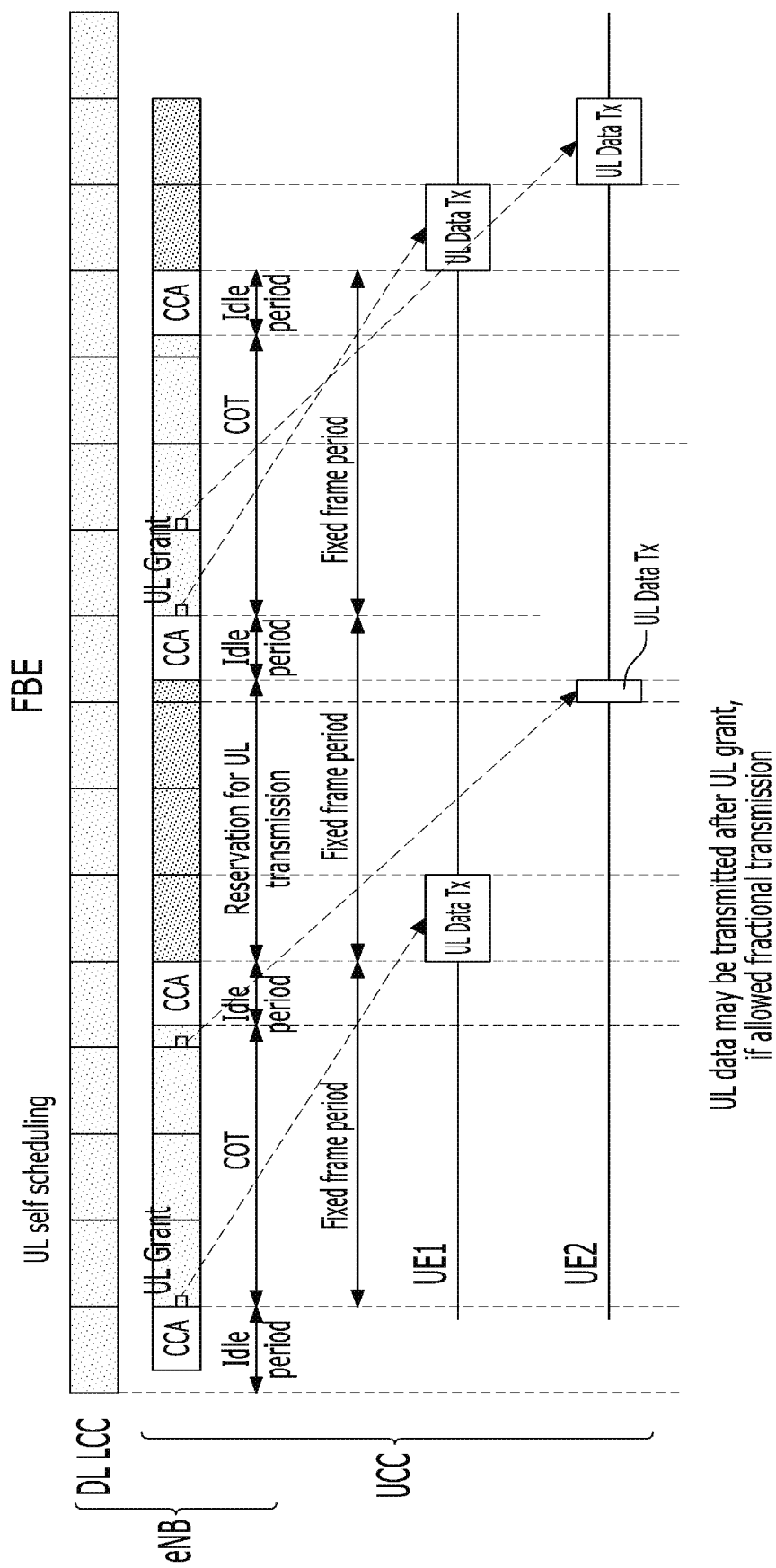
FIGS. 17A and 17B are views illustrating a method for transmitting data after an uplink (UL) grant through a self scheduling according to an exemplary embodiment.
Figure 17B:
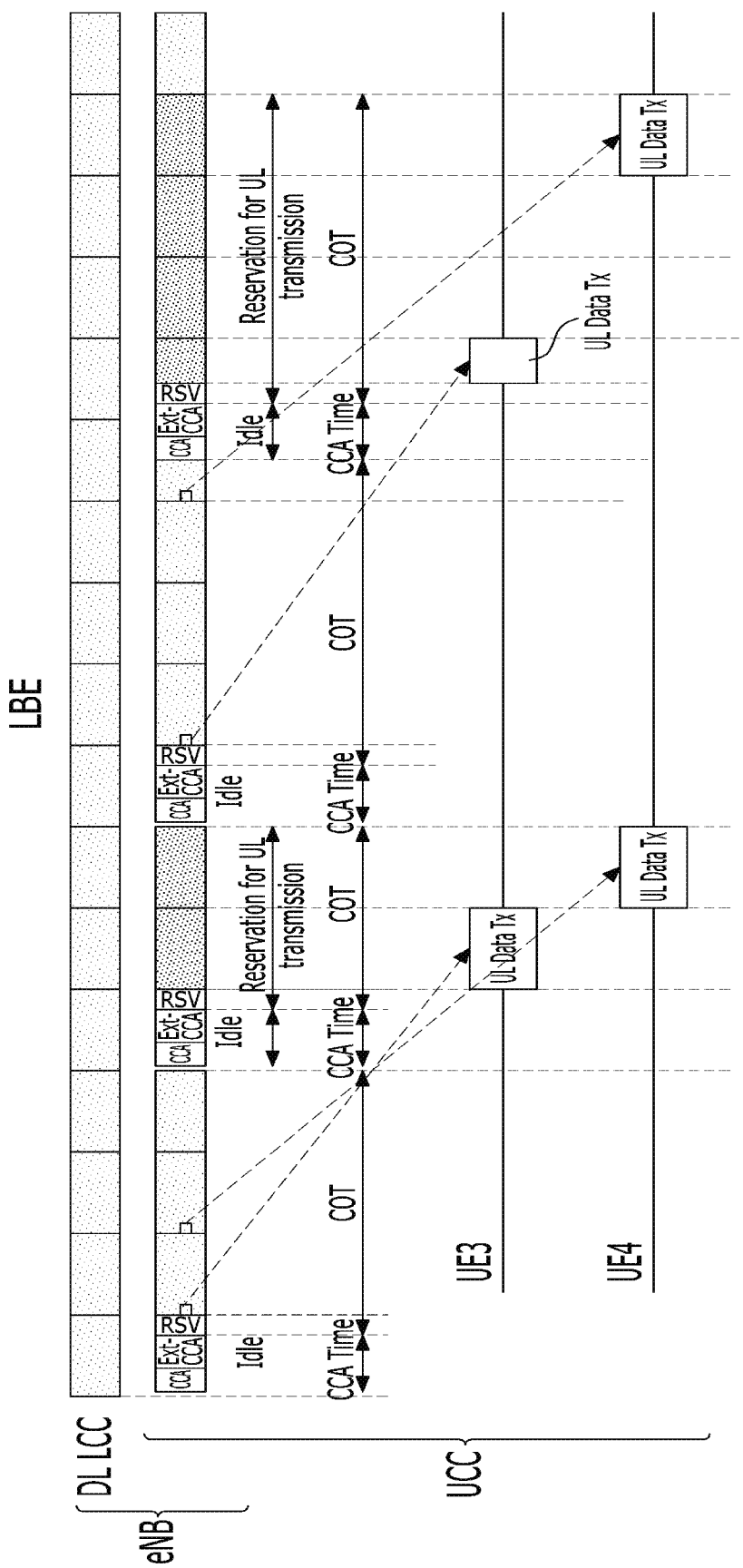

FIGS. 17A and 17B are views illustrating a method for transmitting data after an uplink (UL) grant through a self scheduling according to an exemplary embodiment.

As described above, the terminal transmits the data in the allocated resources, at a specific timing after the UL Grant transmitted by the base station. In this case, the specific timing is a timing after four subframes after the PCell (based on the FDD) transmits the UL Grant, or a timing after four to seven subframes according to the UL/DL configuration in the TDD. However, due to the frequency regulation for operating the unlicensed band, the terminal may not transmit the data in the specific subframe. Therefore, according to an exemplary embodiment, a starting/ending timing of the PUSCH, which is the subframe unit, may be determined as an arbitrary timing in the subframe (fractional transmission: shorter transmission unit compared to the subframe unit). In this case, the arbitrary timing in the subframe may be the start/end timing of the slot or the specific symbol. In this case, the terminal may transmit the data at a timing allocated to the UL Grant despite the frequency regulation of the unlicensed band. For example, referring to FIG. 17A, the UE2 may not occupy all of the subframes allocated to the UL Grant, but may terminate the data transmission in the slot or the symbol in the corresponding subframe, thereby making it possible to transmit the uplink data even in some of the subframes. Although FIGS. 17A and 17B illustrate the case in which the resources of the unlicensed band are allocated by the self scheduling by way of example, the resource allocation of the unlicensed band may also be applied to the case of the cross-carrier scheduling.

Figure 18:
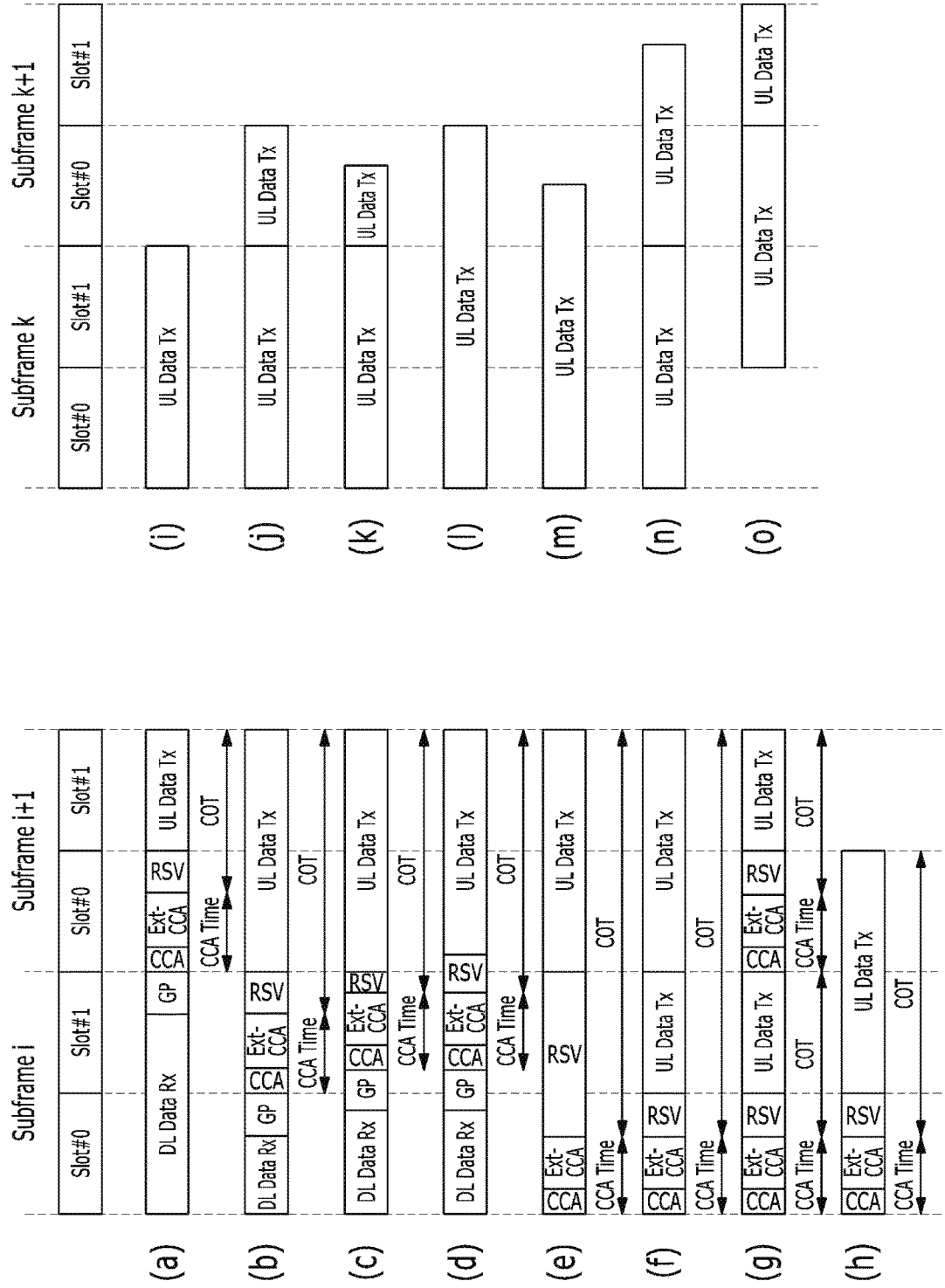
FIG. 18 is a view illustrating a PUSCH format according to the UL grant according to an exemplary embodiment.
Figure 19:
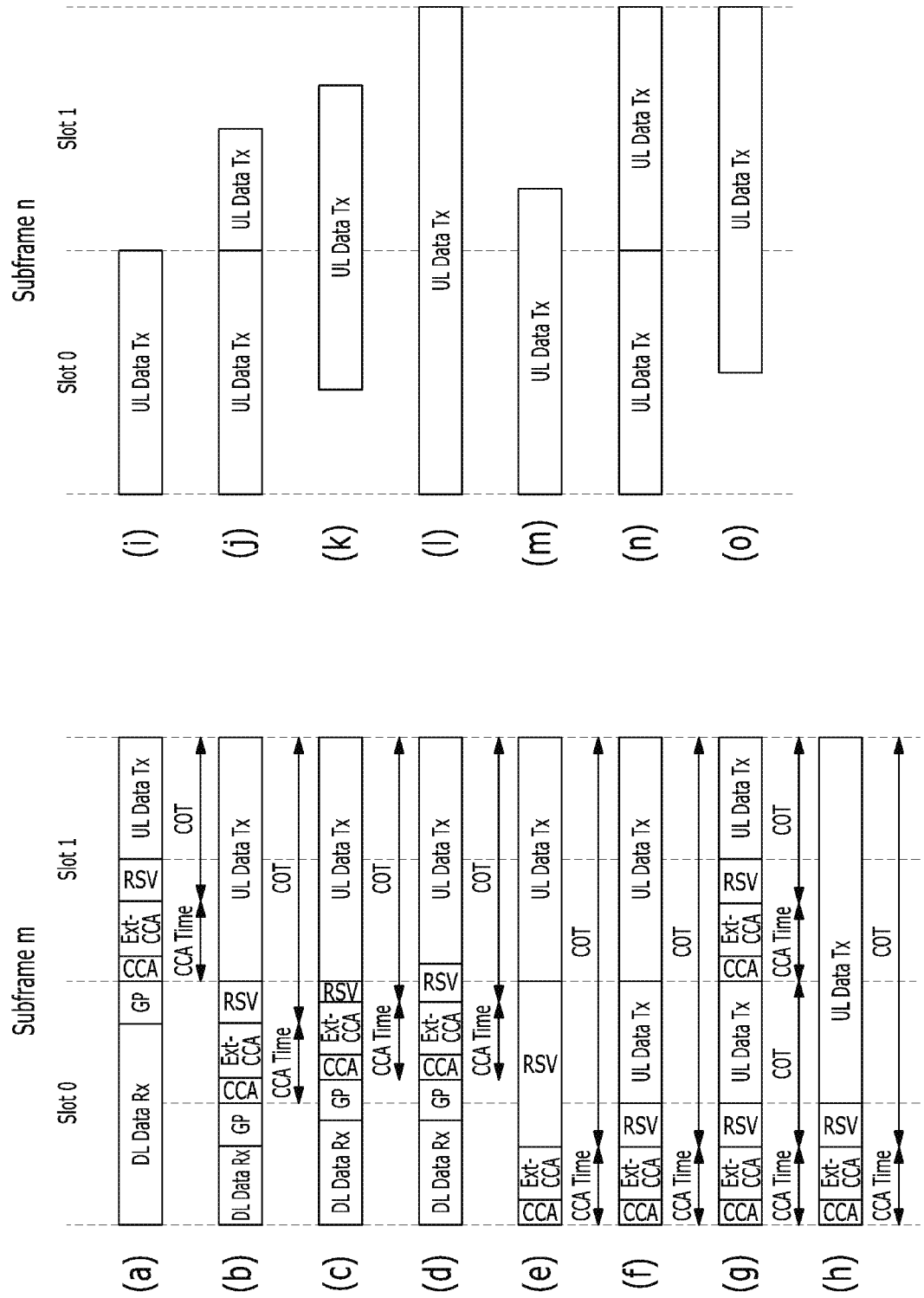
FIG. 19 is a view illustrating a PUSCH format according to the UL grant according to another exemplary embodiment.

FIG. 18 is a view illustrating a PUSCH format according to the UL grant according to an exemplary embodiment and FIG. 19 is a view illustrating a PUSCH format according to the UL grant according to another exemplary embodiment.

The terminal may transmit the PUSCH at a specific timing after the UL Grant according to the format illustrated in FIG. 18. Referring to FIG. 18, the PUSCH format defines a transmission starting point and a transmission ending point of the uplink data as the slot unit, the subframe unit, or the specific timing (i.e., the symbol unit) in the specific frame. In this case, the RSV (reserved) is the special signal and may be omitted as needed. A subframe i-1 in the formats (e) to (h) of FIG. 18 may be used or may not be used as the downlink data. The downlink data is illustrated in the formats (a) to (d) of FIG. 18, however a subframe may also not be used as the downlink data.

The formats (a) to (h) of FIG. 18 are formats which may be applied in the case in which the terminal performs the CCA and transmits the data. The formats (i) to (o) of FIG. 18 are formats which may be applied to the case in which the base station reserves the resources, and even in the case in which the base station reserves the resources, the terminal may transmit the data by applying the formats (a) to (h). In the formats (a) to (d) of FIG. 18, the terminal may transmit the uplink data at a subframe i+k (for example, k=4) in the case in which the UL Grant is at the subframe i. As in the formats (h), (I), (m), and (o), a HARQ timing of a HARQ ACK/NACK for the case in which the PUSCH is transmitted across two subframes may be defined according to a specific subframe (for example, second (later portion) or first subframe) among the two subframes.

Referring to FIG. 19, the terminal receiving the UL Grant at a subframe m−4 may transmit the data after performing the CCA at a subframe m. Alternatively, in the case in which the UL Grant is transmitted to the terminal at the subframe m, the terminal may transmit the data using one of the formats (a) to (o) at a subframe m+4 as a response for the UL Grant.

The formats (a) to (d) of FIGS. 18 and 19 may be applied similarly to a special subframe according to a TDD frame format defined by a 3GPP LTE standard, and the terminal may perform the CCA in a guard period (GP) or may perform the CCA in some or all of an uplink pilot time slot (UpPTS) or a period for transmission of SRS, or a first subframe after the special subframe.

Hereinafter, a method for adjusting a transmission timing of the uplink data after the UL Grant will be described.

For an operation according to the frequency regulation of the unlicensed band, the terminal may set an arbitrary timing in the subframe, not the subframe unit, as the starting/ending timing of the PUSCH, at a timing allocated after the UL Grant. Alternatively, according to another exemplary embodiment, the base station may adjust a transmission timing of the uplink data and may provide a service to the terminal.

In order for the base station to adjust the transmission timing of the uplink data and provide the service to the terminal, the base station may expect the receiving timing of the uplink data after transmitting the UL Grant at a subframe n and the terminal may determine the transmission timing of the uplink date after receiving the UL Grant at a subframe n by considering only a time in which the channel is actually occupied, and may follow the following Equation 1.

$$n+\max\{k, T_{inter-tx}\} \quad \text{[Equation 1]}$$

In Equation 1, k is the transmission/receiving timing (i.e., the subframe) of the uplink data transmitted after receiving/transmitting the UL Grant (subframe n) by terminal/base station defined in 3GPP. In the case in which the PCell is the FDD, k may be 4 (subframe), and in the case in which the PCell is the TDD, k may be 4 to 7 (subframe) according to the UL/DL configuration. $T_{inter-tx}$ is a time (subframe unit) up to an uplink subframe which may be occupied/used through the CCA after receiving the UL Grant.

Figure 20:
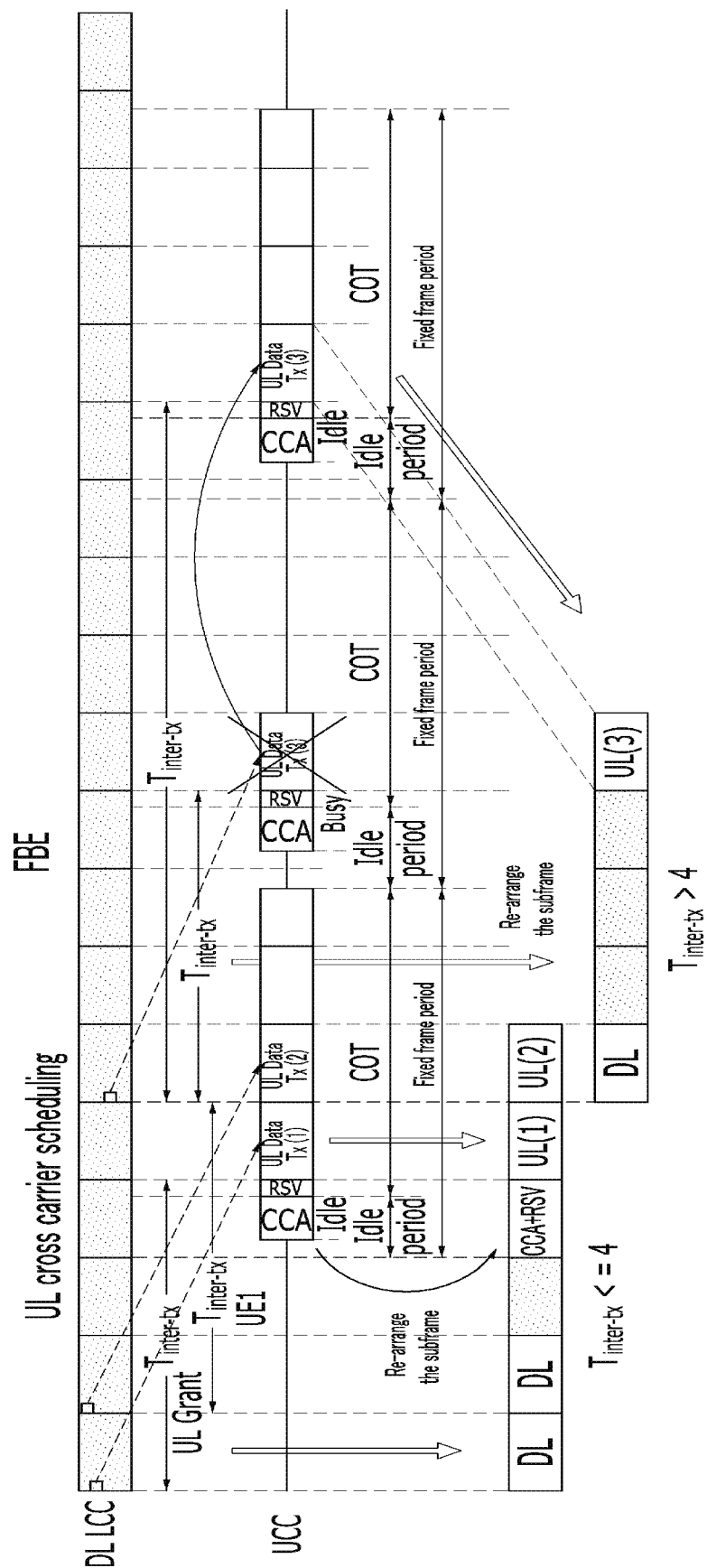
FIG. 20 is a view illustrating a cross-carrier scheduling in which the CCA is a frame based equipment (FBE) scheme according to an exemplary embodiment.
Figure 21:
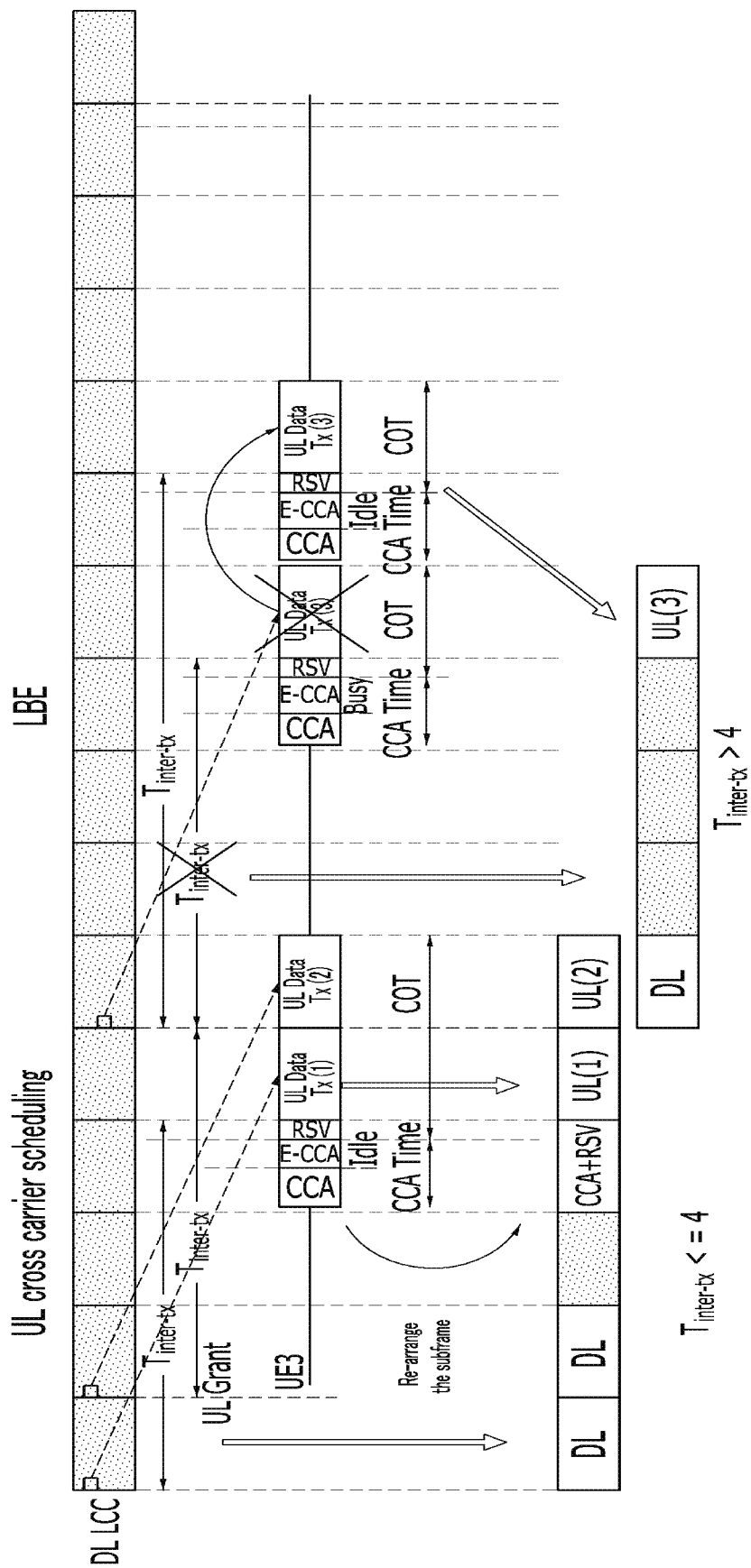
FIG. 21 is a view illustrating a cross-carrier scheduling in which the CCA is a load based equipment (LBE) scheme according to an exemplary embodiment.
Figure 22:
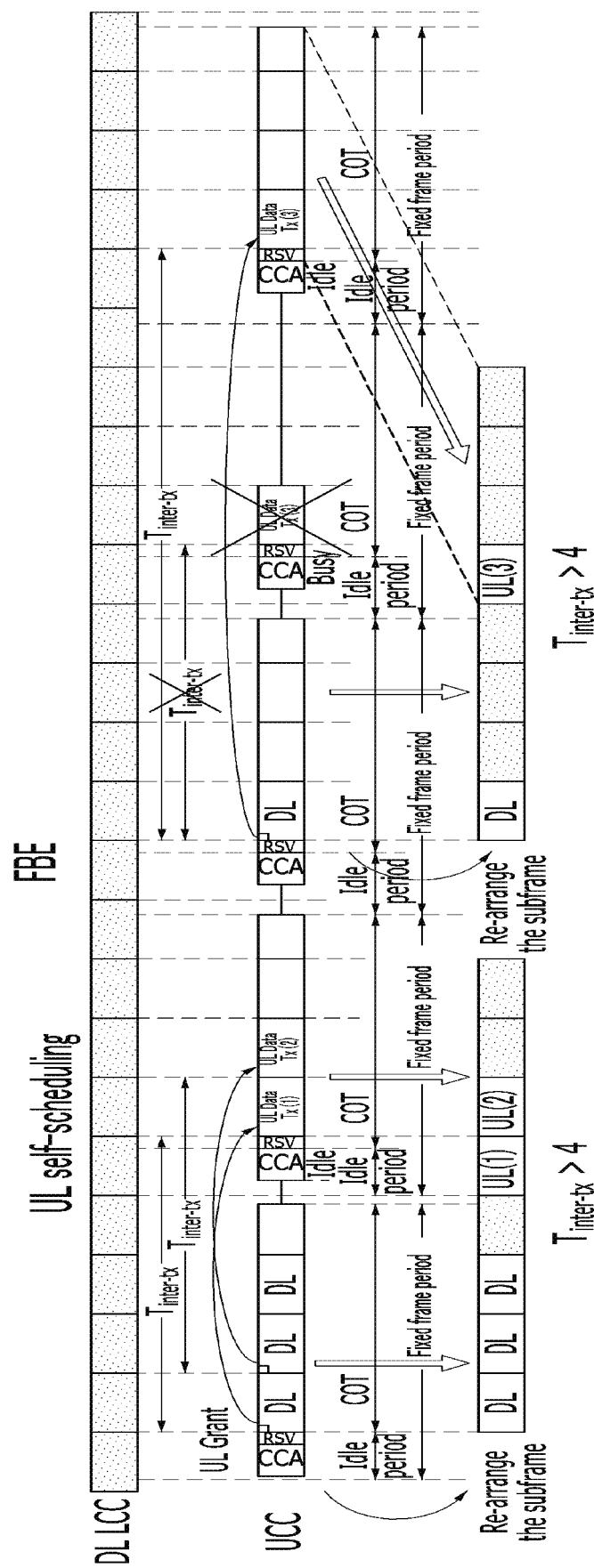
FIG. 22 is a view illustrating a self scheduling in which the CCA is the FBE scheme according to an exemplary embodiment.
Figure 23:
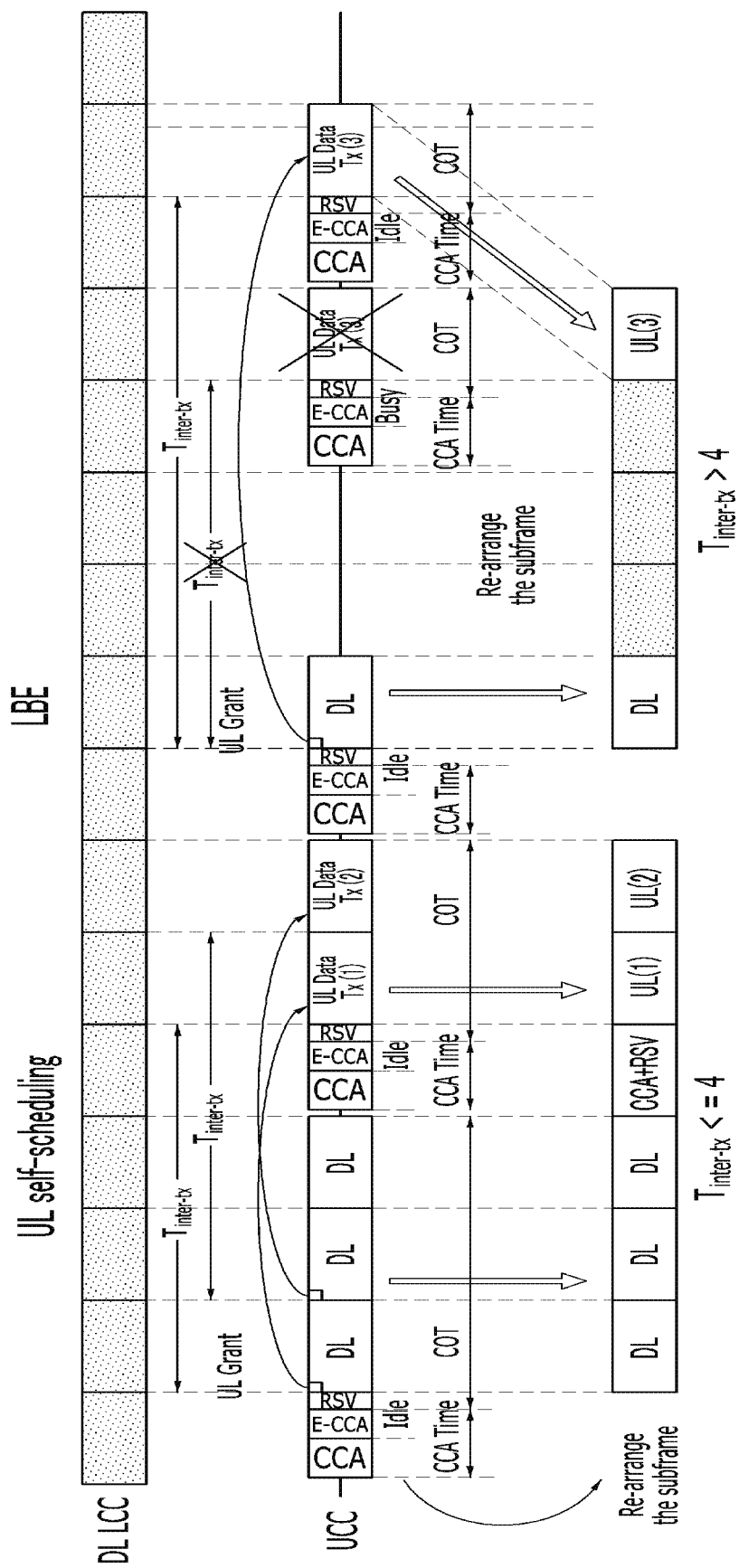
FIG. 23 is a view illustrating a self scheduling in which the CCA is the LBE scheme according to an exemplary embodiment.

FIG. 20 is a view illustrating a cross-carrier scheduling in which the CCA is a frame based equipment (FBE) scheme according to an exemplary embodiment, FIG. 21 is a view illustrating a cross-carrier scheduling in which the CCA is a load based equipment (LBE) scheme according to an exemplary embodiment, FIG. 22 is a view illustrating a self scheduling in which the CCA is the FBE scheme according to an exemplary embodiment, and FIG. 23 is a view illustrating a self scheduling in which the CCA is the LBE scheme according to an exemplary embodiment.

In FIGS. 20 to 23, it is assumed that k is 4, and in the case of the TDD, k may be applied as 4 to 7. In the case in which the uplink data occurs and it is necessary to transmit the uplink data, the terminal may perform the CCA, and occupy the channel, thereby transmitting the data.

Referring to FIGS. 20 and 21, in the case of an uplink cross-carrier scheduling, the resources are allocated through the licensed band, and the terminal generates a virtual frame from a timing (subframe n) at which the UL Grant is received, and performs the CCA before a k(=4)-th subframe after the timing at which the UL Grant is received. In addition, in the case in which the terminal occupies the channel after performing the CCA, the terminal transmits the data at a timing n+k when a timing at which the data may be transmitted is less than or equal to k. However, in the case in which the terminal does not occupy the channel as a result of the CCA and additionally performs the CCA to then occupy the channel, since $T_{inter-tx}$ becomes longer than k, the terminal omits $T_{inter-tx}$, and transmits the uplink data by regarding the channel occupancy time after receiving the UL Grant as the uplink subframe. In this case, since the uplink resources are allocated by the cross-carrier scheduling, in the case in which the terminal receives the UL Grant from the base station while transmitting the uplink data, the terminal may generate the virtual frame from the timing at which the UL Grant is received and may transmit the data.

Referring to FIGS. 22 and 23, in the case of the uplink self scheduling, the base station performs the CCA for allocating the resources through the UL Grant and the CCA for the uplink data transmission. The virtual frame is generated from the resource allocation timing (the reception timing of the UL Grant). In addition, if the channel is occupied according to the CCA result until a timing at which the data may be transmitted (for example, a timing n+p when p is less than or equal to k), the terminal transmits the uplink data at a data transmission timing (timing n+k). However, in the case in which the channel is not occupied as a result of the CCA and the channel is occupied as a result of the additional CCA, since $T_{inter-tx}$ becomes longer than k, the terminal does not consider $T_{inter-tx}$ to determine the data transmission timing (n+k), and transmits the uplink data after regarding the channel occupancy time after receiving the UL Grant as the subframe.

Referring to FIGS. 22 and 23, in the uplink data transmission through the uplink cross-carrier scheduling and the self scheduling, the base station performs the CCA to transmit the UL Grant. In this case, the base station may include related information in the "RSV" transmitted after the CCA so that the channel occupancy/use for transmitting the UL grant and the channel occupancy/use for the uplink data transmission may be classified. In this case, the "RSV" may be used for purpose of a time alignment or a subframe boundary alignment for the data transmission after an additional CCA and for purpose of preventing the channel occupancy/use of other devices (e.g., WiFi device, other eNBs, UE, etc.) between the CCA and the data transmission timing. In this case, the "RSV" may include some or all of information for a time/channel synchronization for the data transmission, a distinction of a data transmission device, and the like.

Referring to FIGS. 20 and 22, in the case in which the CCA of the FBE scheme is performed, the CCA for the data transmission is performed in an idle period which is uniformly given. Referring to FIGS. 21 and 23, in the case in which the CCA of the LBE scheme is performed, the CCA for the data transmission is performed before a timing k (immediately before the timing k) for the data transmission after receiving the UL Grant.

While the additional CCA is performed, in the case in which the terminal receives a new UL Grant from the base station, or a predetermined time lapses, or the terminal does not transmit the uplink data at the timing n+k as a result of the CCA, the terminal does not transmit the data transmission, and may transmit the uplink data by the newly received UL Grant. In addition, in the case in which the base station occupies the resources for the downlink data transmission at a timing n+k through the CCA, the terminal may not transmit the uplink data at the timing n+k regardless of the reception of the UL Grant transmitted from the base station at a timing n.

Figure 24:
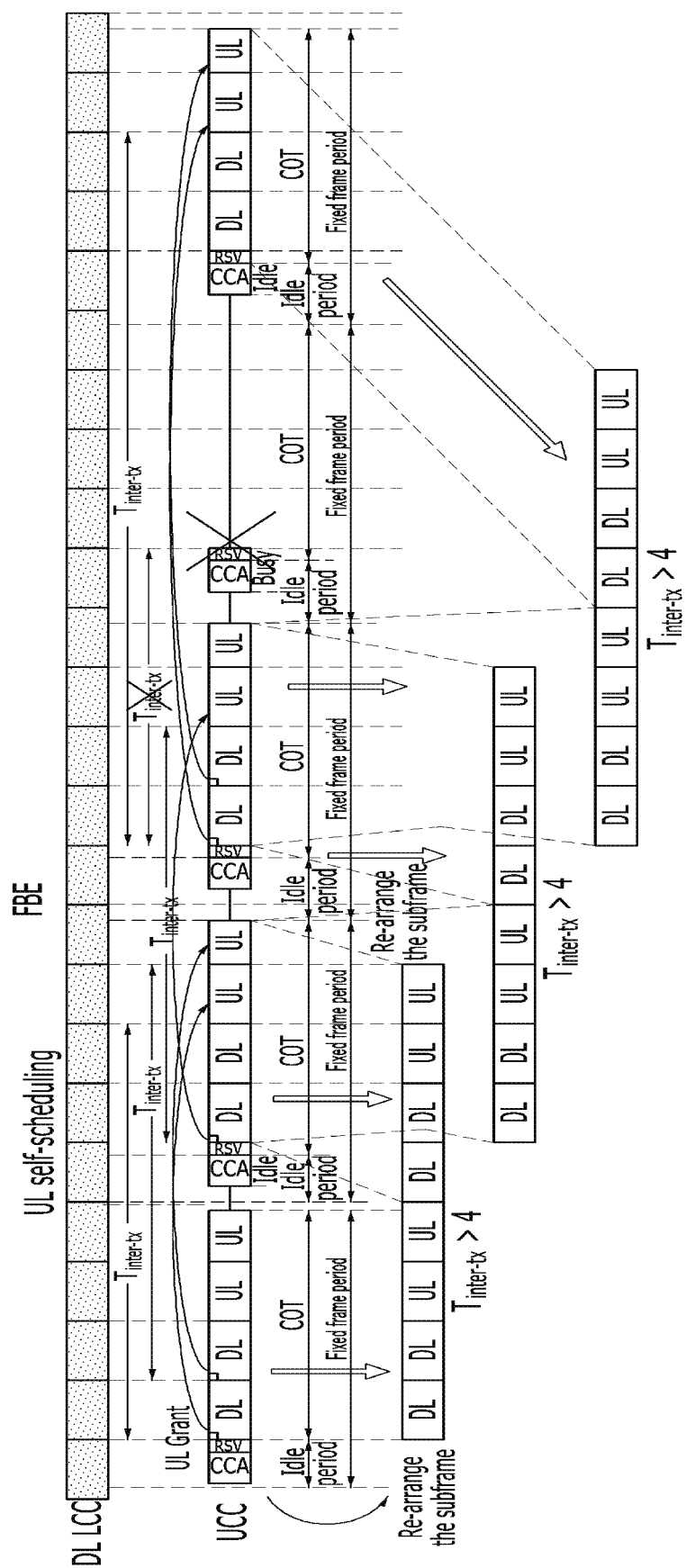
FIG. 24 is a view illustrating a method in which a channel is occupied by the self scheduling that performs the CCA once in a case in which the CCA is the FBE scheme according to an exemplary embodiment.
Figure 25:
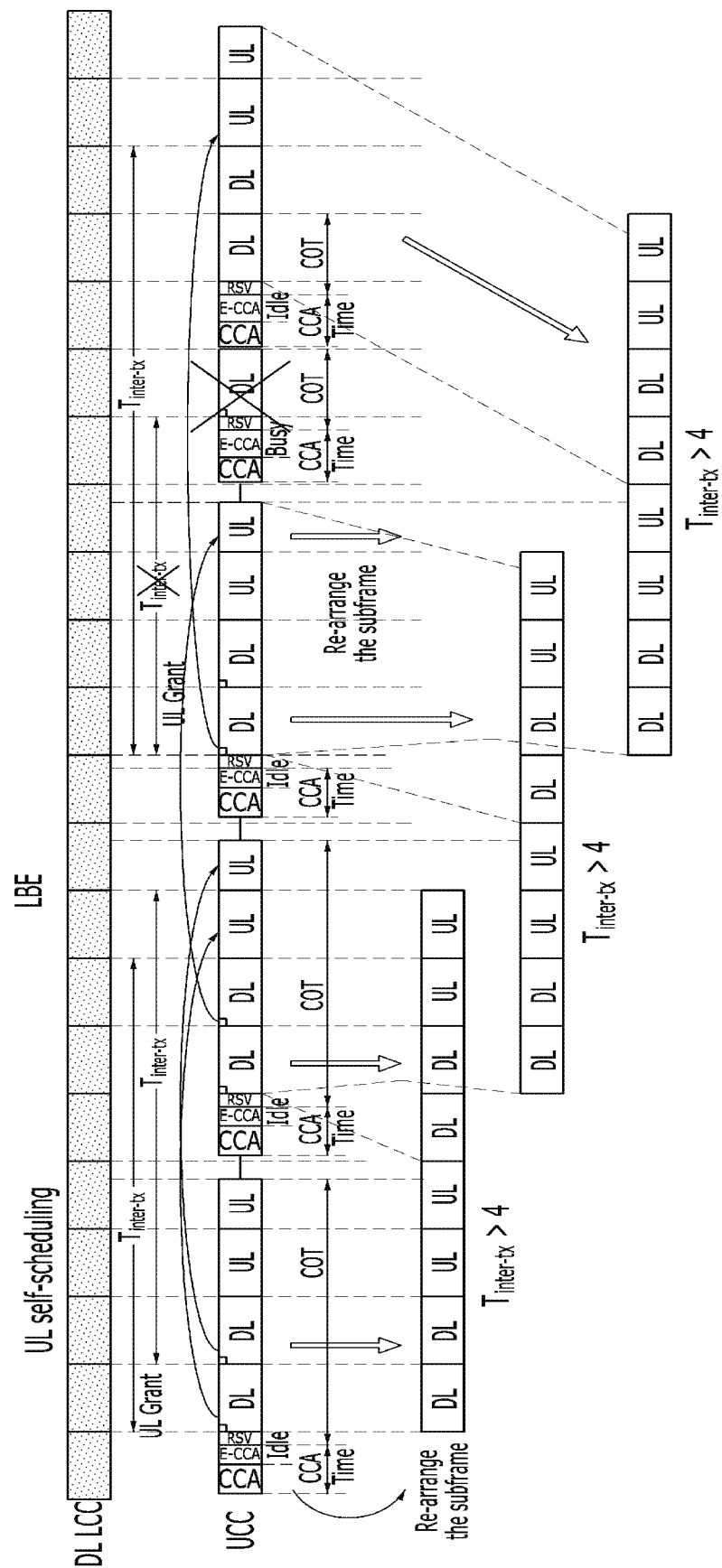
FIG. 25 is a view illustrating a method in which a channel is occupied by the self scheduling that performs the CCA once in a case in which the CCA is the LBE scheme according to an exemplary embodiment.

FIG. 24 is a view illustrating a method in which a channel is occupied by the self scheduling that performs the CCA once in a case in which the CCA is the FBE scheme according to an exemplary embodiment, and FIG. 25 is a view illustrating a method in which a channel is occupied by the self scheduling that performs the CCA once in a case in which the CCA is the LBE scheme according to an exemplary embodiment.

Referring to FIG. 24, in the case in which the CCA of the FBE scheme is performed, if the channel is not occupied by the terminal or the base station, the base station or the terminal waits up to a next idle period and then again performs the CCA. Meanwhile, referring to FIG. 25, in the case in which the CCA of the LBE scheme is performed, if the base station or the terminal does not occupy the channel through the CCA, the base station or the terminal may occupy the channel by immediately performing the additional CCA. In common in the FBE scheme and the LBE scheme, the base station and the terminal generate the virtual subframe from the transmission/reception timing of the UL Grant, and transmit the uplink data in a k-th subframe after the subframe receiving the UL Grant within the virtual subframe. That is, since the downlink/uplink data may be transmitted through the CCA (the CCA for the resource allocation) once, the terminal may not additionally perform the CCA for the data transmission.

As described above, since the CCA is performed to transmit the uplink data due to the limit of the COT and the uplink data is transmitted, the transmission timing (k) of the data after receiving the UL Grant may not be corrected.

FIG. 26 is a view illustrating a possible uplink/downlink subframe configuration according to an exemplary embodiment and FIG. 27 is a view illustrating a transmission timing of uplink data of the uplink/downlink subframe configuration according to FIG. 26.

Referring to FIG. 26, the possible uplink/downlink subframe configuration of the virtual frame generated from the UL Grant transmitting/receiving timing is illustrated, and the case in which the COT after the CCA is 4 ms is illustrated. FIG. 27 illustrates the transmission timing of the uplink data according to the subframe configuration illustrated in FIG. 26, wherein a timing at which the uplink data is transmitted based on a current subframe is indicated in a unit of 1 ms. The transmission timing of the uplink data illustrated in FIG. 27 may follow Equation 1. In this case, one subframe configuration of the subframe configurations illustrated in FIG. 26 may be applied to every CCA.

Figure 28:
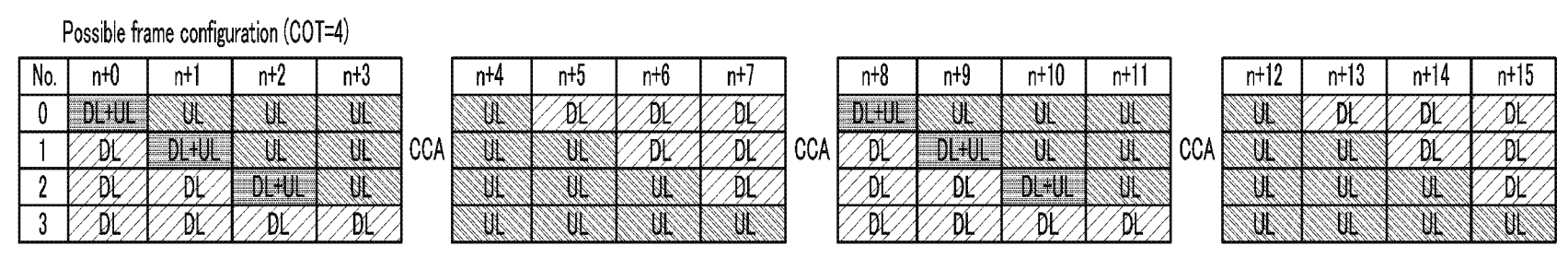

FIG. 28 is a view illustrating a possible uplink/downlink subframe configuration according to another exemplary embodiment and FIG. 29 is a view illustrating a transmission timing of uplink data of the uplink/downlink subframe configuration according to FIG. 28.

Referring to FIG. 28, in order to transmit the uplink data at a predetermined timing (for example, k=4) after the subframe receiving the UL Grant, the subframe configuration after a second CCA may be determined depending on a first frame structure. For example, in the case in which an UL subframe of a first frame is across the last two subframes (No. 1), first two subframes of a second subframe may be configured of UL, and the remaining two subframes may be configured of DL. In this case, the transmission timing of the uplink data may be guaranteed.

Figure 30:
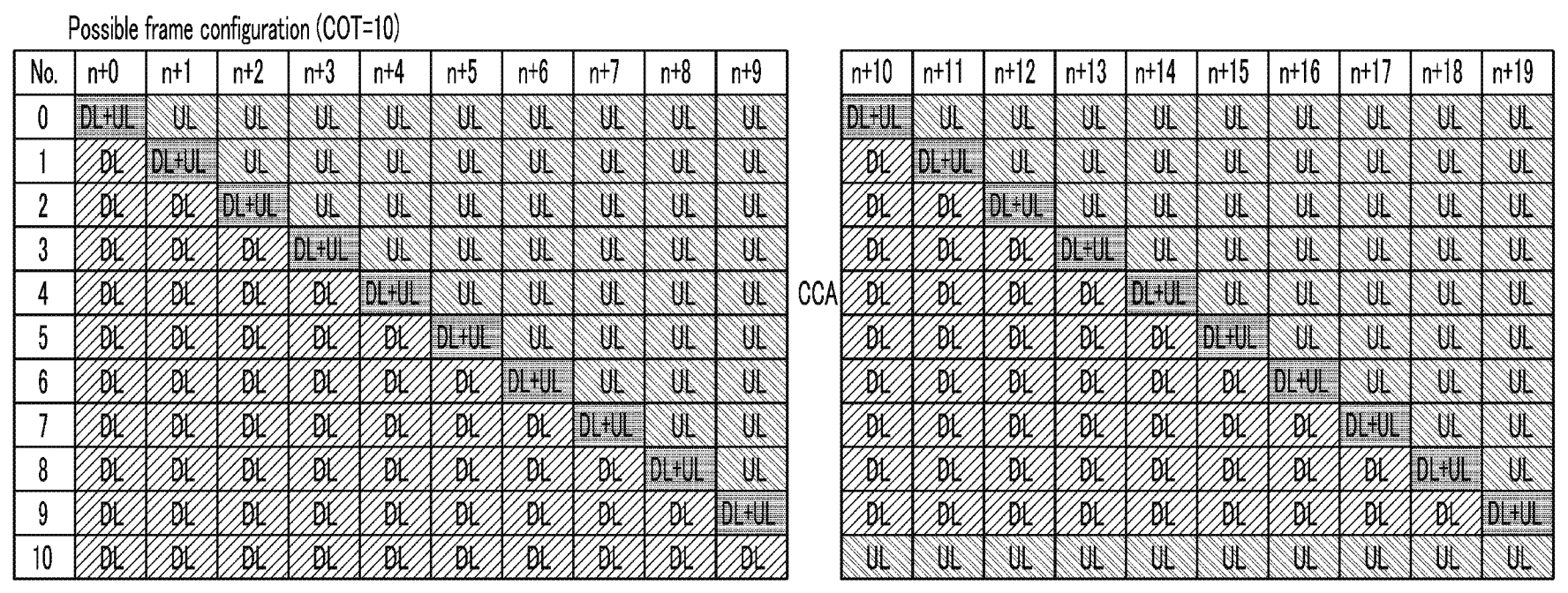

FIG. 30 is a view illustrating a possible uplink/downlink subframe configuration according to still another exemplary embodiment and FIG. 31 is a view illustrating a transmission timing of uplink data of the uplink/downlink subframe configuration according to FIG. 30.

Referring to FIG. 30, in the case in which the COT is 10 ms, the uplink/downlink subframe configuration according to another exemplary embodiment is similar to a TDD frame configuration defined by 3GPP. That is, a new frame configuration according to FIG. 30 may be added to a method in which the virtual subframe is generated by virtually connecting the frames configured for each of CCAs, and the UL subframe is initially transmitted at a timing of 4 ms after receiving the UL Grant within the generated virtual subframe. Therefore, the transmission timing of the uplink data is defined as illustrated in FIG. 31. In this case, in the case of the subframe in which both the uplink/downlink are included, the uplink data is not transmitted, and it may be defined that the uplink data is transmitted at a next UL subframe. That is, except the case in which all of the subframes are UL or DL (frame configuration No. 10), similarly to the TDD frame configuration, the same frame configuration may be regulated to every CCA.

Figure 32:
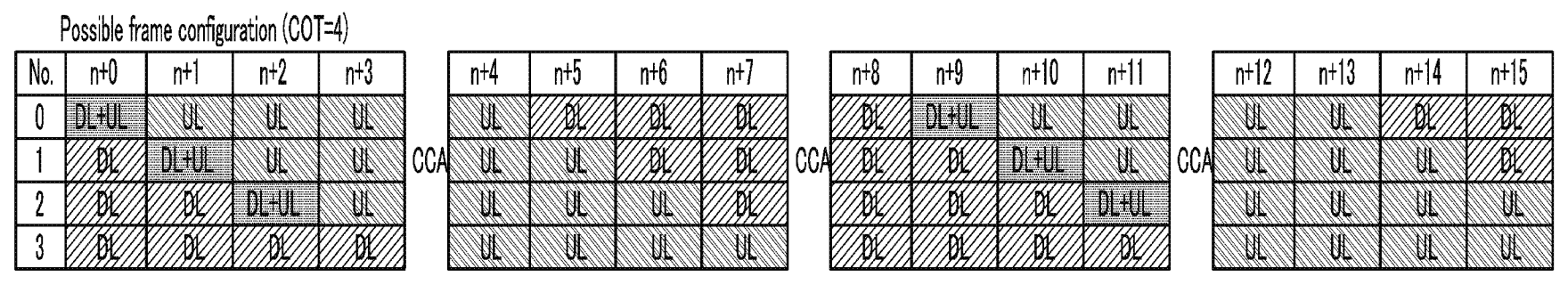
Figure 34:
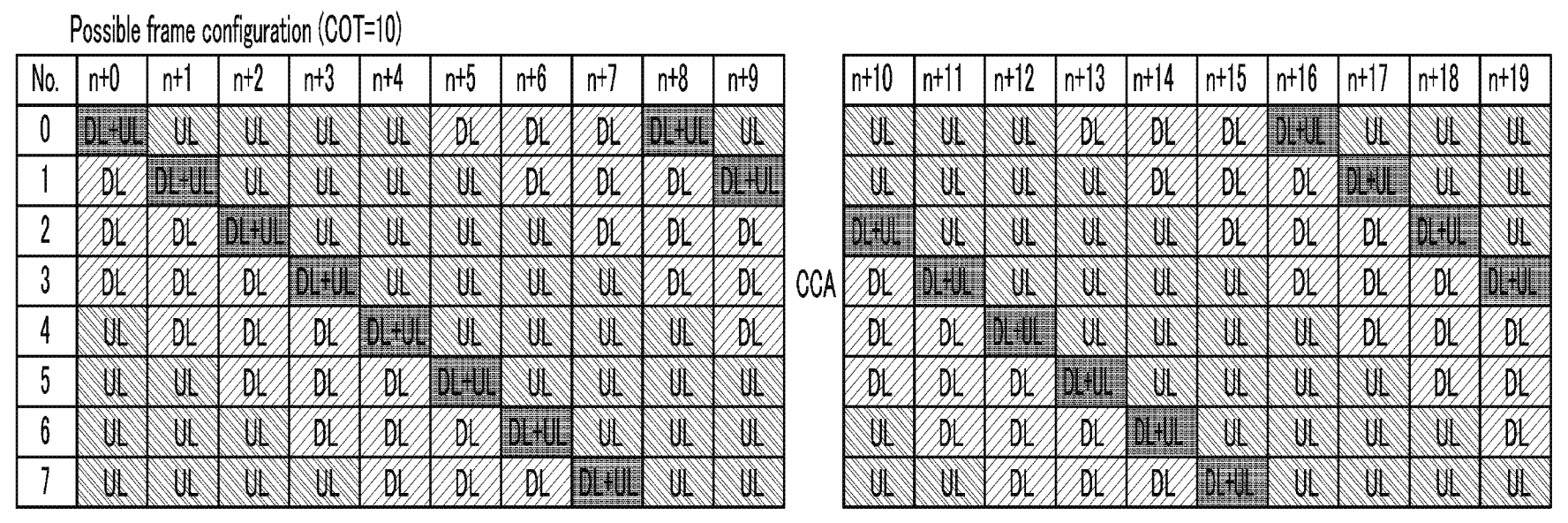

FIG. 32 is a view illustrating a possible uplink/downlink subframe configuration according to still another exemplary embodiment, FIG. 33 is a view illustrating a transmission timing of uplink data of the uplink/downlink subframe configuration according to FIG. 32, FIG. 34 is a view illustrating a possible uplink/downlink subframe configuration according to still another exemplary embodiment, and FIG. 35 is a view illustrating a transmission timing of uplink data of the uplink/downlink subframe configuration according to FIG. 34.

Referring to FIGS. 32 and 34, each of the frame configurations repetitively occupies the DL/UL by 4 ms, FIG. 32 illustrates a case in which the channel occupancy time is 4 ms, and FIG. 34 illustrates a case in which the channel occupancy time is 10 ms. In addition, referring to FIGS. 33 and 35, according to each of the frame configurations, the transmission timing of the uplink data after the subframe receiving the UL Grant is fixed to k(=4) in the virtually generated frame.

Figure 36:
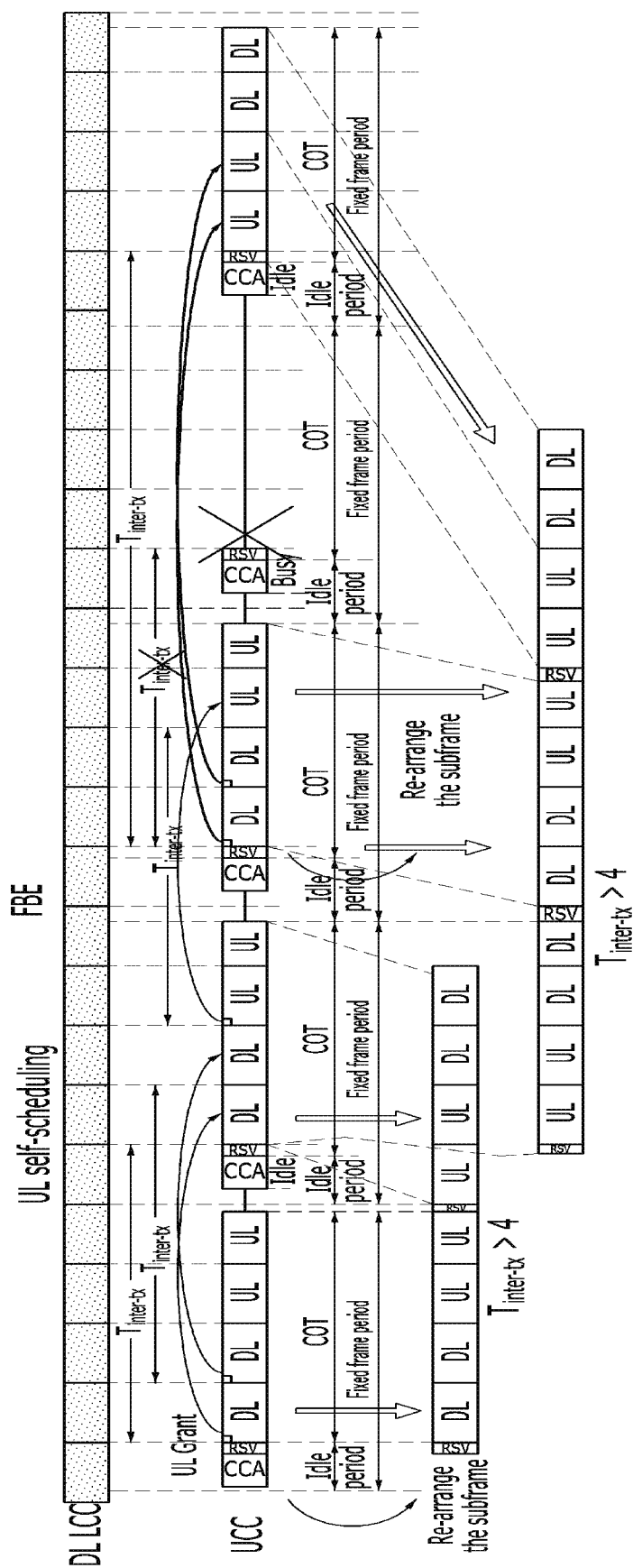
FIG. 36 is a view illustrating a method for performing a self scheduling based on a frame configuration in which an uplink and a downlink are occupied at the same ratio according to an exemplary embodiment.
Figure 37:
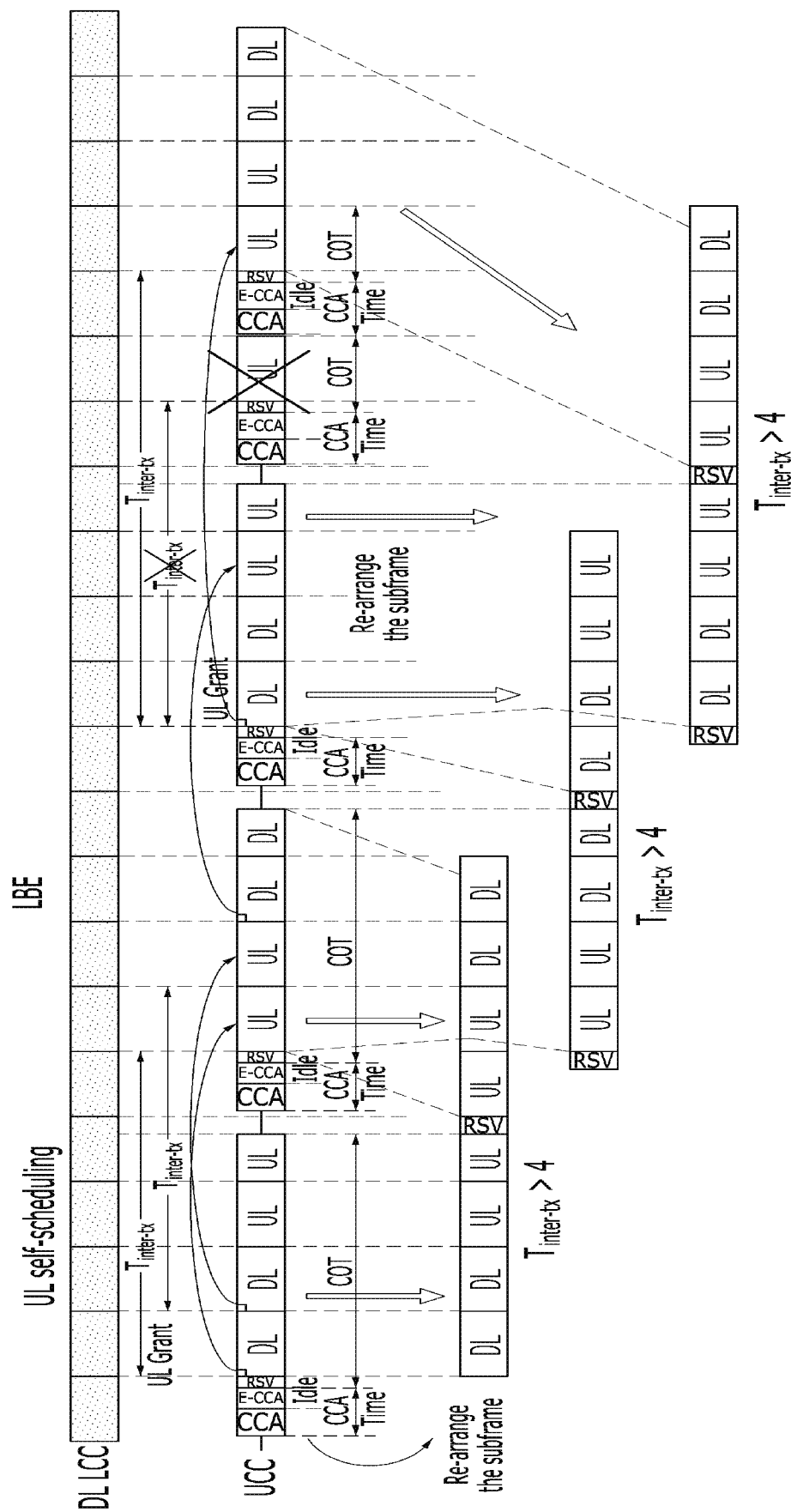
FIG. 37 is a view illustrating a method for performing a self scheduling based on a frame configuration in which an uplink and a downlink are occupied at the same ratio according to another exemplary embodiment.

FIG. 36 is a view illustrating a method for performing a self scheduling based on a frame configuration in which an uplink and a downlink are occupied at the same ratio according to an exemplary embodiment and FIG. 37 is a view illustrating a method for performing a self scheduling based on a frame configuration in which an uplink and a downlink are occupied at the same ratio according to another exemplary embodiment.

In FIG. 36, the CCA may be performed according to the FBE scheme, and in FIG. 37, the CCA may be performed according to the LBE scheme. In addition, in common in FIGS. 36 and 37, the frame configuration occupies DL and UL of the case in which the channel occupancy time is 4 ms at the same ratio (1:1), and the uplink/downlink subframes are each repetitively occupied by 4 ms. Referring to FIGS. 36 and 37, as in the case in which a specific frame after the CCA starts with the DL subframe, and a frame after a next CCA starts with the UL subframe, information for distinguishing consecutive frames configuring the virtual frame may be included in a reservation signal transmitted after the CCA. For example, the reservation signal may include information on a first portion or a second portion of the virtual frame such as whether or not the frame "starts from the DL subframe" or "starts from the UL subframe". The reservation signal including the information for distinguishing the consecutive frames configuring the virtual frame may also be applied to a case in which the channel occupancy time is not 4 ms (e.g., 10 ms). In addition, a configuration of the second frame may be determined according to a configuration of the last four subframes of the first frame. For example, in the case in which the last subframe of the first frame is "DL, DL, DL (or DL+UL), and UL", a start of the second frame may be configured in a form of "UL, UL, UL, and DL". In addition, the DL and UL subframes are each repetitively occupied at the specific ratio (M:N in which M≠N, for example, the number M of the DL subframes and the number N of the UL subframes) as the frame configuration.

The method for adjusting the transmission timing of the data after receiving the UL Grant described above may be included in the reservation signal (or an initial signal, a preamble, or the like) transmitted before the data is transmitted after performing the CCA, or may be included in the PDCCH. Alternatively, the above-mentioned method may be transmitted in the upper layer (RRC level signaling), or may also be transmitted using MAC CE or the like, and a predefined value may also be used. In addition, in this case, an index (i.e., configuration #) generated by indexing of the frame configuration is configured for the terminal in advance, thereby making it possible to transmit and receive the data between the base station and the terminal by an accurate specification.

Hereinafter, a method for adjusting a transmission timing of the uplink data after receiving the UL Grant (at subframe n) to provide a service to a plurality of terminals will be described.

Figure 38:
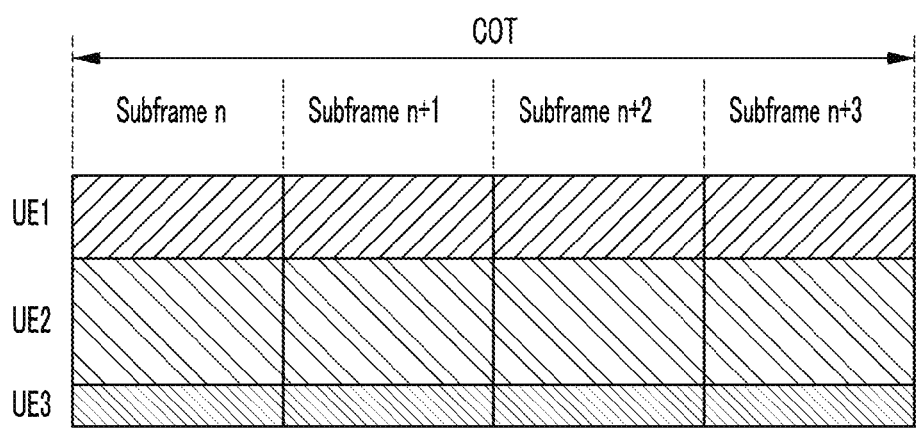
FIG. 38 is a view illustrating a method for allocating resources to a plurality of terminals according to an exemplary embodiment.

FIG. 38 is a view illustrating a method for allocating resources to a plurality of terminals according to an exemplary embodiment.

For example, as a result obtained by performing the CCA by the UE1 to transmit the uplink data in the subframe n+k, if the channel is "busy" and as a result obtained by additionally performing the CCA by the UE1 to transmit the uplink data in a subframe n+k+m (m≥1), if the channel is "idle", the UE1 transmits the uplink data in the subframe n+k+m. However, in this case, if the UE2 also performs the CCA to transmit the data in the subframe n+k+m, the UE1 and the UE2 may simultaneously determine that the channel is "idle". As a result, since the uplink data is transmitted to the base station from the UE1 and UE2 in the same resource, the base station may not properly receive the uplink data. In order to solve the above-mentioned problem, 1) when the uplink data is transmitted to the base station from the plurality of terminals in the same resource, the base station transmits the new UL Grant to the plurality of terminals to induce retransmission of the uplink data, or 2) it is prevented to allocate the same resource to the plurality of terminals by the base station, thereby making it possible to prevent the uplink data from being transmitted at the same timing. Alternatively, 3) the base station does not allocate the same resource on a frequency axis to the plurality of terminals during the COT, thereby allowing the base station to receive the uplink data transmitted from the plurality of terminals, or 4) as a result obtained by performing the CCA for transmitting the uplink data in the subframe n+k, if the channel is "busy", it may be set that the terminal does not transmit the uplink data in the subframe n+k. Here, in the case in which the channel occupancy in the CCA for transmitting the uplink data in the subframe n fails and the uplink data is not transmitted, an instruction of transmitting the uplink data in a subsequent subframe (e.g., the subframe n+k+m) through the additional CCA or allowing the additional CCA not to be performed may be included in the UL Grant, or transmitted through the upper layer (RRC level signaling), or may be transmitted using the MAC CE, or the like, and a preset value may also be used.

Figure 39:
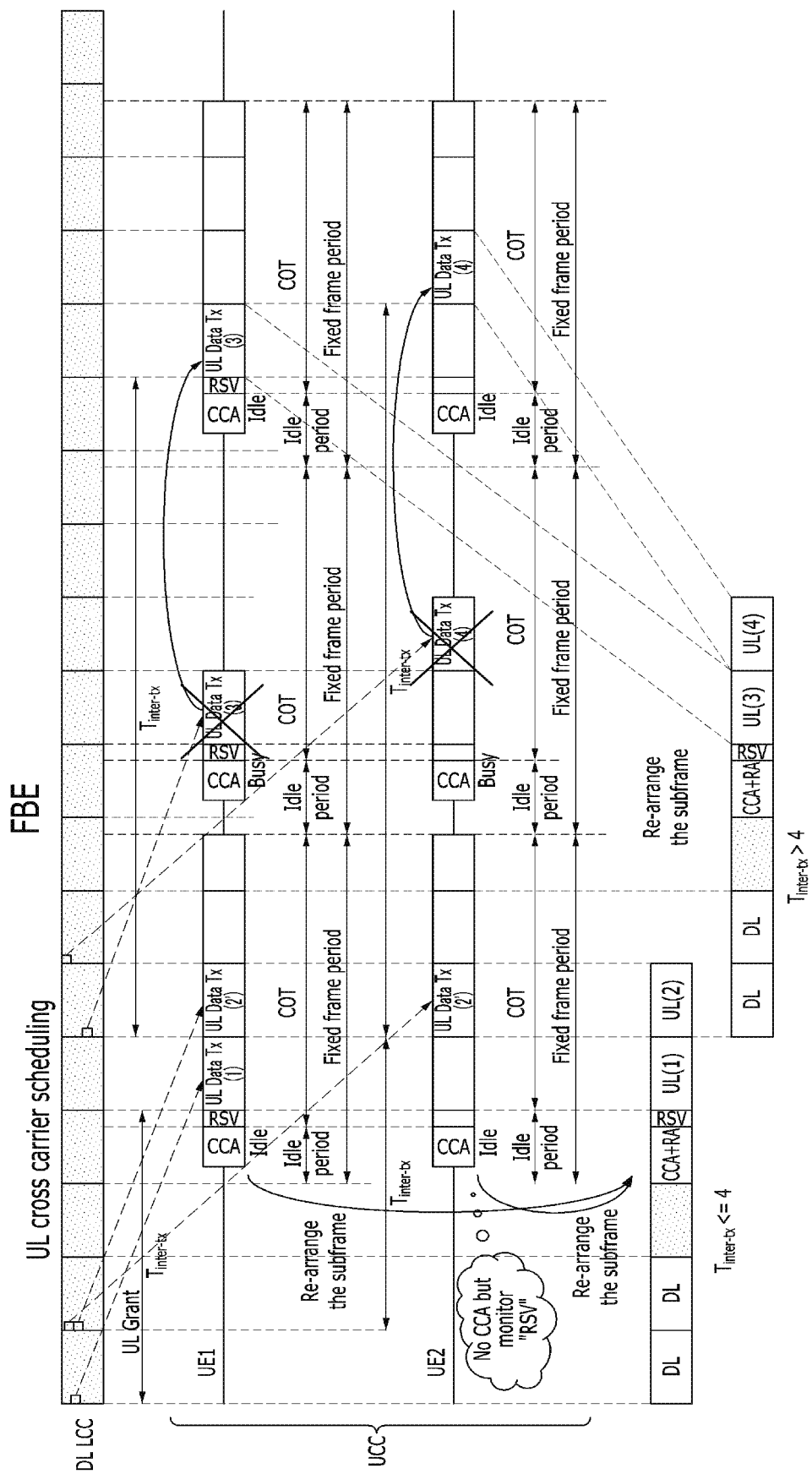
FIG. 39 is a view illustrating a method for allocating resources to a plurality of terminals by a cross-carrier scheduling in a case in which the CCA is the FBE scheme according to an exemplary embodiment.
Figure 40:
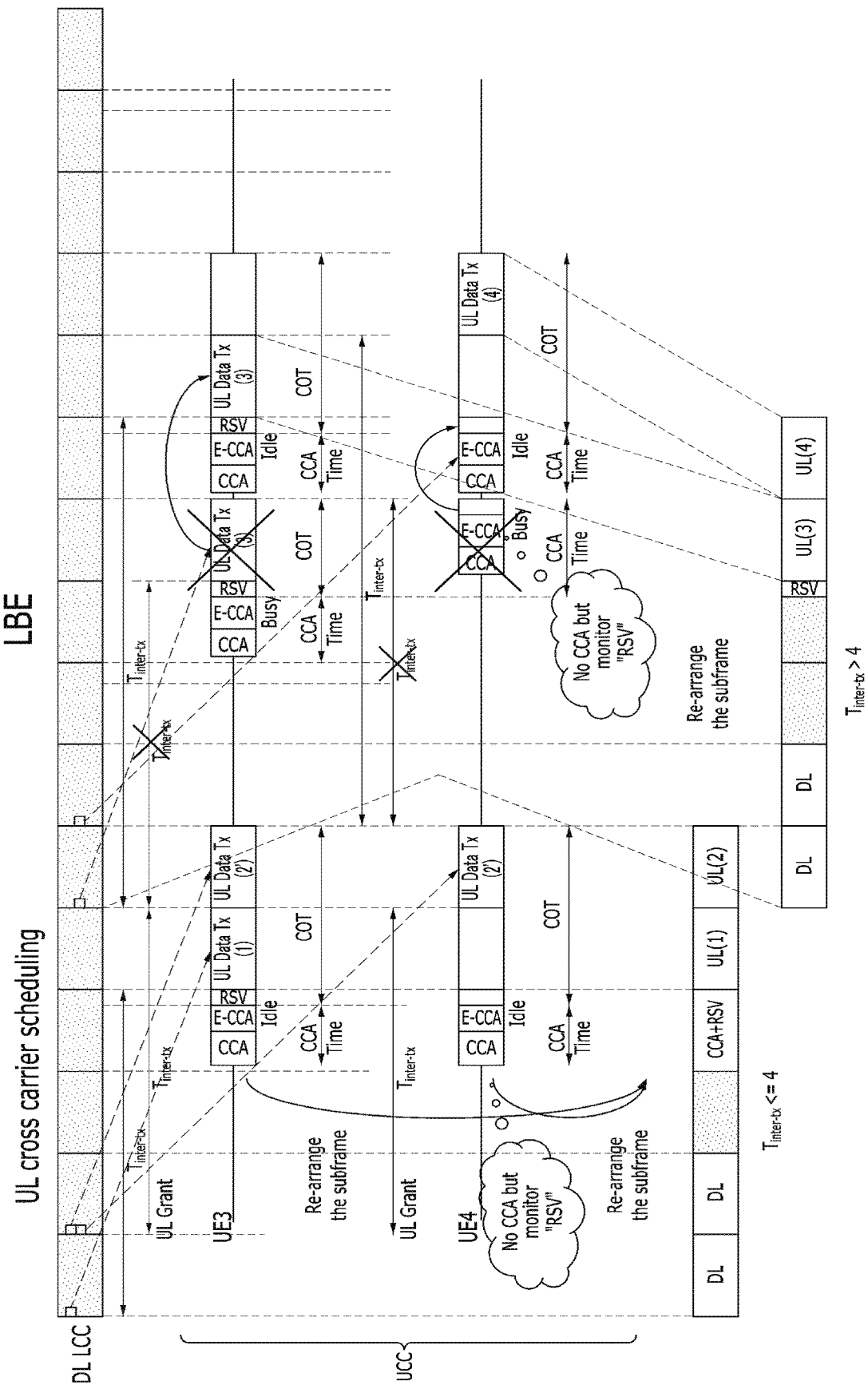
FIG. 40 is a view illustrating a method for allocating resources to a plurality of terminals by a cross-carrier scheduling in a case in which the CCA is the LBE scheme according to an exemplary embodiment.

FIG. 39 is a view illustrating a method for allocating resources to a plurality of terminals by a cross-carrier scheduling in a case in which the CCA is the FBE scheme according to an exemplary embodiment and FIG. 40 is a view illustrating a method for allocating resources to a plurality of terminals by a cross-carrier scheduling in a case in which the CCA is the LBE scheme according to an exemplary embodiment.

According to an exemplary embodiment, in order to provide the service to the plurality of terminals, the method for transmitting the special signal and the method for adjusting the transmission timing of the uplink data described above may be combined.

Referring to FIGS. 39 and 40, first, if the base station allocates (UL Grant) the uplink resources through the licensed band, the terminals (UE1 and UE3) receiving the UL Grant perform the CCA to transmit the uplink data in the corresponding unlicensed band and occupy the channel. In the case in which the UE1 and UE3 occupy the channel through the CCA, the UE1 and UE3 transmit "RSV", and the base station receiving the uplink data (UL data Tx 1 and UL data Tx 2') "RSV" in the resource allocated through the UL Grant expects the uplink data from the terminal receiving the UL Grant and prepares to receive the uplink data. In this case, even in the case in which the base station does not receive "RSV", the base station may expect the uplink data and may prepare to receive the uplink data. That is, even though the base station does not receive "RSV", the base station may determine that the channel is "idle" and may prepare to receive the uplink data. However, in order to efficiently receive the data, if "RSV" is not received, the base station may determine that the channel is "busy" (i.e., determine that the channel is occupied/used by other devices), may not expect the uplink data, and may not prepare to receive the uplink data. Referring to FIG. 39, in the case of the FBE, the reception is deferred up to a next idle period, and the reception of "RSV" is again expected. Referring to FIG. 40, in the case of the LBE, "RSV" may be continuously expected or be expected during a predetermined time, or the reception of the uplink data may be expected.

Referring to FIG. 39, the UE2 expects "RSV" in a given idle period and prepares to receive "RSV". If the UE2 does not receive "RSV" and determines that the channel is "idle", the UE2 occupies the channel and attempts to transmit the uplink data using the allocated resource. In addition, the UE2 blocks the channel to prevent the channel occupancy/use of other devices until the UE2 transmits the uplink data (UL data Tx2) using the allocated resource. If the UE2 does not receive "RSV" and determines that the channel is "busy", the UE2 does not transmit the uplink data (UL data Tx 4) and defers the transmission of the uplink data until the next idle period.

Referring to FIG. 40, the UE4 expects to receive "RSV" after receiving the UL Grant, and prepares to receive "RSV". As a result, similar to the case of the FBE of FIG. 39, if the UE4 does not receive "RSV" and determines that the channel is "idle", the UE4 occupies the channel and attempts to transmit the uplink data using the allocated resource. In this case, the UE4 blocks the channel to prevent the channel occupancy/use of other devices until the UE4 transmits the uplink data using the allocated resource. Meanwhile, if the UE4 does not receive "RSV" and determines that the channel is "busy", the UE4 does not transmit the uplink data and defers the transmission of the uplink data, and then again waits during a predetermined time (for example, from after two subframes to the reception of next UL grant, or indicated time period) to receive "RSV". In order for the terminal to more efficiently expect/receive "RSV", the base station may notify an expected timing of the transmission of "RSV" to the UE4 at a timing at which the UL Grant is transmitted to the UE3, or may notify the expected timing of the transmission of "RSV" to the UE4 through the UL Grant.

In addition, the base station and the terminal determine that a frame for the uplink data starts from a transmission/reception timing of "RSV", generate the virtual frame, and then adjust the transmission timing of the uplink data after receiving the UL Grant, thereby making it possible to transmit and receive the data.

Figure 41:
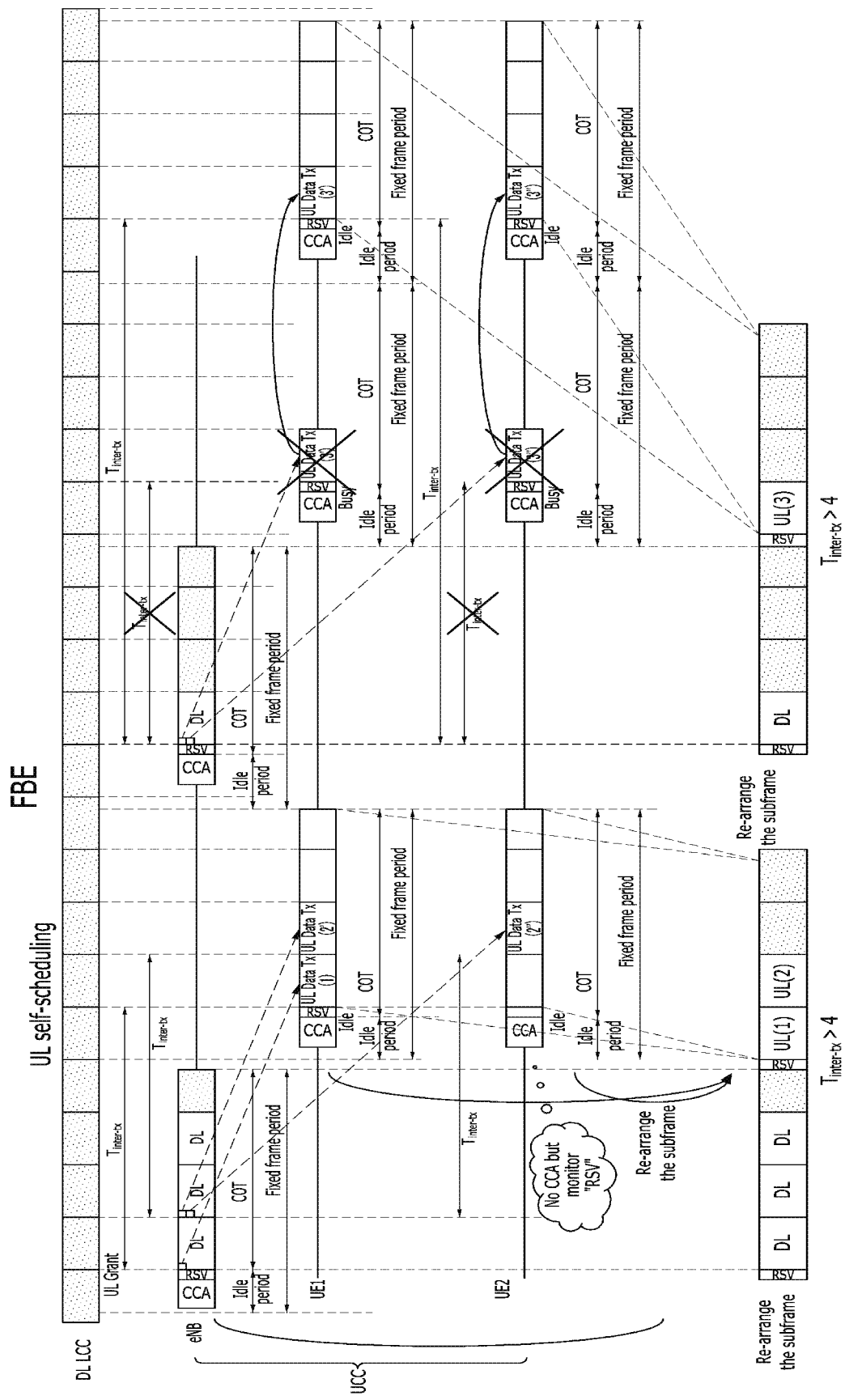
FIG. 41 is a view illustrating a method for allocating resources to a plurality of terminals by a self scheduling in a case in which the CCA is the FBE scheme according to an exemplary embodiment.
Figure 42:
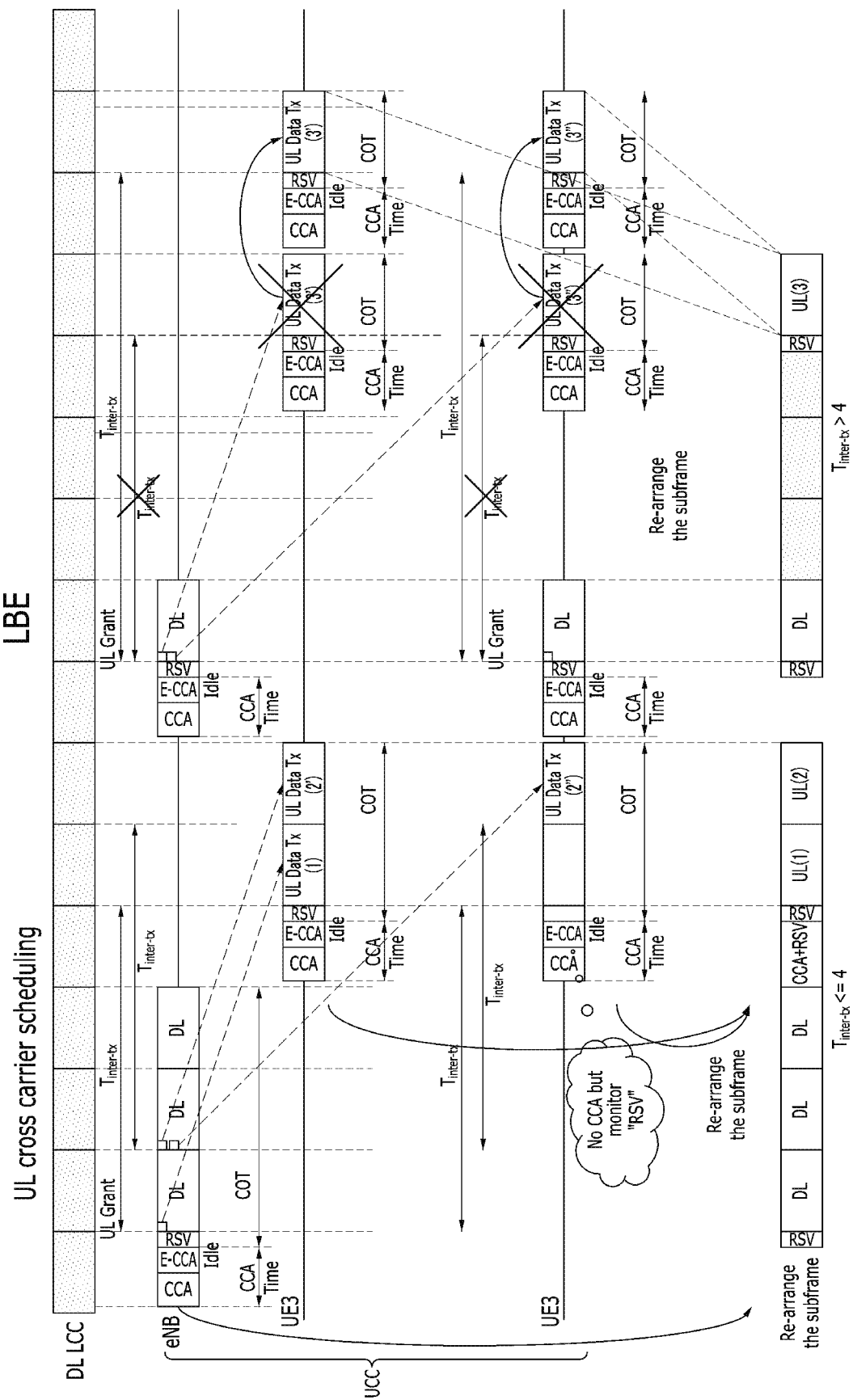
FIG. 42 is a view illustrating a method for allocating resources to a plurality of terminals by a self scheduling in a case in which the CCA is the LBE scheme according to an exemplary embodiment.

FIG. 41 is a view illustrating a method for allocating resources to a plurality of terminals by a self scheduling in a case in which the CCA is the FBE scheme according to an exemplary embodiment and FIG. 42 is a view illustrating a method for allocating resources to a plurality of terminals by a self scheduling in a case in which the CCA is the LBE scheme according to an exemplary embodiment.

Referring to FIGS. 41 and 42, in the case in which the UL self scheduling is applied, the base station performs the CCA to occupy/use the channel, and transmits the UL Grant, thereby allocating the resources. The terminal attempts to transmit the uplink data using the allocated resources. As described above, the terminal may transmit the data using the channel occupied by the base station, or the terminal itself may occupy the channel and transmit the data as illustrated in FIGS. 41 and 42. In this case, other terminals (UE2 and UE4) may transmit the data by using "RSV" (i.e., receiving "RSV" instead of the CCA).

Figure 43:
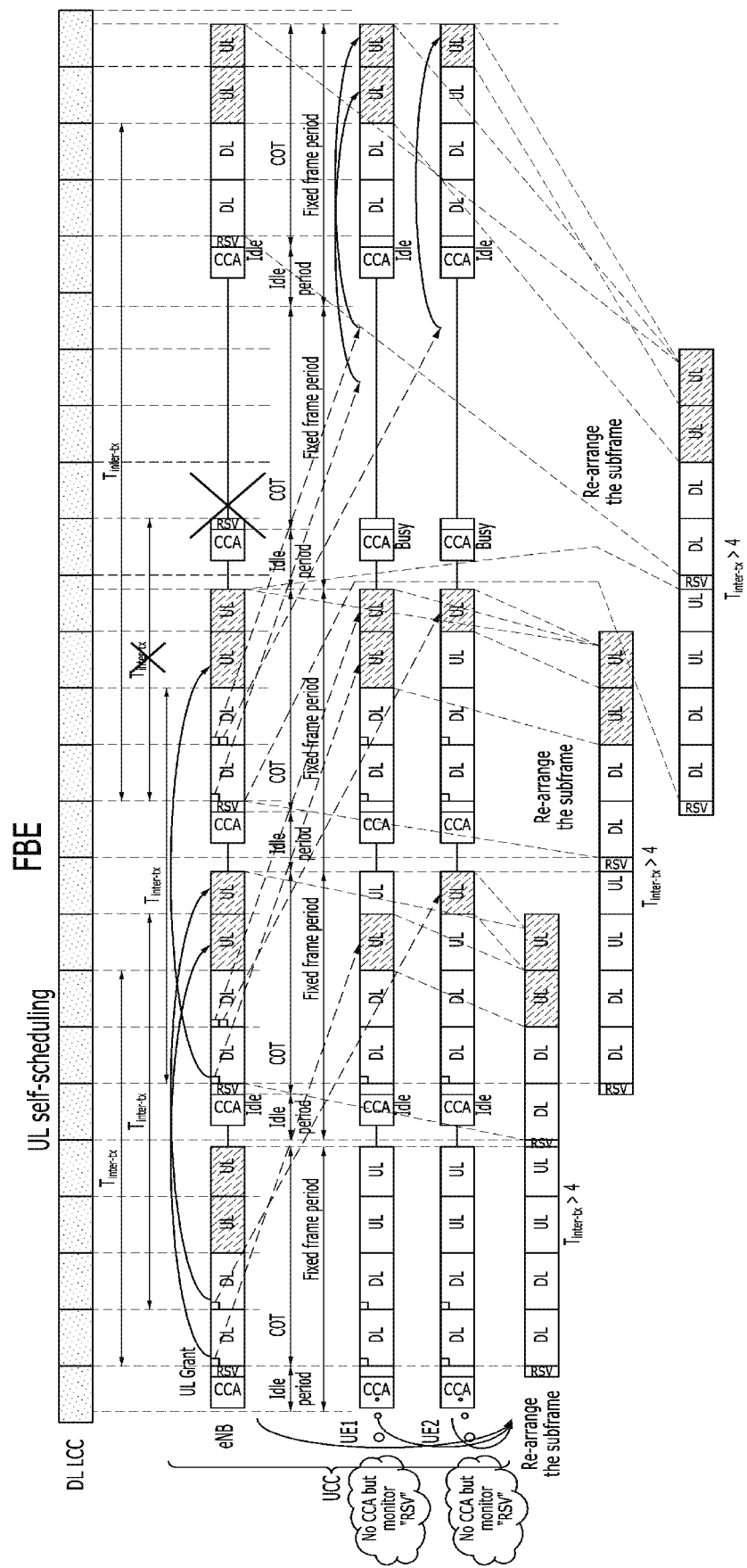
FIGS. 43 and 44 are views illustrating a method for transmitting data by a terminal in a case in which a base station simultaneously occupies uplink/downlink channels according to an exemplary embodiment.
Figure 44:
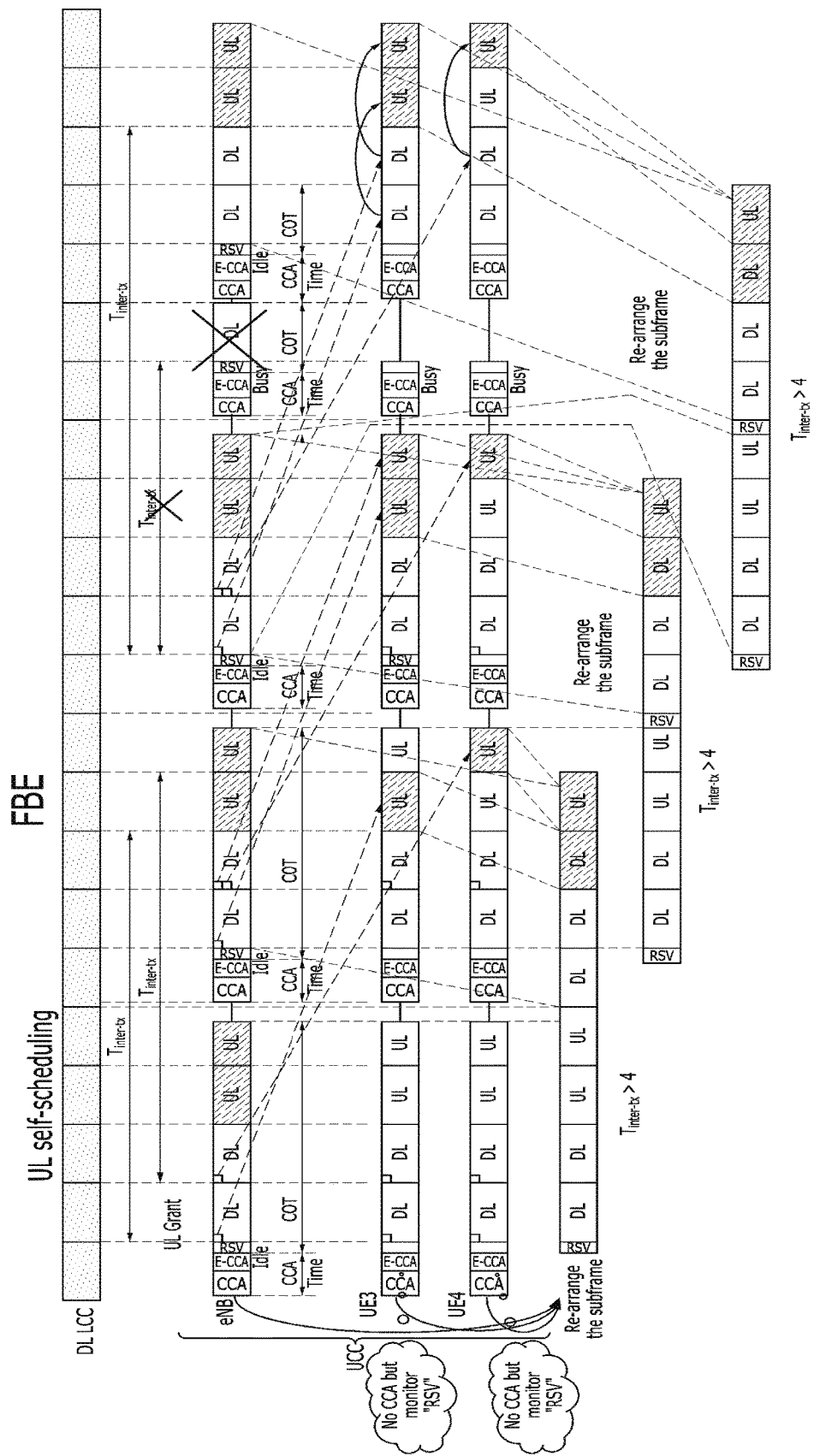

FIGS. 43 and 44 are views illustrating a method for transmitting data by a terminal in a case in which a base station simultaneously occupies uplink/downlink channels according to an exemplary embodiment.

Referring to FIG. 43, the base station performs the CCA based on the FBE, and referring to FIG. 44, the base station performs the CCA based on the LBE, and the respective terminals (UE1 to UE4) do not perform the CCA and may transmit the uplink data using "RSV" received from the base station. In this case, the channel occupied by the base station is operated by a frame configuration, and the base station occupies the channel for transmitting the uplink data (of the terminal) at the same time in a process of occupying the channel for transmitting the downlink data. In this case, the terminal may transmit the uplink data to the base station in the resources allocated through the UL Grant, at the transmission timing of the uplink data of the virtual frame generated after the base station occupies the channel.

Figure 45:
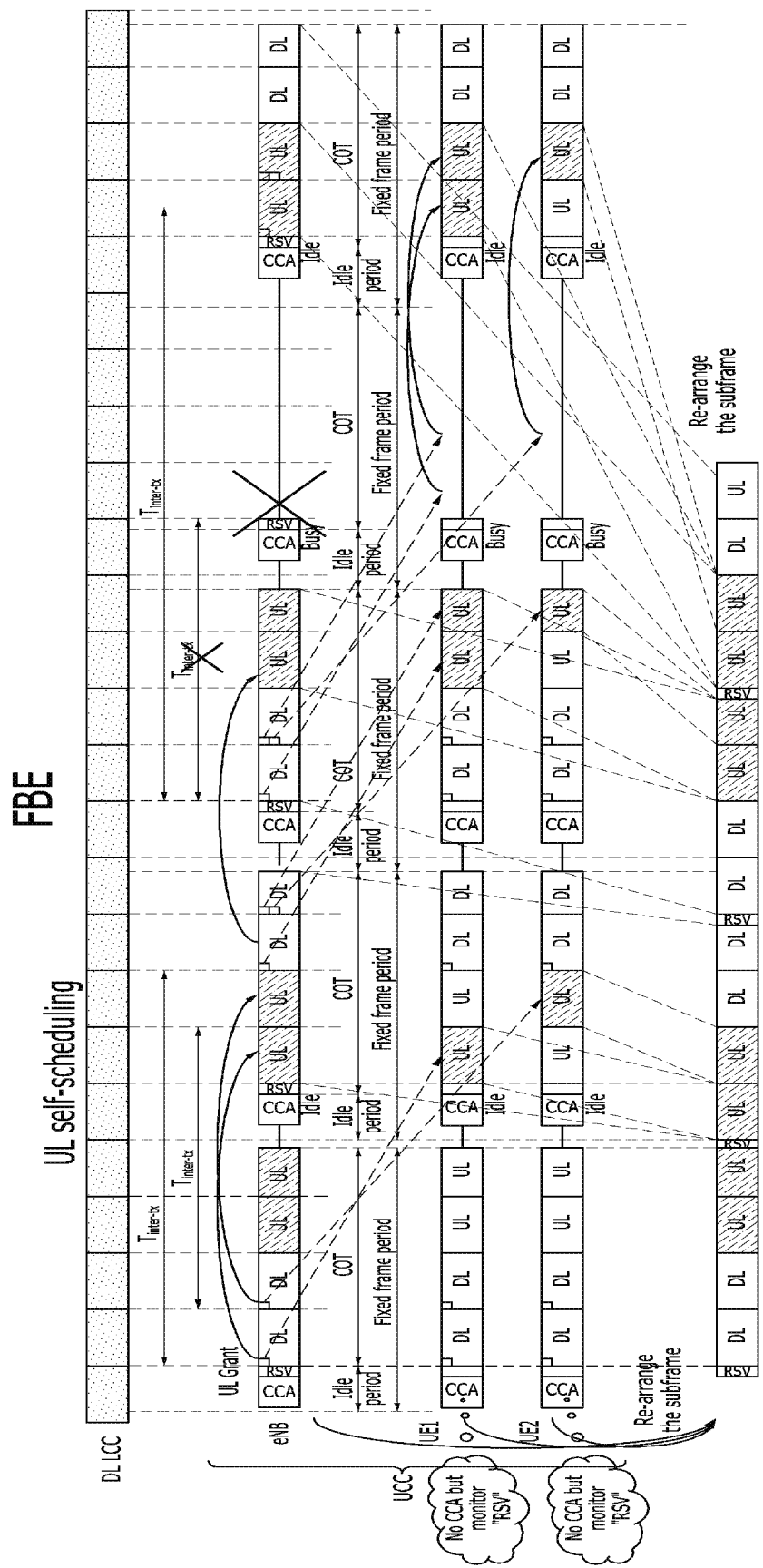
FIGS. 45 and 46 are views illustrating a method for transmitting data by a terminal in a case in which a base station simultaneously occupies uplink/downlink channels according to another exemplary embodiment.
Figure 46:
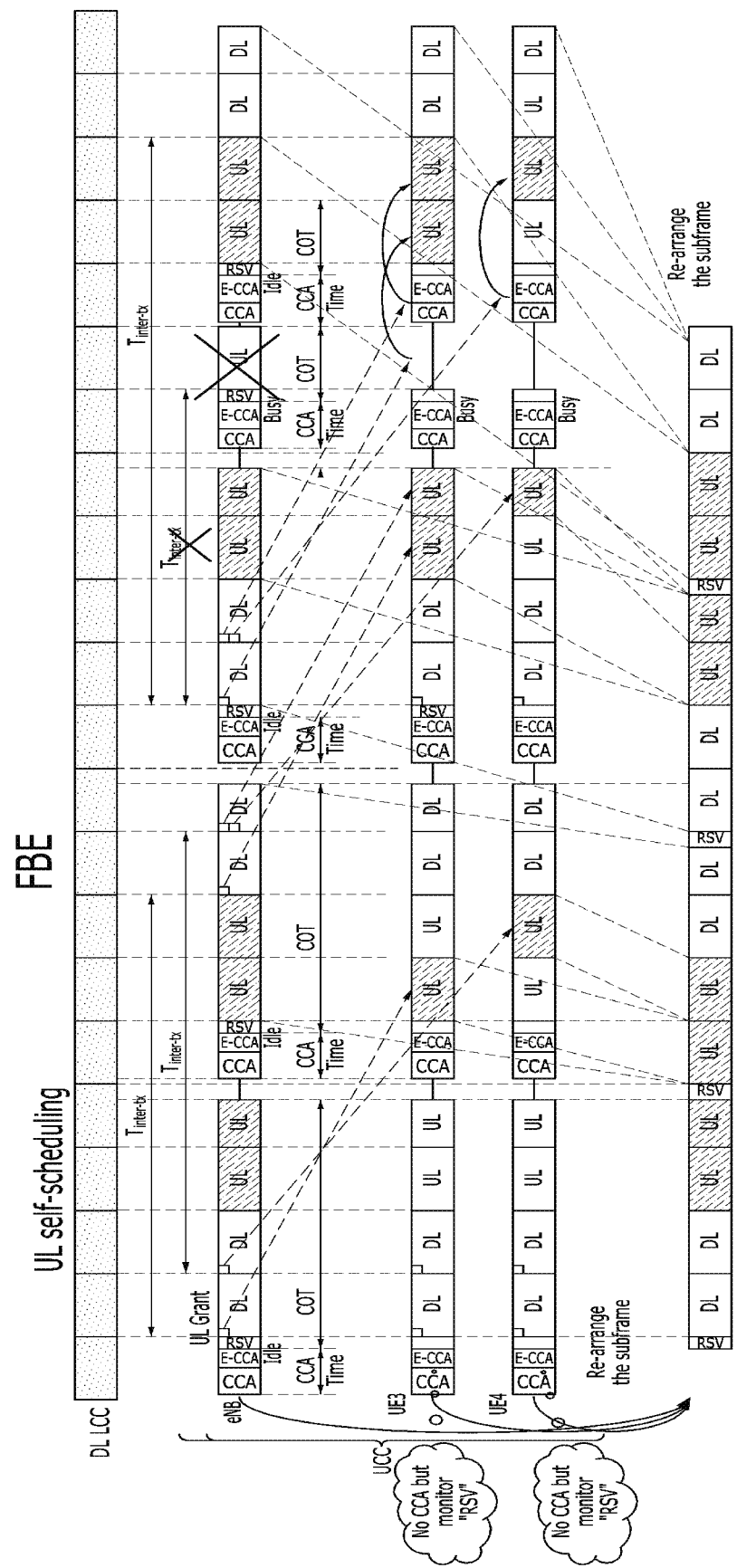

FIGS. 45 and 46 are views illustrating a method for transmitting data by a terminal in a case in which a base station simultaneously occupies uplink/downlink channels according to another exemplary embodiment.

Referring to FIG. 45, the base station performs the CCA based on the FBE, and referring to FIG. 46, the base station performs the CCA based on the LBE, and the respective terminals (UE1 to UE4) do not perform the CCA and may transmit the uplink data using "RSV" received from the base station. In this case, the base station may apply a new frame configuration in other channels depending on the frame configuration of the previous occupied channel, and a newly transmitted "RSV" may include an indication informing that the new frame configuration is applied, unlike information of a previous "RSV". Alternatively, the terminal may also determine the frame configuration to be newly applied based on the previous frame configuration. Alternatively, the frame configuration information may also be included in the PDCCH, instead of being included in "RSV", and may be transmitted in the upper layer (RRC level signaling), or may also be transmitted using MAC CE or the like. Alternatively, as the frame configuration information, the preset value may be used. In addition, in this case, an index (i.e., configuration #) generated by indexing of the frame configuration is transmitted to the terminal in advance, thereby making it possible to transmit and receive the data between the base station and the terminal by an accurate standard.

Hereinafter, a structure of the subframe varied depending on a transmission format of data will be described in detail.

In order to transmit the uplink data, some of the uplink data are used as a demodulated reference signal (DM-RS). However, as described above, the DM-RS needs to be changed in a subframe (hereinafter, referred to as "a partial subframe") including $(1-N_{Symb}^{UL})$ only some symbols (e.g., single carrier-frequency division multiple access (SC-FDMA) symbol) of the subframe.

First, in the case in which the number of symbols of the uplink subframe satisfies the following Equation 2, the partial subframe does not include the DM-RS.

$$N_{symb}^{partial\ UL}\ N_{Symb}^{UL}-1)<m(m=1,2,\qquad\text{[Equation 2]}$$

According to an exemplary embodiment, the DM-RS may be configured in a slot unit. One resource block (RB) used for transmitting the uplink data has the slot unit, and is configured of a resource element (RE) index (k,l). Here, k is a frequency-domain index, I is a time-domain index, and has the number of $N_{Symb}^{UL}$ symbols.

FIGS. 47 to 54 are views illustrating the DM-RS within the partial subframe according to an exemplary embodiment.

In FIGS. 47 to 54, a bolded line indicates the partial subframe, and a portion indicated by an oblique line indicates the DM-RS. A method to be described below may be applied to a case in which the DM-RS is configured in the slot unit when the partial subframe has the number of symbols less than $N_{Symb}^{UL}$, or has the number of symbols between $N_{Symb}^{UL}$ and $2 \times N_{Symb}^{UL}$. In the case in which a CP is a normal CP, the number of symbols included in one slot is 7, and a symbol at which the DM-RS is positioned is a fourth (I=3) symbol. In the case in which the CP is an extended CP, the number of symbols included in one slot is 6, and a symbol at which the DM-RS is positioned is a third (I=2) symbol. However, in the case of the partial subframe, since it is not guaranteed that I is 3 or 2, the DM-RS may be positioned within the partial subframe according to the following method.

Method 1: a method in which the DM-RS is included in a symbol in which I=n (n=0, 1, 2, . . . , $N_{Symb}^{UL}-1$).

Figure 47:
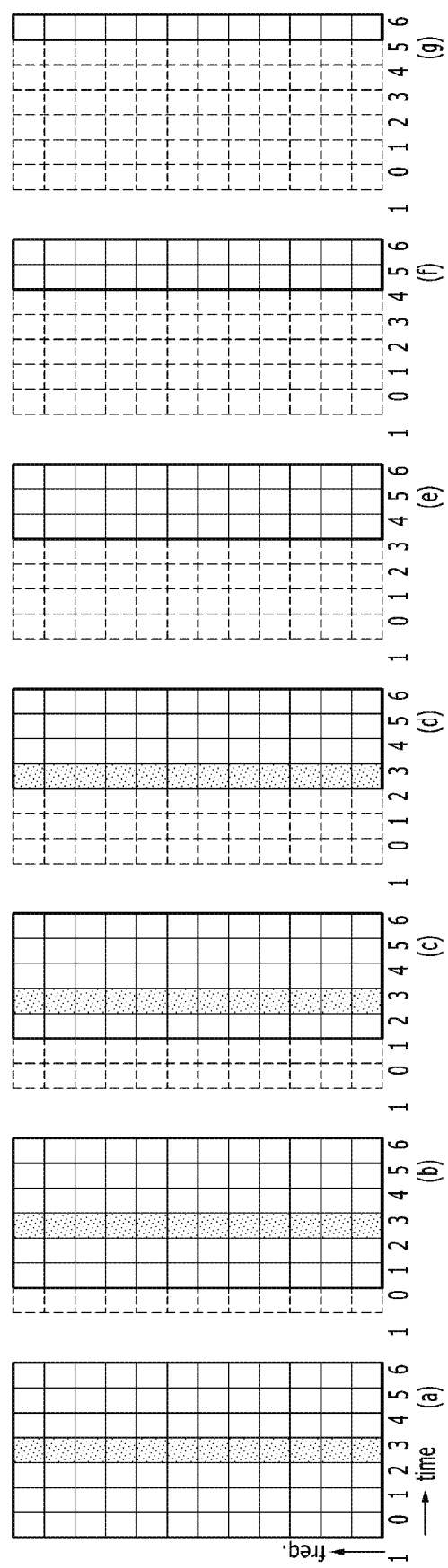
FIGS. 47 and 48 are views illustrating a partial subframe of a method 1 according to an exemplary embodiment.
Figure 48:
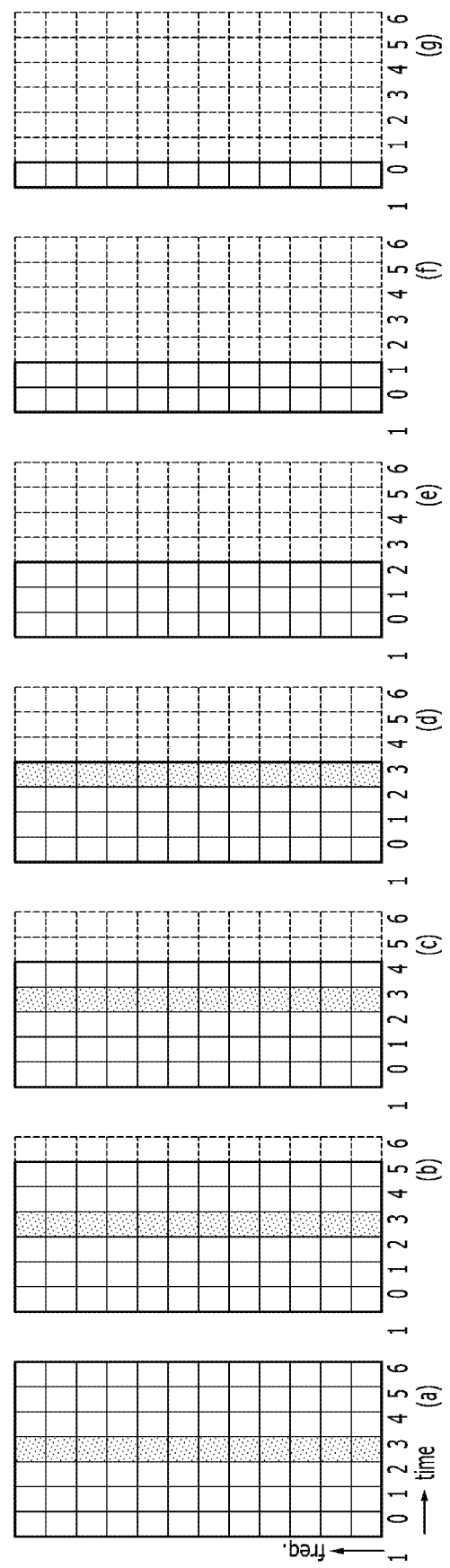

FIGS. 47 and 48 are views illustrating a partial subframe of a method 1 according to an exemplary embodiment. In FIGS. 47 and 48, n is 3, $N_{Symb}^{UL}$ is 7, and $N_{Symb}^{partial\ UL}$ of (a) to (g) of FIGS. 47 and 48 is sequentially 7, 6, 5, 4, 3, 2, and 1.

Method 2: a method in which the DM-RS is included in a symbol in which $1=[N_{symb}^{partial\ UL}/2]+(N_{Symb}^{UL}-N_{symb}^{partial\ UL})$.

Figure 49:
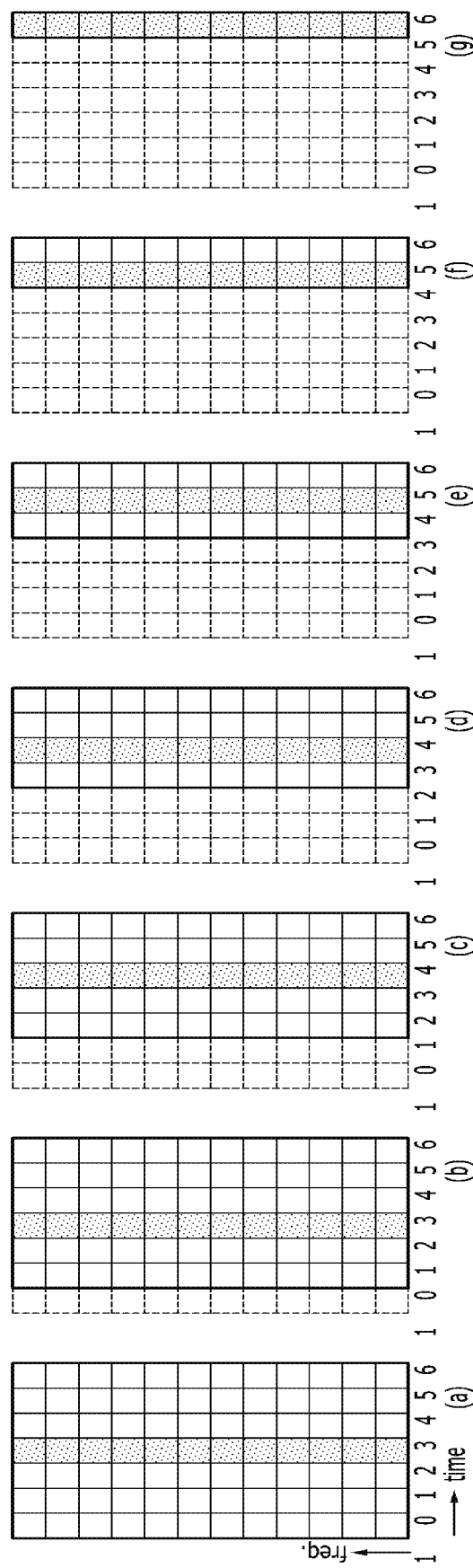
FIGS. 49 and 50 are views illustrating a partial subframe of a method 2 according to an exemplary embodiment.
Figure 50:
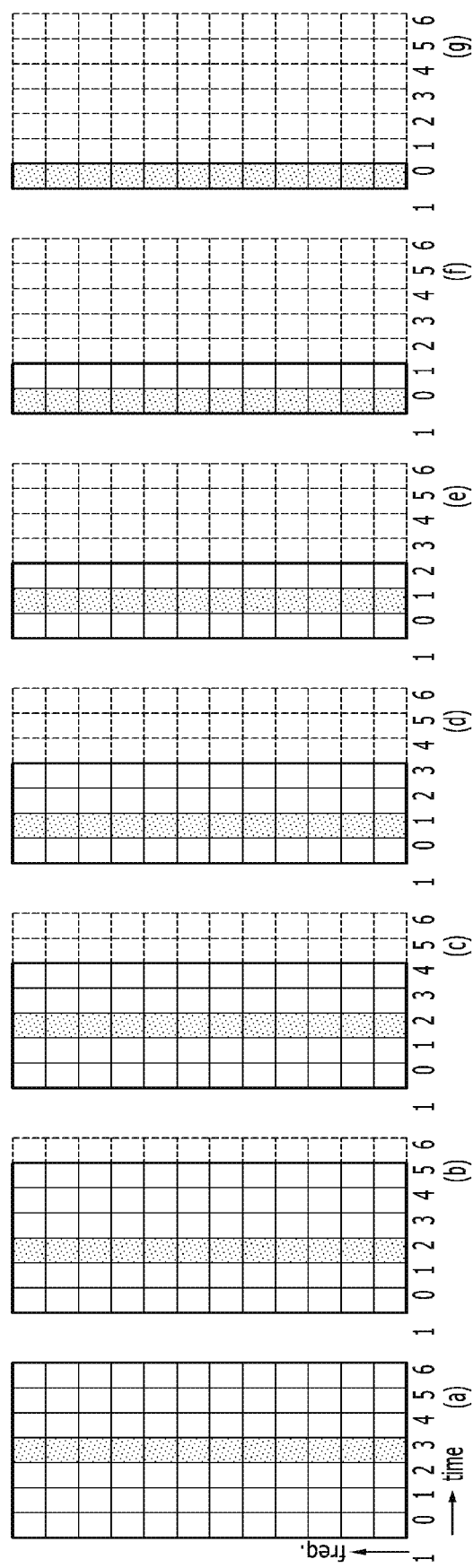

FIGS. 49 and 50 are views illustrating a partial subframe of a method 2 according to an exemplary embodiment. In FIGS. 49 and 50, $N_{Symb}^{UL}$ is 7, and $N_{Symb}^{partial\ UL}$ of (a) to (g) of FIGS. 49 and 50 is sequentially 7, 6, 5, 4, 3, 2, and 1.

Method 3: a method in which the DM-RS is included in a symbol in which $I=[N_{symb}^{partial\ UL}/2]+(N_{Symb}^{UL}-N_{symb}^{partial\ UL})$.

Figure 51:
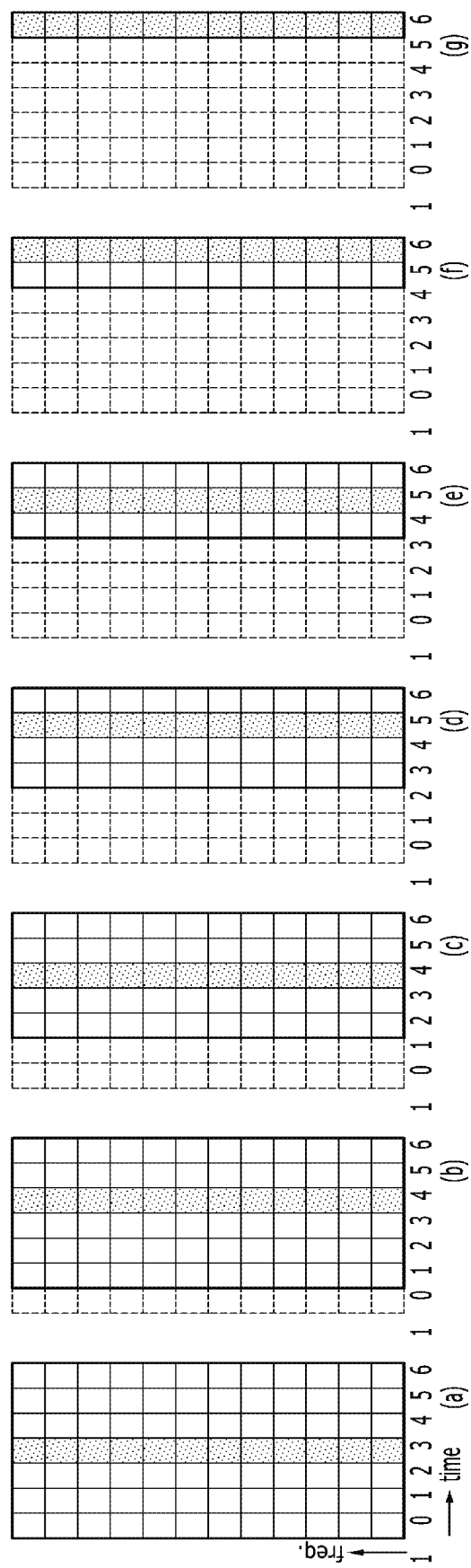
FIGS. 51 and 52 are views illustrating a partial subframe of a method 3 according to an exemplary embodiment.
Figure 52:
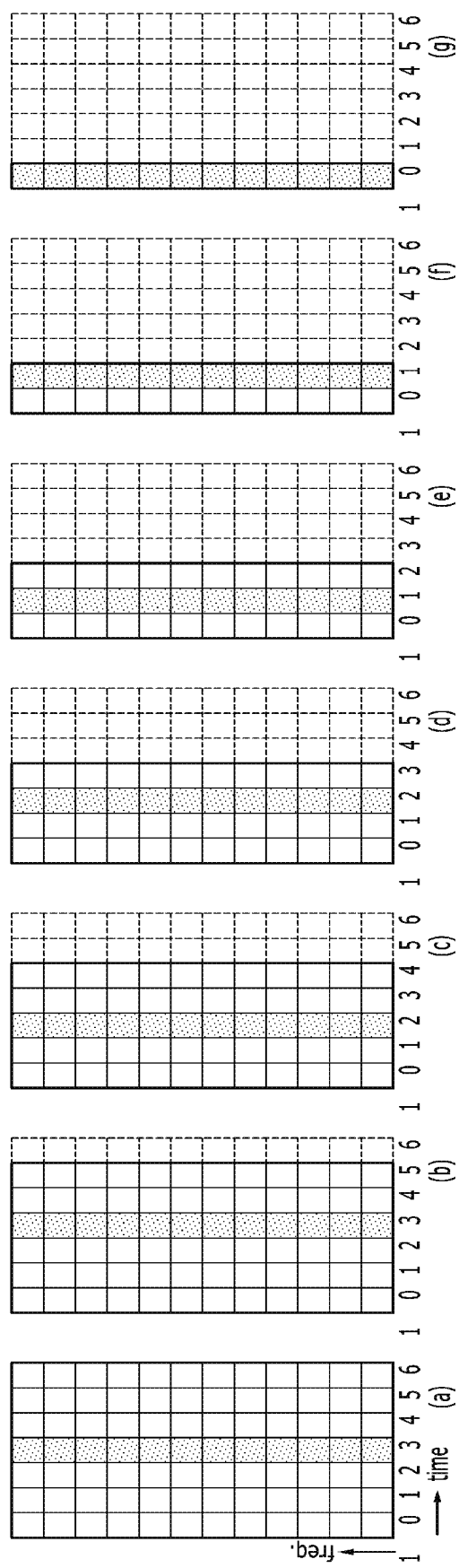

FIGS. 51 and 52 are views illustrating a partial subframe of a method 3 according to an exemplary embodiment. In FIGS. 51 and 52, $N_{Symb}^{UL}$ is 7, and $N_{Symb}^{partial\ UL}$ of (a) to (g) of FIGS. 51 and 52 is sequentially 7, 6, 5, 4, 3, 2, and 1.

Method 4 a method in which the DM-RS is included in a symbol in which $I=n+(N_{Symb}^{UL}-N_{symb}^{partial\ UL})$ (n=0, 1, 2, . . . , $N_{Symb}^{UL}-1$).

Figure 53:
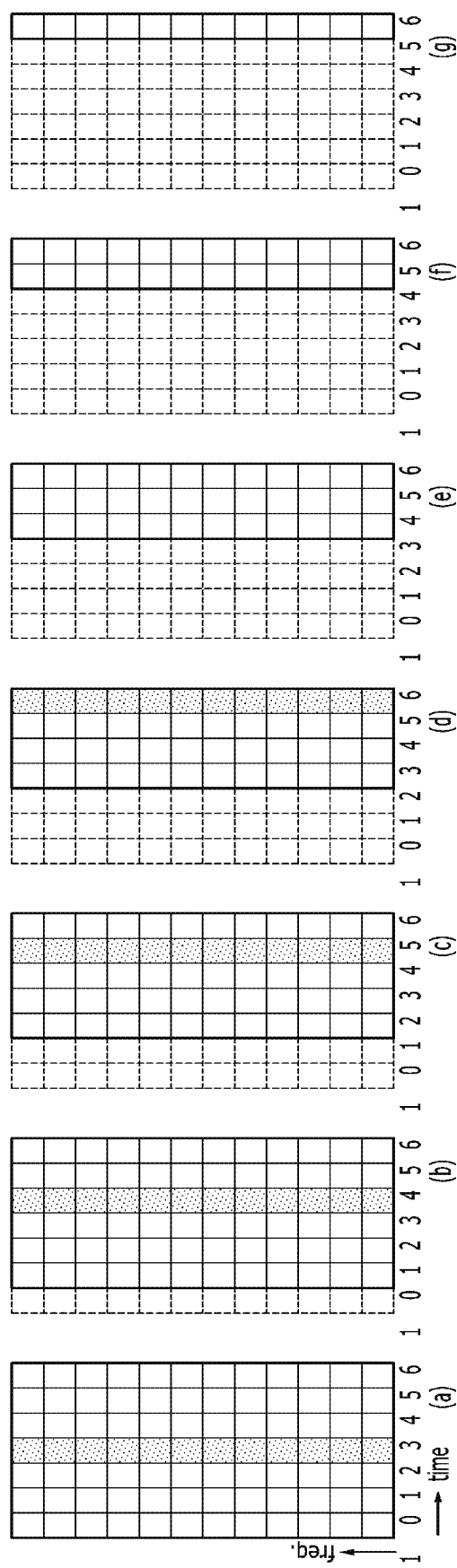
FIG. 53 is a view illustrating a partial subframe of a method 4 according to an exemplary embodiment.

FIG. 53 is a view illustrating a partial subframe of a method 4 according to an exemplary embodiment. In FIG. 53, n is 3, $N_{Symb}^{UL}$ is 7, and $N_{Symb}^{partial\ UL}$ of (a) to (g) of FIG. 53 is sequentially 7, 6, 5, 4, 3, 2, and 1.

Method 5: a method in which the DM-RS is included in a symbol in which $I=(N_{Symb}^{UL}-N_{symb}^{partial\ UL})-n$ (n=0, 1, 2, . . . , $N_{Symb}^{UL}-1$).

Figure 54:
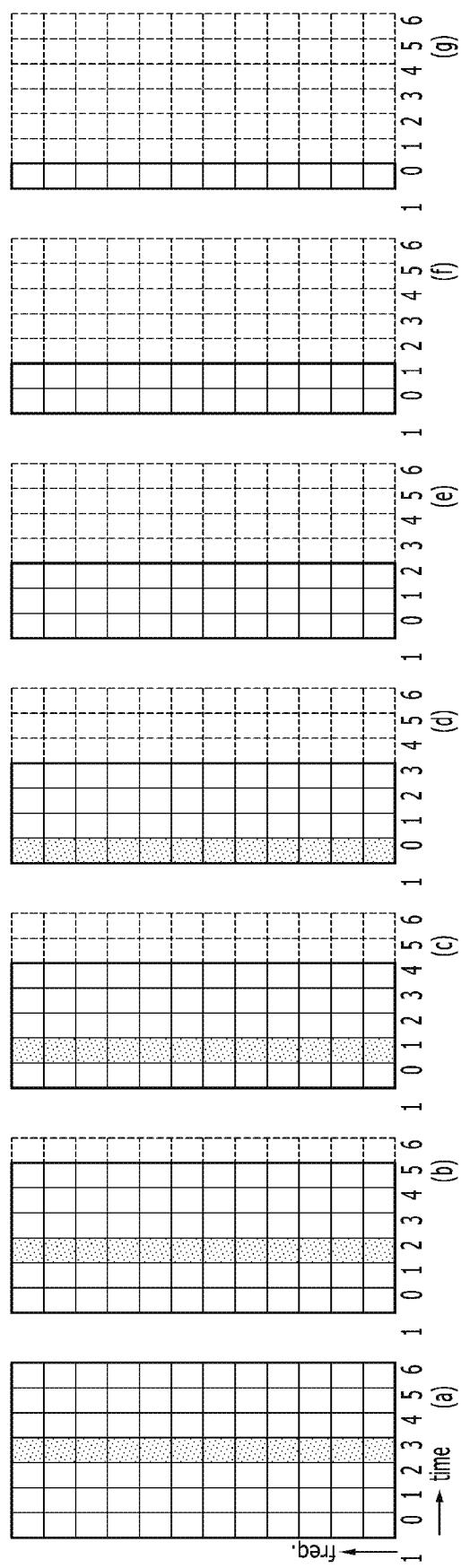
FIG. 54 is a view illustrating a partial subframe of a method 5 according to an exemplary embodiment.

FIG. 54 is a view illustrating a partial subframe of a method 5 according to an exemplary embodiment. In FIG. 54, n is 3, $N_{Symb}^{UL}$ is 7, and $N_{Symb}^{partial\ UL}$ of (a) to (g) of FIG. 53 is sequentially 7, 6, 5, 4, 3, 2, and 1.

When the methods 1 to 5 described above are applied, the number of symbols included in the partial subframe is less than m ($N_{symb}^{partial\ UL}<m$) (here, m=1, 2, . . . , $N_{Symb}^{UL-1}$), the DM-RS may not be included in the partial subframe.

According to another exemplary embodiment, the DM-RS may be configured in a transmission time interval (TTI) unit (however, in the case in which the number of symbols included in the partial subframe is less than $N_{Symb}^{UL}$, the DM-RS may be configured in the slot unit). In the case in which the number of symbols included in the partial subframe is $N_{Symb}^{UL}-2\times N_{Symb}^{UL}$, the DM-RS may be disposed in a total number of symbols ($N_{Symb}^{UL}-2\times N_{Symb}^{UL}$) unit (i.e., the TTI unit).

Method 1: a method in which the DM-RS is not disposed in a slot (a partial slot) having the number of symbols less than a normal slot.

Figure 55:
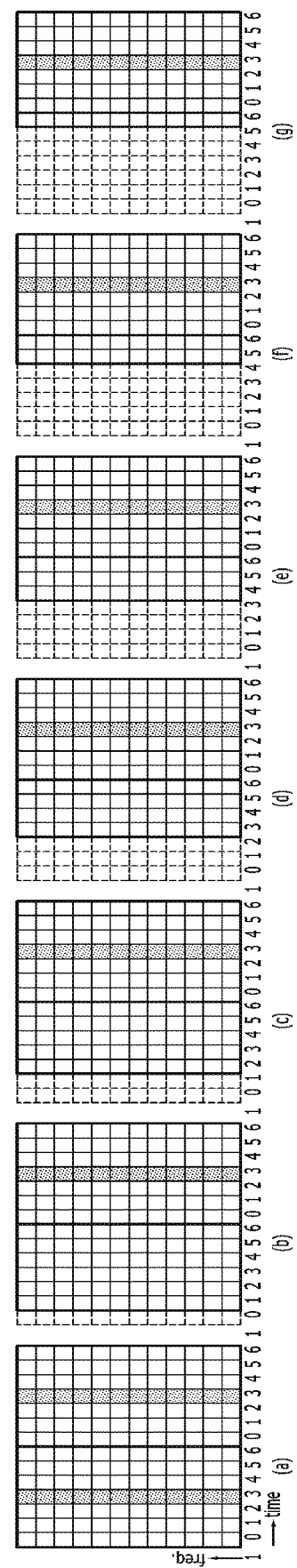
FIGS. 55 and 56 are views illustrating a partial subframe of a method 1 according to another exemplary embodiment.
Figure 56:
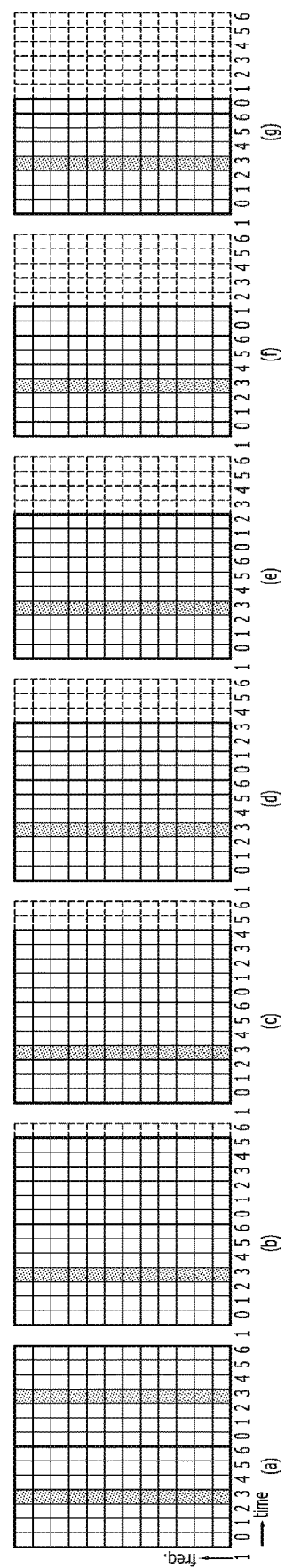

FIGS. 55 and 56 are views illustrating a partial subframe of a method 1 according to another exemplary embodiment.

Method 2: a method in which the DM-RS is included in a symbol of a fixed position (e.g., when I=n, n=3) within the slot, in the case in which the partial subframe includes "slot+partial slot".

Figure 57:
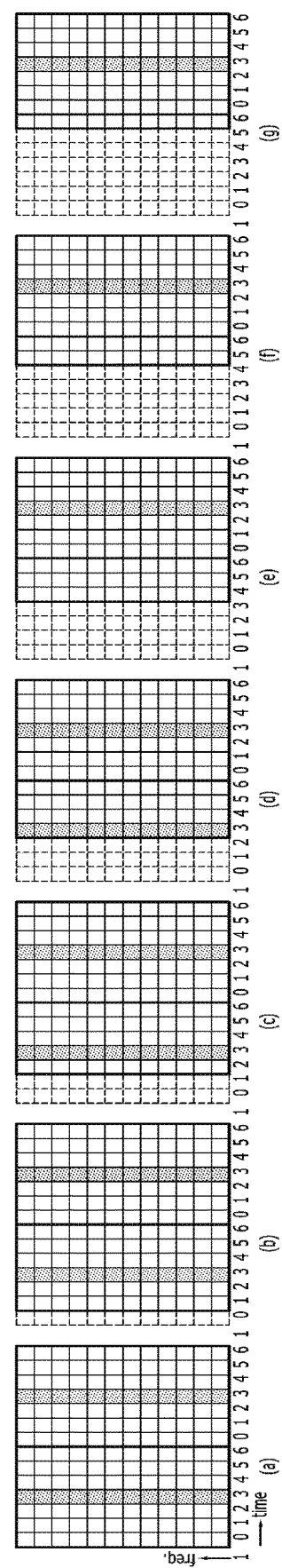
FIGS. 57 and 58 are views illustrating a partial subframe of a method 2 according to another exemplary embodiment.
Figure 58:
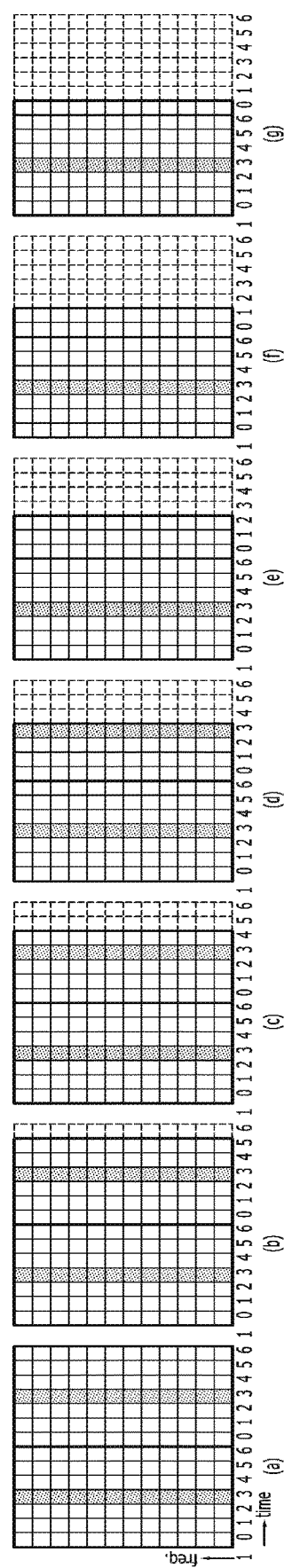

FIGS. 57 and 58 are views illustrating a partial subframe of a method 2 according to another exemplary embodiment. In FIGS. 57 and 58, n is 3, $N_{Symb}^{UL}$ is 7, and $N_{Symb}^{partial\ UL}$ of (a) to (g) of FIGS. 57 and 58 is sequentially $N_{Symb}^{UL}+7$, $N_{Symb}^{UL}+6$, $N_{Symb}^{UL}+5$, $N_{Symb}^{UL}+4$, $N_{Symb}^{UL}+3$, $N_{Symb}^{UL}+2$, and $N_{Symb}^{UL}+1$. Referring to FIGS. 57 and 58, the DM-RS is fixedly disposed at a third symbol in the slot. Therefore, the DM-RS is not disposed in the left slot of the subframes (e), (f), and (g) of FIG. 57 and the right slot of the subframes (e), (f), and (g) of FIG. 58.

Method 3: a method in which the DM-RS is included in a symbol in which $I=[(N_{symb}^{partial\ UL}-N_{symb}^{UL})/2]$.

Figure 59:
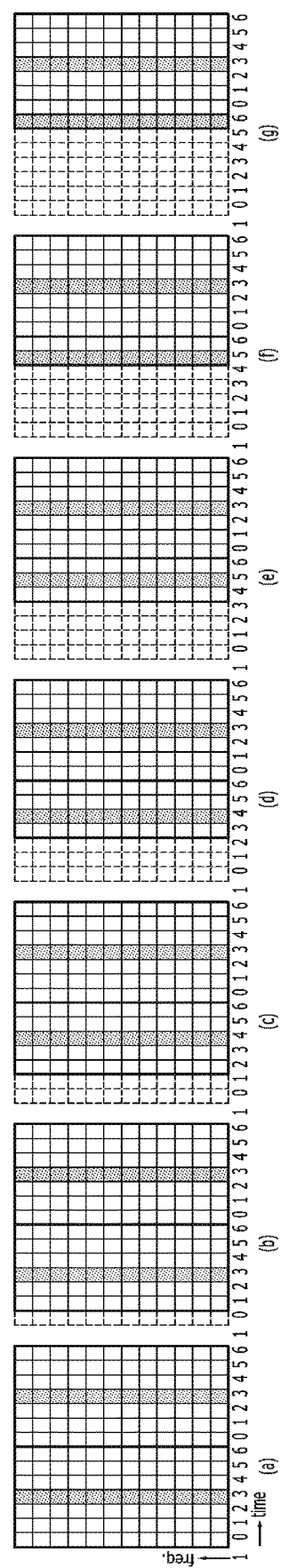
FIGS. 59 and 60 are views illustrating a partial subframe of a method 3 according to another exemplary embodiment.
Figure 60:
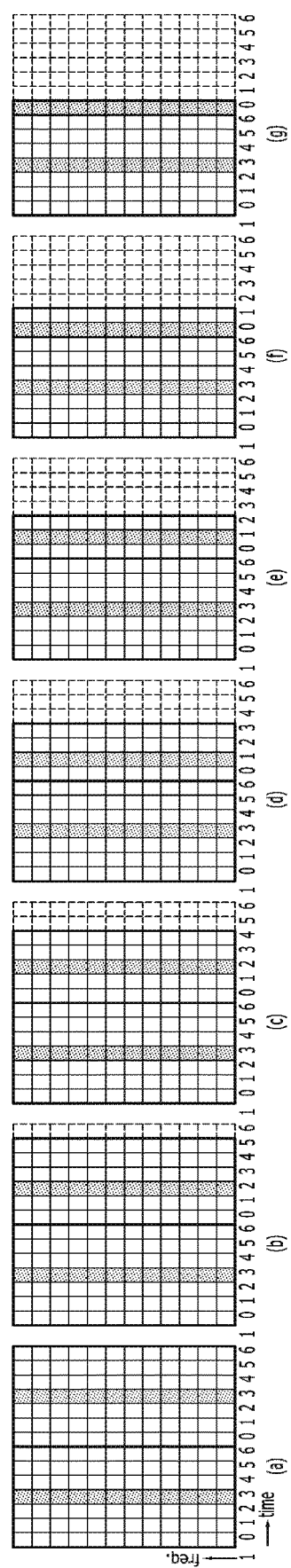

FIGS. 59 and 60 are views illustrating a partial subframe of a method 3 according to another exemplary embodiment. In FIGS. 59 and 60, $N_{symb}^{UL}$ is 7, and $N_{Symb}^{partial\ UL}$ of (a to (g) of FIGS. 59 and 60 is sequentially $N_{Symb}^{UL}+7$, $N_{Symb}^{UL}+6$, $N_{Symb}^{UL}+5$, $N_{Symb}^{UL}+4$, $N_{Symb}^{UL}+3$, $N_{Symb}^{UL}+2$, and $N_{Symb}^{UL}+1$.

Method 4: a method in which the DM-RS is included in a symbol in which $I=[(N_{symb}^{partial\ UL}-N_{symb}^{UL})/2]$.

Figure 61:
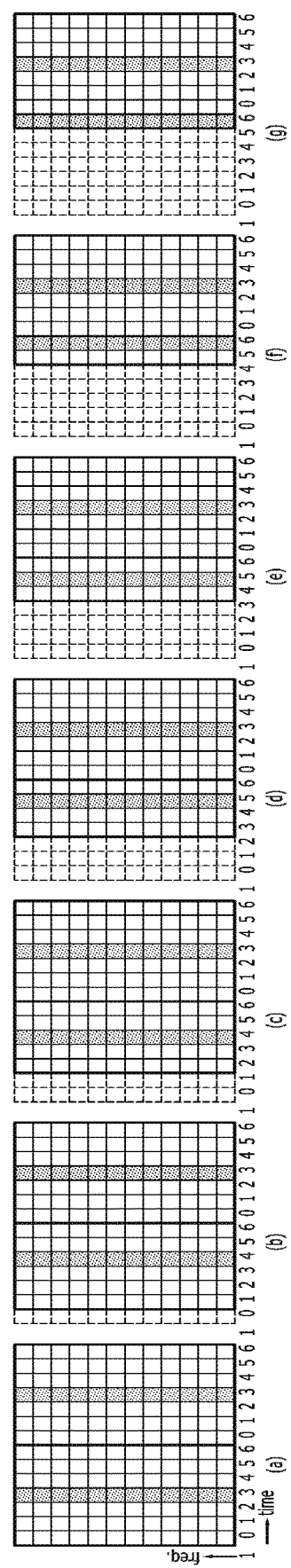
FIGS. 61 and 62 are views illustrating a partial subframe of a method 4 according to another exemplary embodiment.
Figure 62:
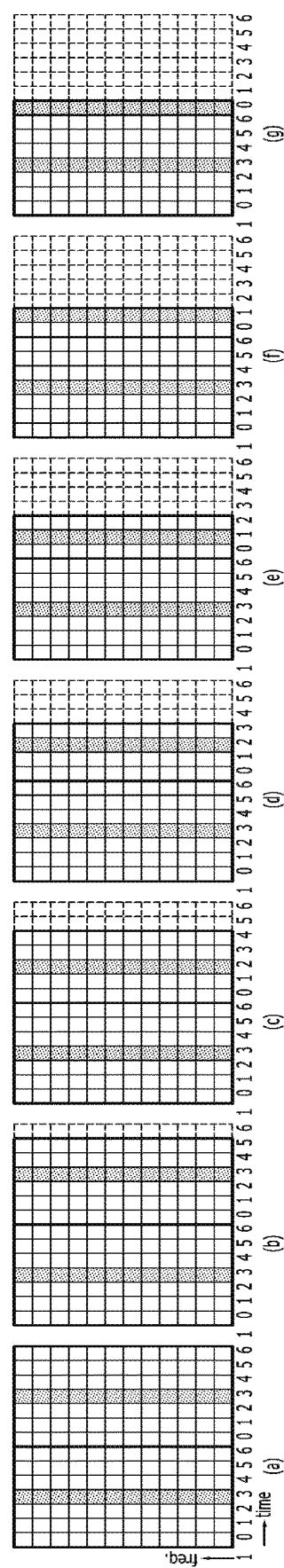

FIGS. 61 and 62 are views illustrating a partial subframe of a method 4 according to another exemplary embodiment. In FIGS. 61 and 62, $N_{Symb}^{UL}$ is 7, and $N_{Symb}^{partial\ UL}$ of (a) to (g) of FIGS. 61 and 62 is sequentially $N_{Symb}^{UL}+7$, $N_{Symb}^{UL}+6$, $N_{Symb}^{UL}+5$, $N_{Symb}^{UL}+4$, $N_{Symb}^{UL}+3$, $N_{Symb}^{UL}+2$, and $N_{Symb}^{UL}+1$.

Method 5: a method in which when the number of DM-RS to be transmitted in the entire TTI is N, the symbols included in the entire TTI are divided by N, and the DM-RS is included in each N-divided portion by one.

When the uplink data is transmitted through the unlicensed band, the base station or the terminal efficiently performs the CCA, thereby making it possible to occupy the resources of the unlicensed band.

Figure 63:
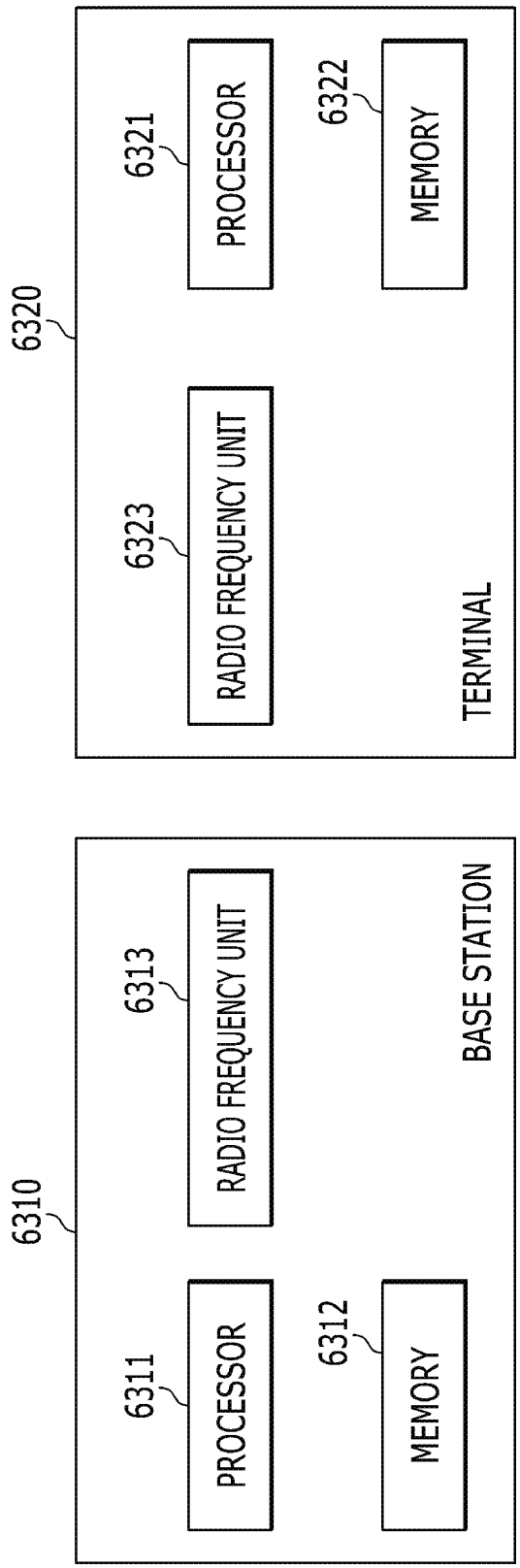
FIG. 63 is a block diagram illustrating a wireless communication system according to an exemplary embodiment.

FIG. 63 is a block diagram illustrating a wireless communication system according to an exemplary embodiment.

Referring to FIG. 63, a wireless communication system according to an exemplary embodiment includes a base station 6310 and a terminal 6320.

The base station 6310 includes a processor 6311, a memory 6312, and a radio frequency (RF) unit (6313). The memory 6312 may be connected to the processor 6311 and may store a variety of information for driving the processor 6311 or at least one program executed by the processor 6311. The RF unit 6313 may be connected to the processor 6311, and may transmit and receive a wireless signal. The processor 6311 may implement the functions, the processes, or the methods proposed by the exemplary embodiments of the present disclosure. Here, a wireless interface protocol layer in a wireless communication system according to an exemplary embodiment of the present disclosure may be implemented by the processor 6311. An operation of the base station 6310 according to an exemplary embodiment may be implemented by the processor 6311.

The terminal 6320 includes a processor 6321, a memory 6322, and a RF unit 6323. The memory 6322 may be connected to the processor 6321 and may store a variety of information for driving the processor 6321 or at least one program executed by the processor 6321. The RF unit 6323 may be connected to the processor 6321, and may transmit and receive a wireless signal. The processor 6321 may implement the functions, the steps, or the methods proposed by the exemplary embodiments of the present disclosure. Here, a wireless interface protocol layer in a wireless communication system according to an exemplary embodiment of the present disclosure may be implemented by the processor 6321. An operation of the terminal 6320 according to an exemplary embodiment may be implemented by the processor 6321.

According to the exemplary embodiment of the present disclosure, the memory may be internal or external of the processor, and may be connected to the processor by various means which are already known. The memory is a variety of types of volatile or non-volatile storing medium. For example, the memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a physical uplink shared channel (PUSCH) by a terminal, the method comprising:
   receiving uplink resource information from a base station for an unlicensed band; and
   transmitting the PUSCH by using a partial unit duration belonging to an uplink resource of the unlicensed band corresponding to the uplink resource information, the partial unit duration including fewer symbols than a full unit duration,
   wherein the uplink resource information indicates an ending symbol of the partial unit duration carrying the PUSCH.

2. The method of claim 1, wherein: the partial unit duration includes the resources of the DM-RS when the partial unit duration has at least predetermined number of symbols.

3. A terminal for transmitting a physical uplink shared channel (PUSCH), the terminal comprising:
   a processor, a memory, and a radio frequency (RF) unit,
   wherein the processor executes a program stored in the memory to perform:
   receiving, by using the RF unit, uplink resource information from a base station for an unlicensed band; and
   transmitting, by using the RF unit, the PUSCH by using a partial unit duration belonging to an uplink resource of the unlicensed band corresponding to the uplink resource information,
   wherein the uplink resource information indicates an ending symbol of the partial unit duration carrying the PUSCH, and the partial unit duration including fewer symbols than a full unit duration.

4. The method of claim 3, wherein: the partial unit duration includes resources of a demodulation reference signal (DM-RS) used of the PUSCH.

5. The method of claim 4, wherein: the partial unit duration includes the resources of the DM-RS when the partial unit duration has at least predetermined number of symbols.

* * * * *